US007668885B2

(12) United States Patent
Wittke et al.

(10) Patent No.: US 7,668,885 B2
(45) Date of Patent: Feb. 23, 2010

(54) SYSTEM FOR TIMELY DELIVERY OF PERSONALIZED AGGREGATIONS OF, INCLUDING CURRENTLY-GENERATED, KNOWLEDGE

(75) Inventors: Edward R. Wittke, Warwick, NY (US); Mellissa A. Wittke, Warwick, NY (US); Connie S. Mazur, Ellicott City, MD (US); Kenneth A. Mazur, Ellicott City, MD (US)

(73) Assignee: MindAgent, LLC, Warwick, NY (US)

( * ) Notice: Subject to any disclaimer, the term of this patent is extended or adjusted under 35 U.S.C. 154(b) by 1515 days.

(21) Appl. No.: 10/254,216

(22) Filed: Sep. 25, 2002

(65) Prior Publication Data

US 2004/0059705 A1 Mar. 25, 2004

(51) Int. Cl.
*G06F 17/30* (2006.01)
(52) U.S. Cl. ............... 707/705; 707/722; 707/723; 707/732; 707/733; 707/734
(58) Field of Classification Search ............ 707/1, 707/3, 10, 100, 101, 102
See application file for complete search history.

(56) References Cited

U.S. PATENT DOCUMENTS

| 6,078,924 | A | * | 6/2000 | Ainsbury et al. | ............ 707/101 |
| 6,151,600 | A | * | 11/2000 | Dedrick | ............ 707/10 |
| 6,175,830 | B1 | * | 1/2001 | Maynard | ............ 707/5 |
| 6,471,521 | B1 | * | 10/2002 | Dornbush et al. | ............ 434/322 |
| 6,773,266 | B1 | * | 8/2004 | Dornbush et al. | ............ 434/322 |
| 6,778,979 | B2 | * | 8/2004 | Grefenstette et al. | ............ 707/3 |
| 6,928,425 | B2 | * | 8/2005 | Grefenstette et al. | ............ 707/2 |
| 6,938,021 | B2 | * | 8/2005 | Shear et al. | ............ 705/67 |
| 2003/0126136 | A1 | * | 7/2003 | Omoigui | ............ 707/10 |
| 2003/0163597 | A1 | * | 8/2003 | Hellman et al. | ............ 709/316 |
| 2005/0086188 | A1 | * | 4/2005 | Hillis et al. | ............ 706/50 |

OTHER PUBLICATIONS

Webster dictionary, 1995.*

* cited by examiner

*Primary Examiner*—Jean M Corrielus
(74) *Attorney, Agent, or Firm*—Joseph B. Taphorn

(57) ABSTRACT

A multidimensional method and apparatus for adaptively characterizing and aggregating data through a secure automated means of database modification, a prioritization and weighting system, a third party enhanced metadata entry and classification mechanism, adaptive and time varying individual personality and preference characterization, and an aggregation and delivery capability which allows for multiple data formats and mediums. Individual characterization incorporates an inference engine which formulates client composite images which vary with time. Asynchronous data interchanges enabled through the use of XML allow for more efficient and effective resource utilization and time. The knowledge system of this invention A) effectively integrates information from diverse sources, B) verifies, adds to or enhances source metadata (product data sheet; article title), and C) searches, queries, retrieves, and aggregates information. Selected product information can be obtained by e-mail without exposure to spamming by using e-mail address translation.

23 Claims, 59 Drawing Sheets

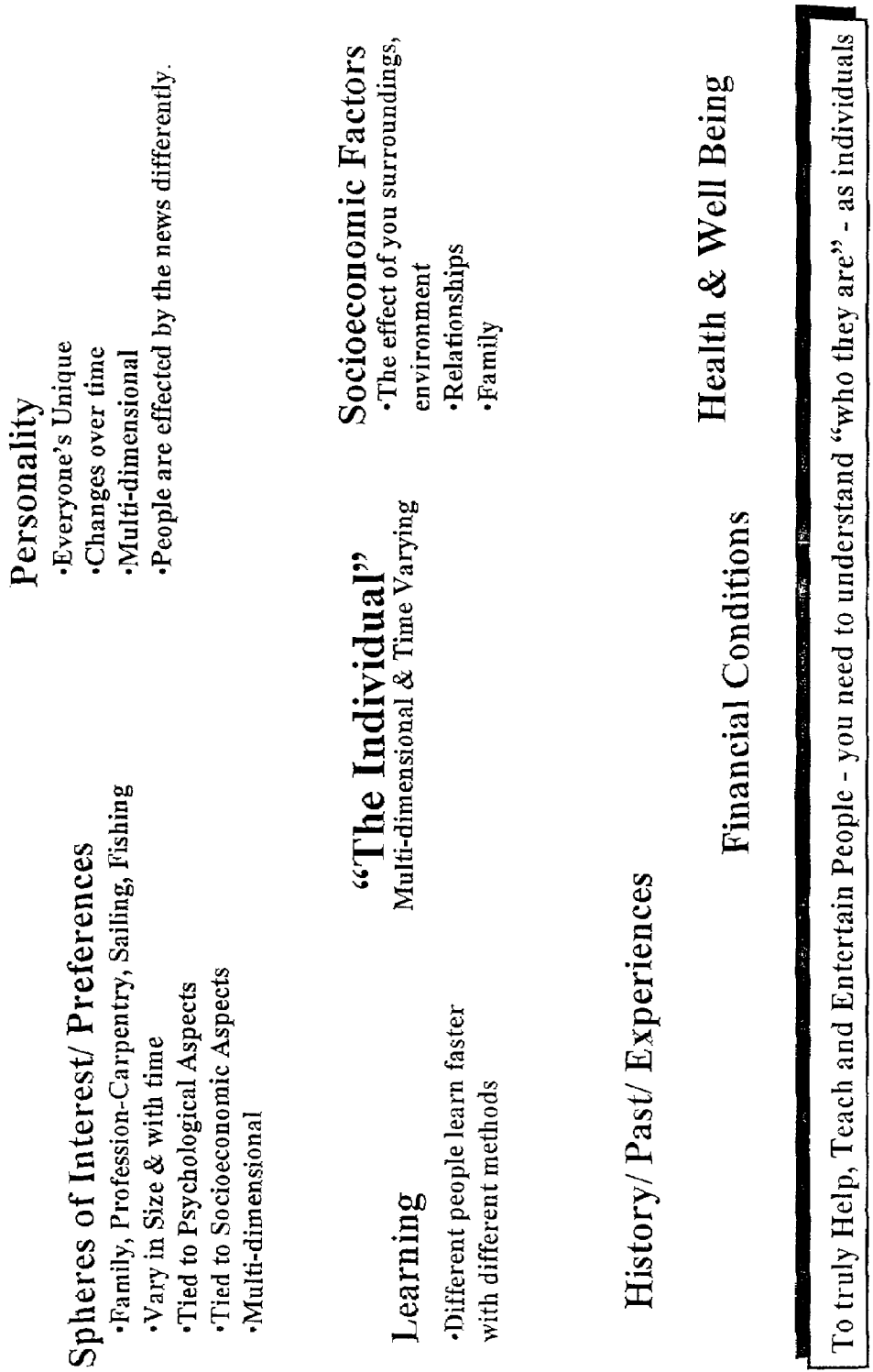

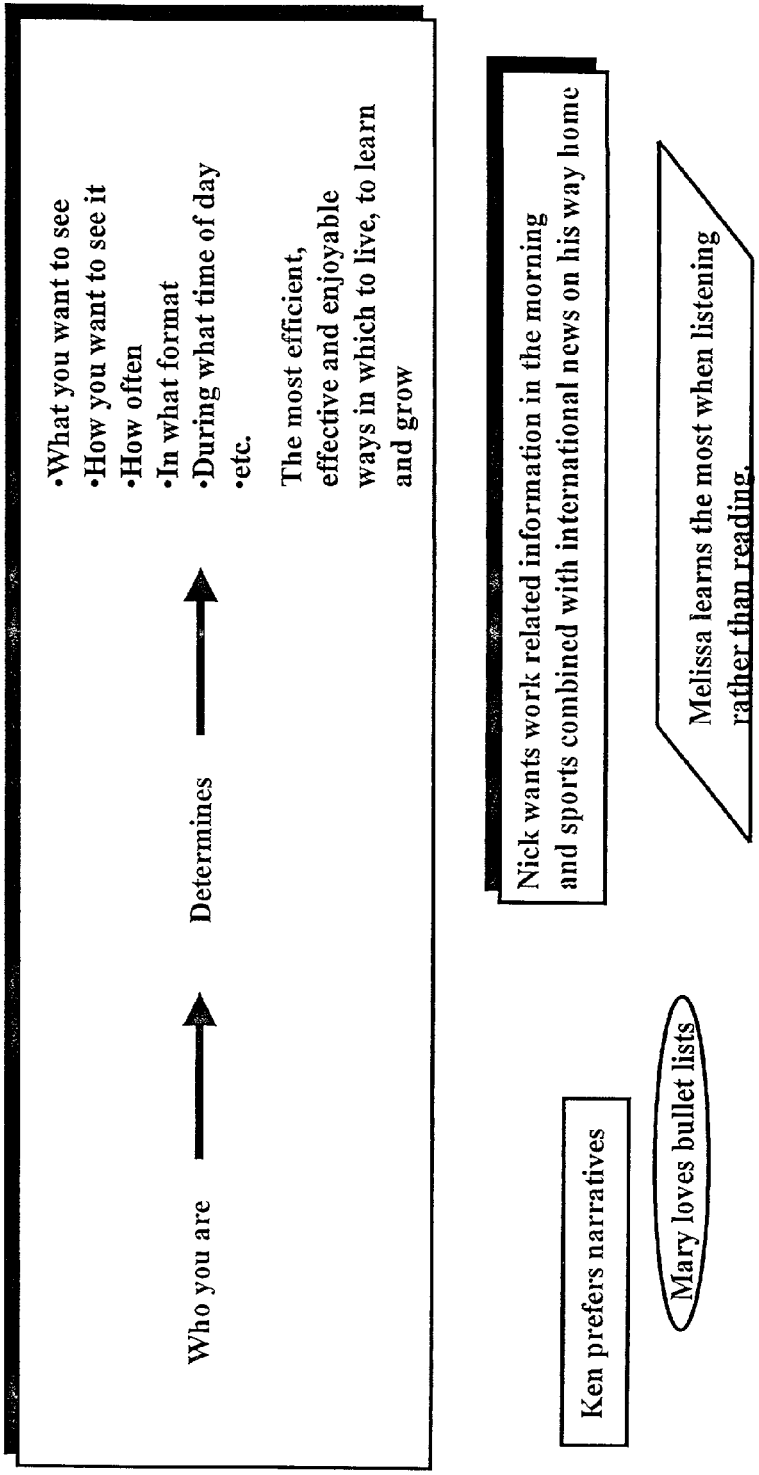
Figure 2  Varying Information/Interaction Needs

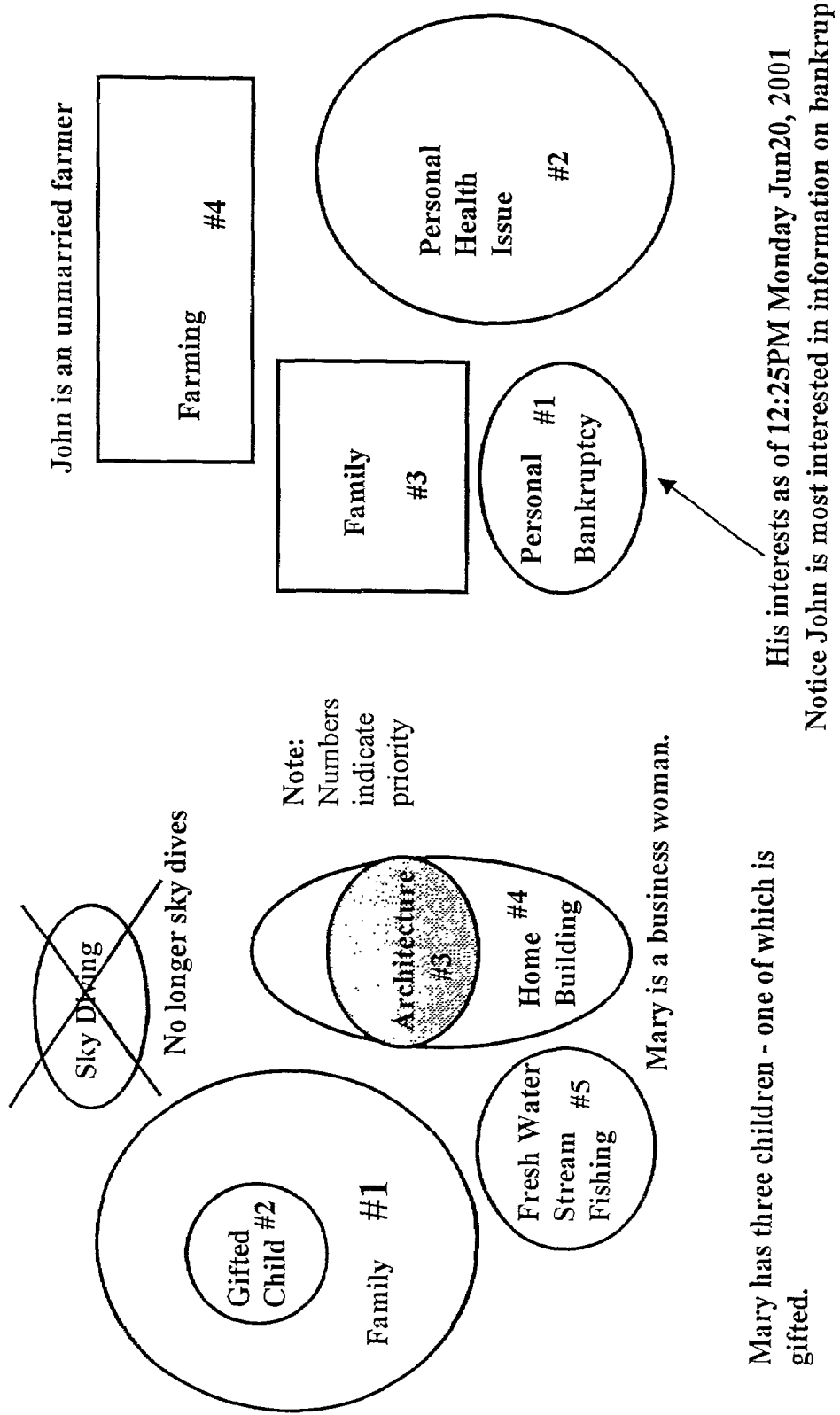

Figure 4 Unique ideas on Life, "Fun" - enjoyment

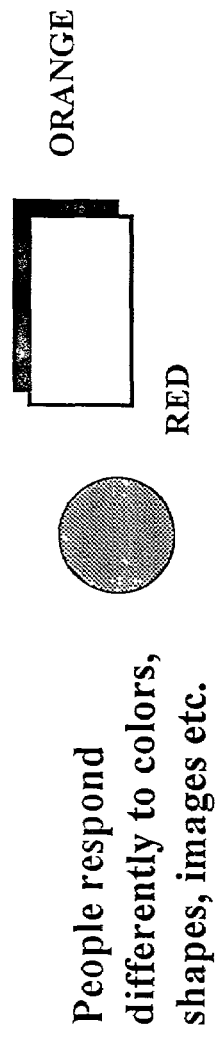

ORANGE

RED

People respond differently to colors, shapes, images etc.

PERSON A
Love Change
Flashy lights
Thrill Rides
Fast Pace
Loves to hear about accidents

PERSON B
Low Keyed
Values Quiet
Responds more favorably to women than men
Prefers Walks through Park
Hates reading/hearing about all the "blood & gore "- the accidents/murders

Figure 5     What is News and Information?

*"It's more than just an article – A story with a title and keywords"*

The Source
- Biases
- Credibility
- Experience
- Education
- Affiliations

Educational Aspects
- Learning/ Learning
- Messages
- Guidance
- Educational value

Multi-Sensory
- Visual
- Audible
- Tactile

The Article, News Clip, Item Itself
- Title, Abstract, Author, Publication - common descriptors
- Industry Standard High Level Meta-Data
- Story Itself - People, Place or Thing - an event, action
- Photographs, videos, images
- Interpretations, Opinions
- Facts & Figures/ tables & drawings

Boiled Down Information
- Core ideas
- Key points
- Brief summary

Target Audience
- Spheres of Interest
- Whom might be interested
- Age group

Psychological Aspects
- Uplifting or Negative
- Effects

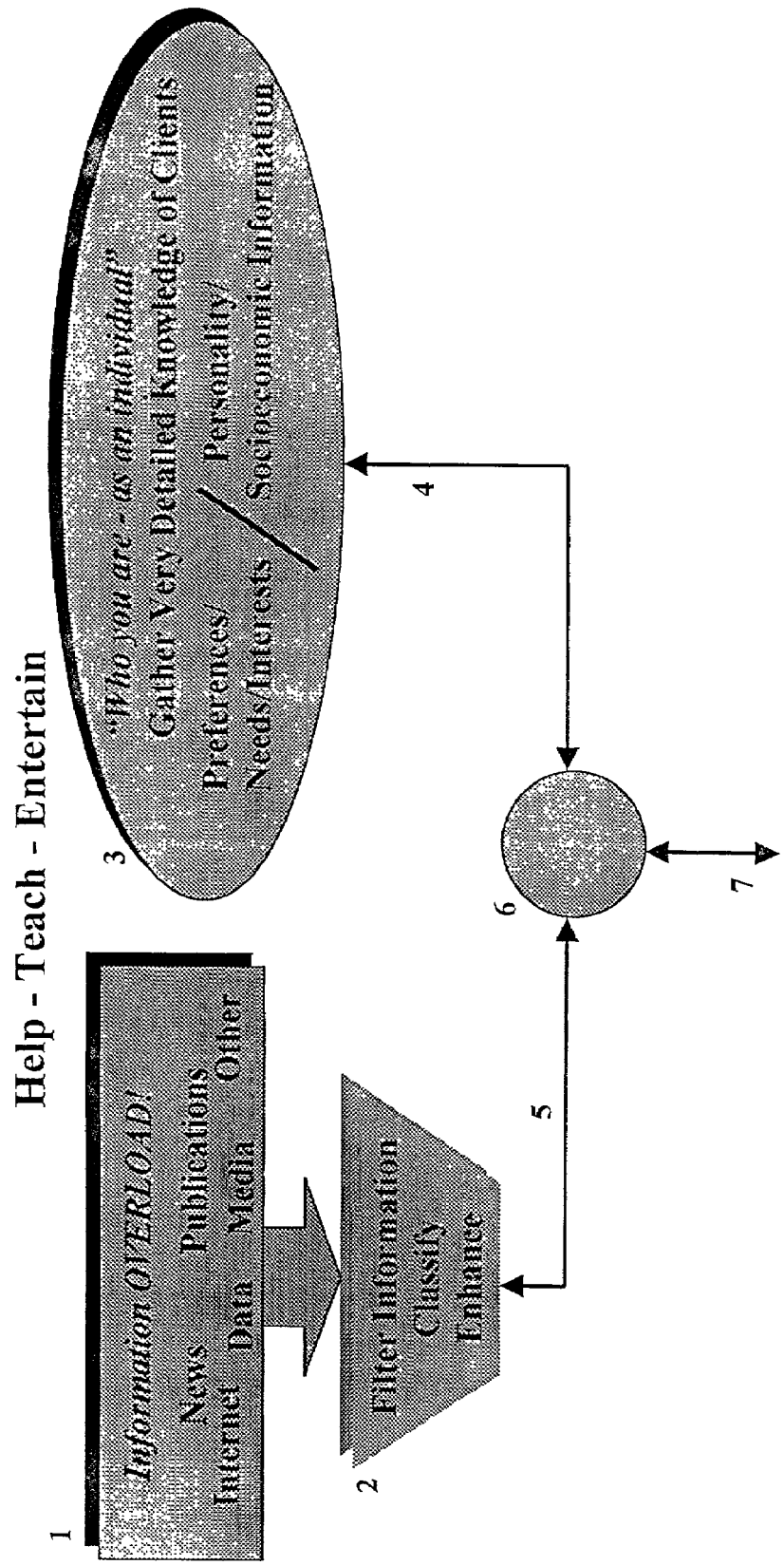
Figure 6  System/Goal - 50,000 foot view

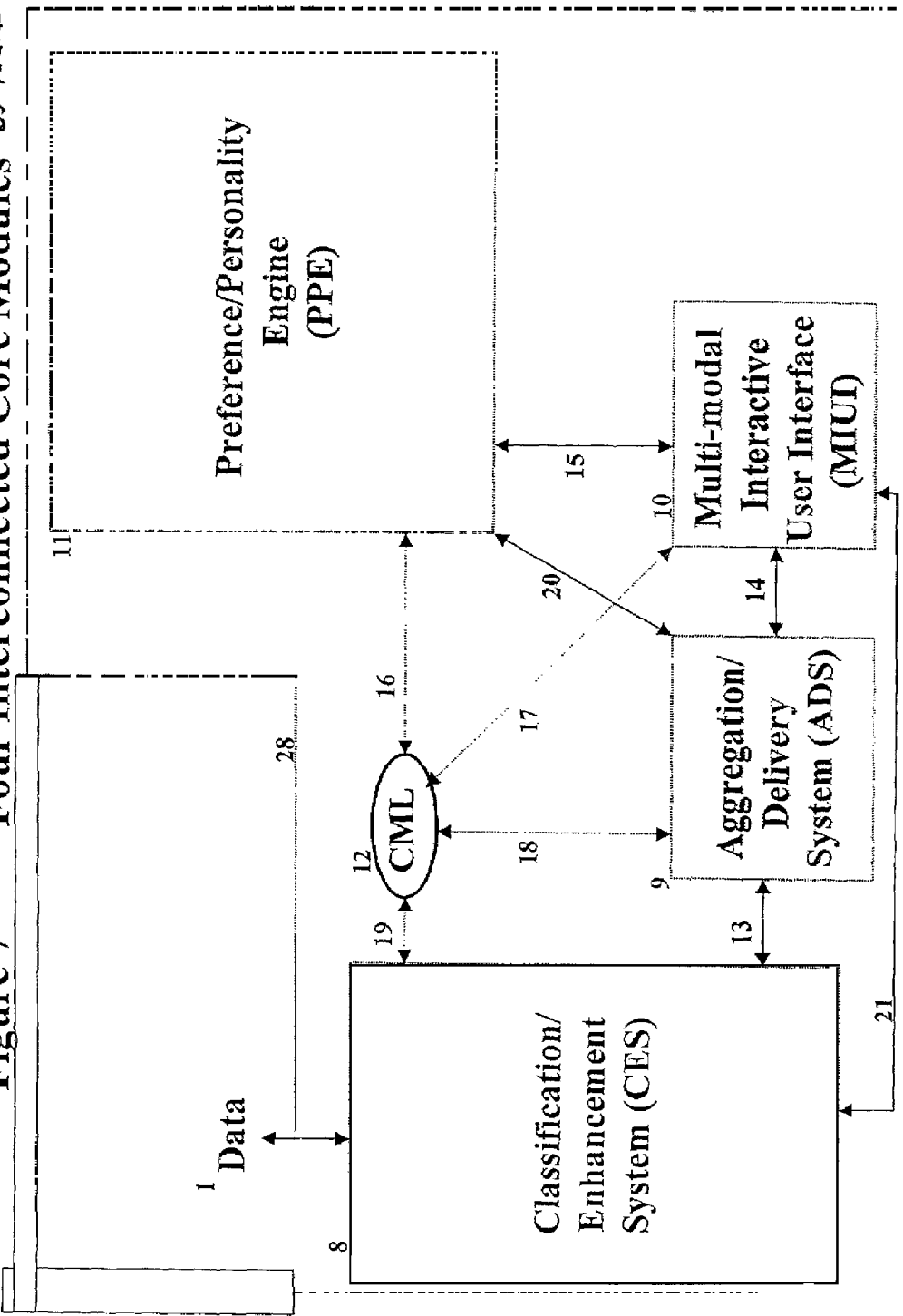
Figure 7 Four Interconnected Core Modules of ACAS 28

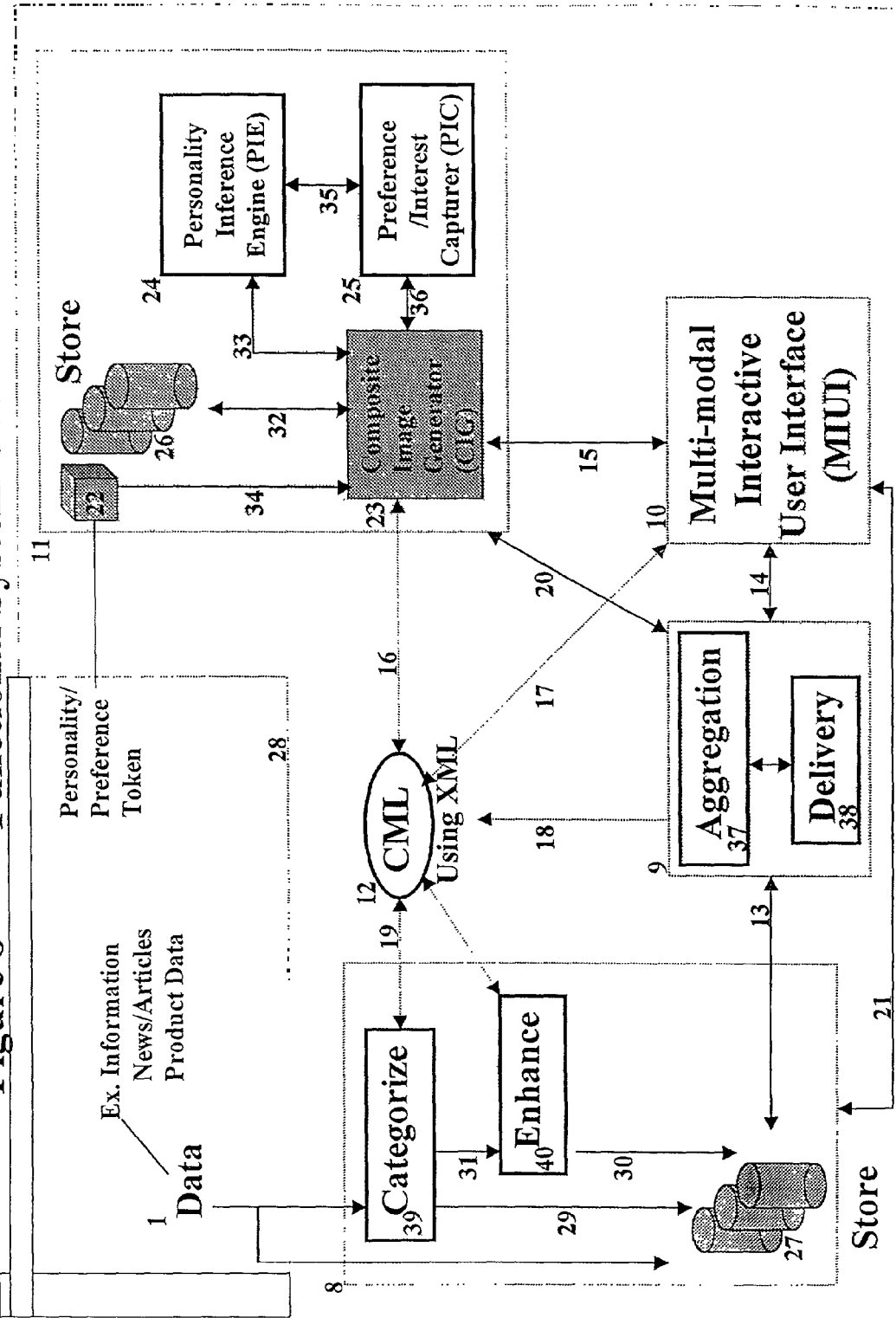
Figure 8 Functional System Overview

Figure 9 Example Real World Operational Scenario
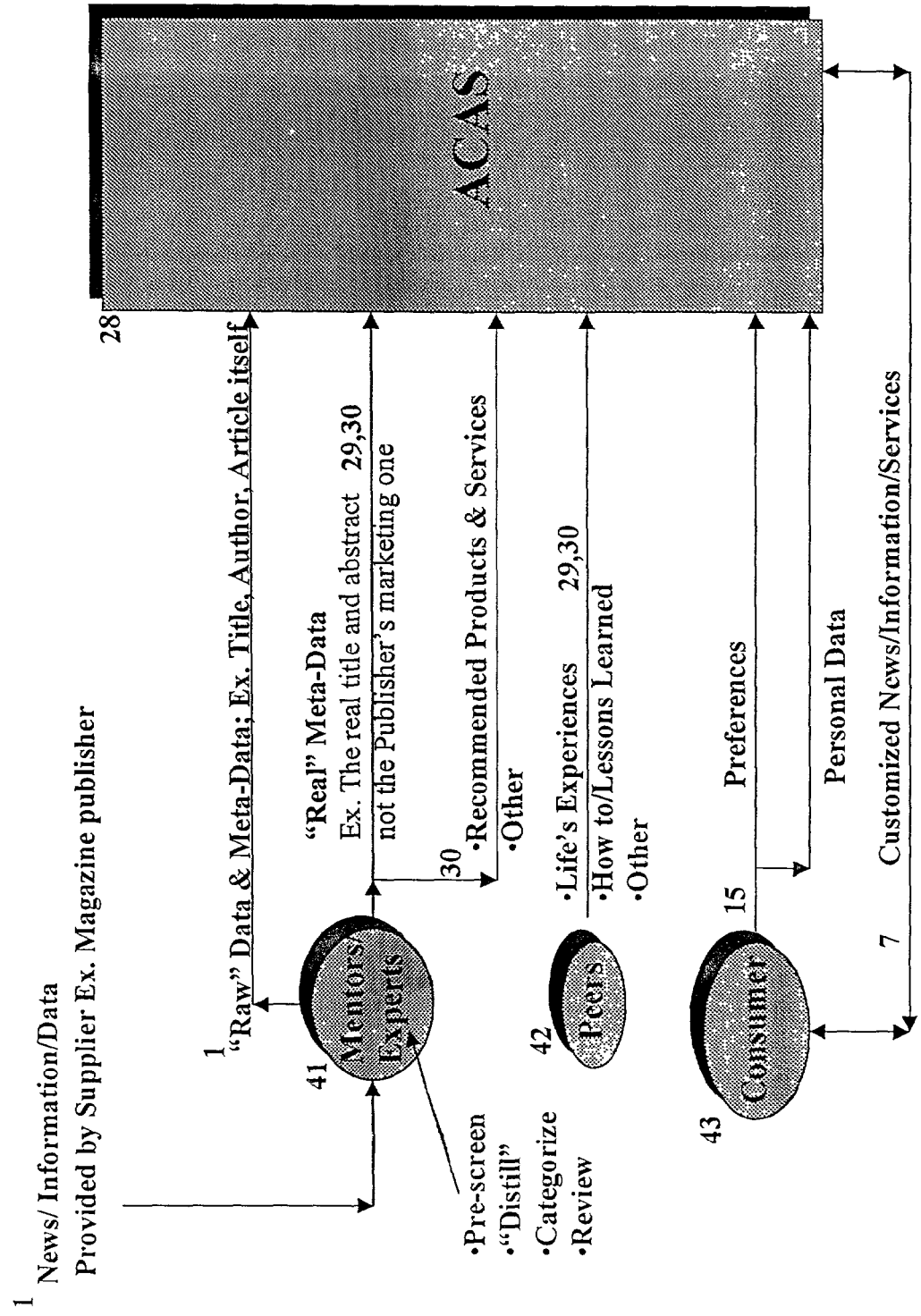

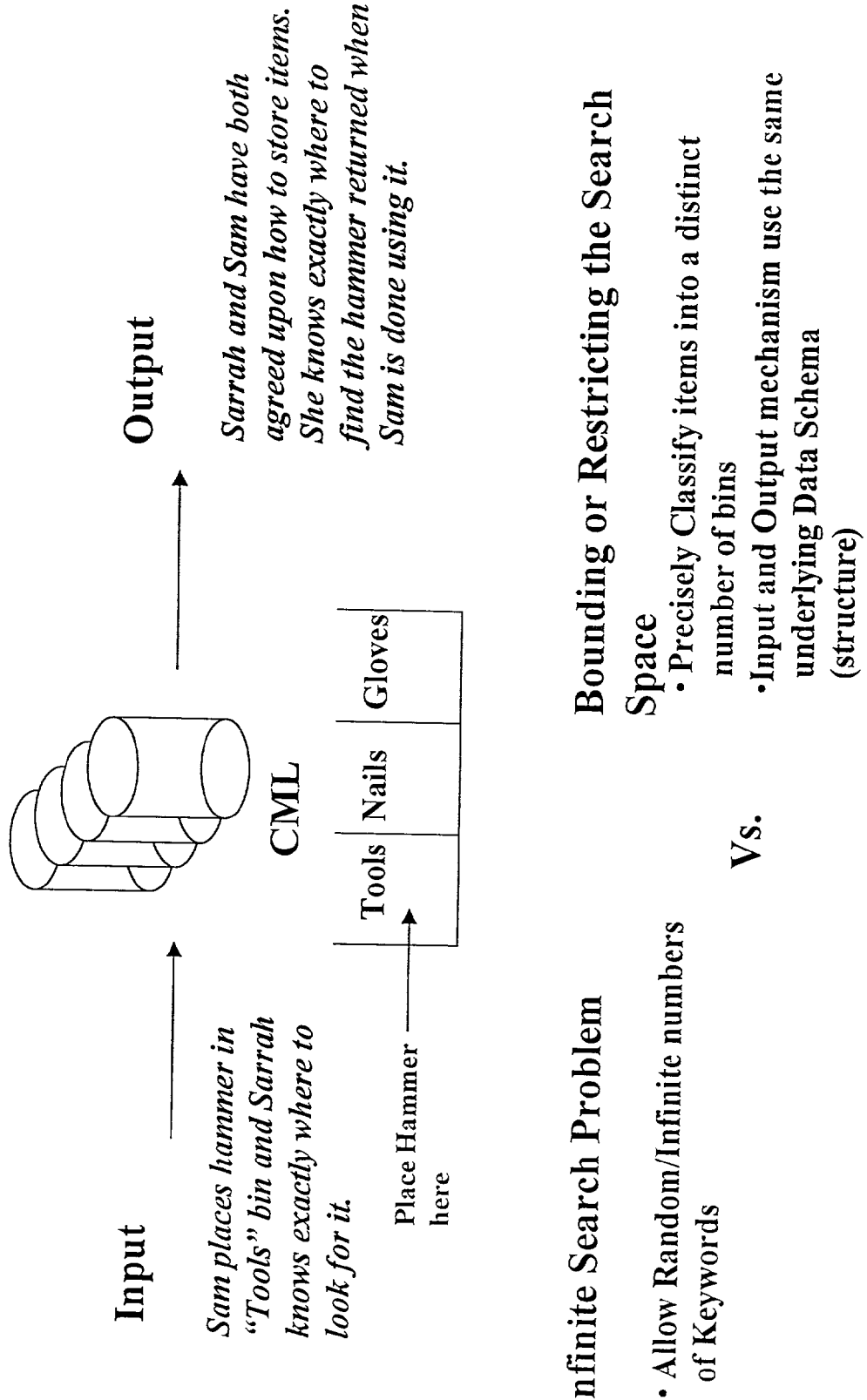
Figure 10 Input & Output Must Match/ Bound the Problem

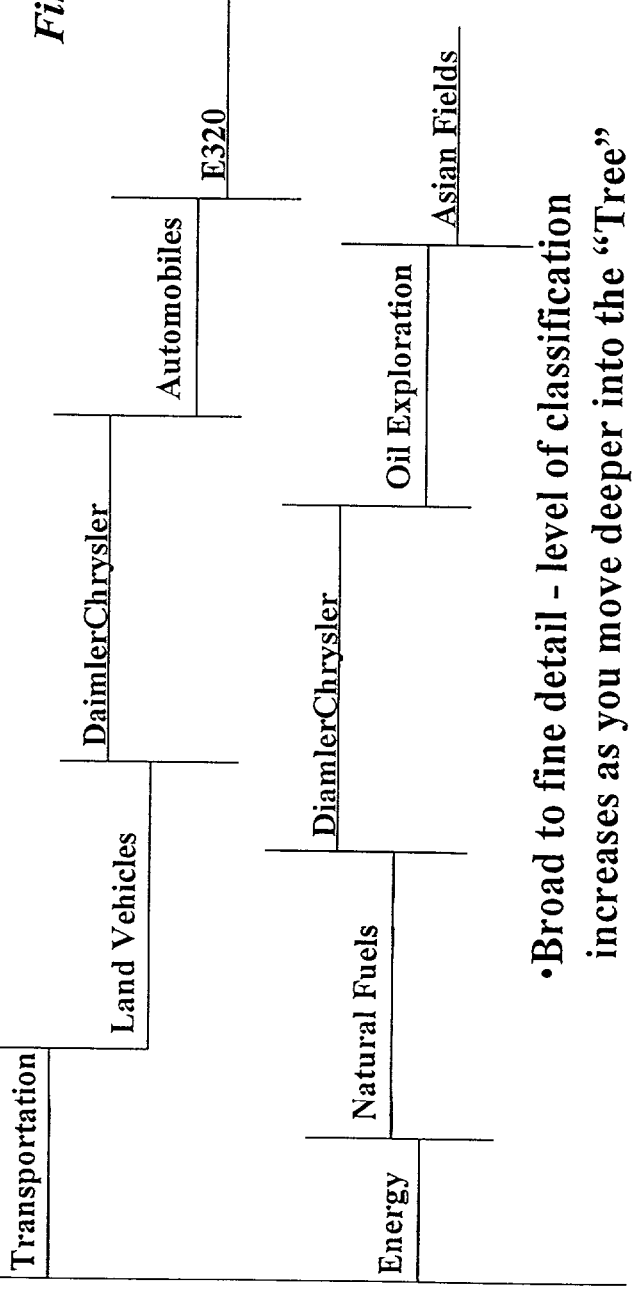
Figure 11   Visual Representation of the CML - The "Tree"

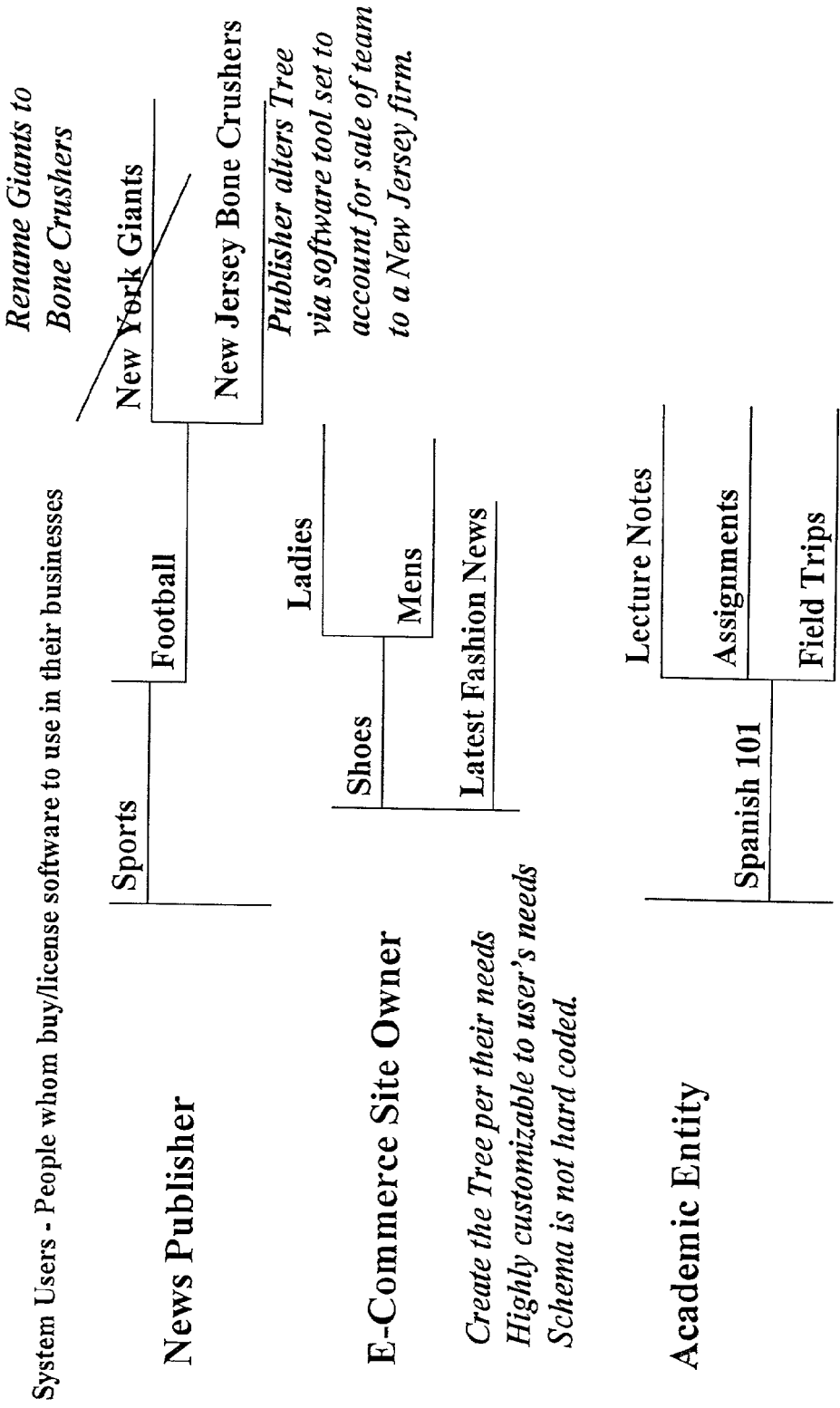
Figure 12    System Users Input CML Structure

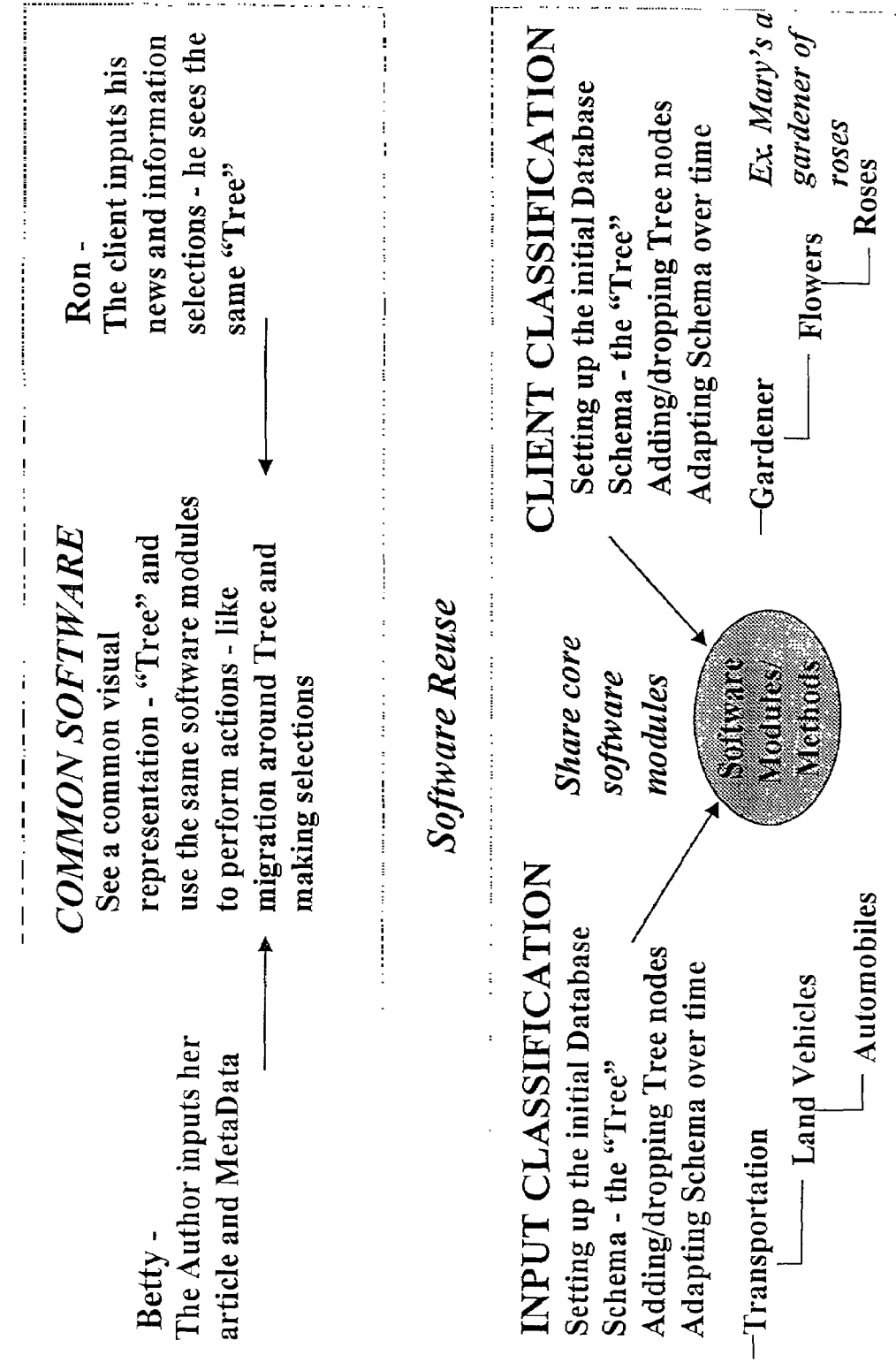
Figure 13 Identical Visual & Set Up/Adaptation Mechanisms

Figure 14 Add/Drop of Database Nodes is Automated
- No changing code
- No operator intervention
- System users make alterations via software
- Software allows for Adding and Deleting categories, leaves, branches etc. (Nodes) over time
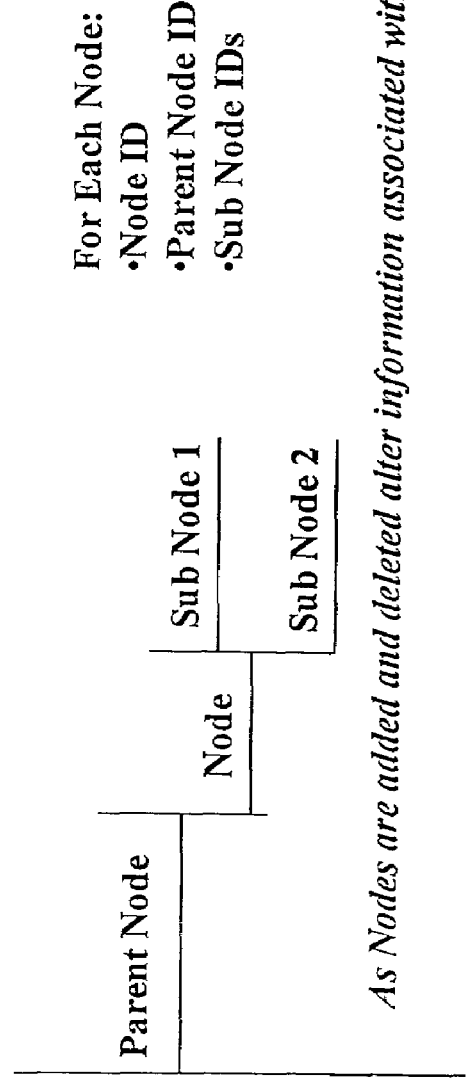
For Each Node:
- Node ID
- Parent Node ID
- Sub Node IDs
*As Nodes are added and deleted alter information associated with given nodes.*

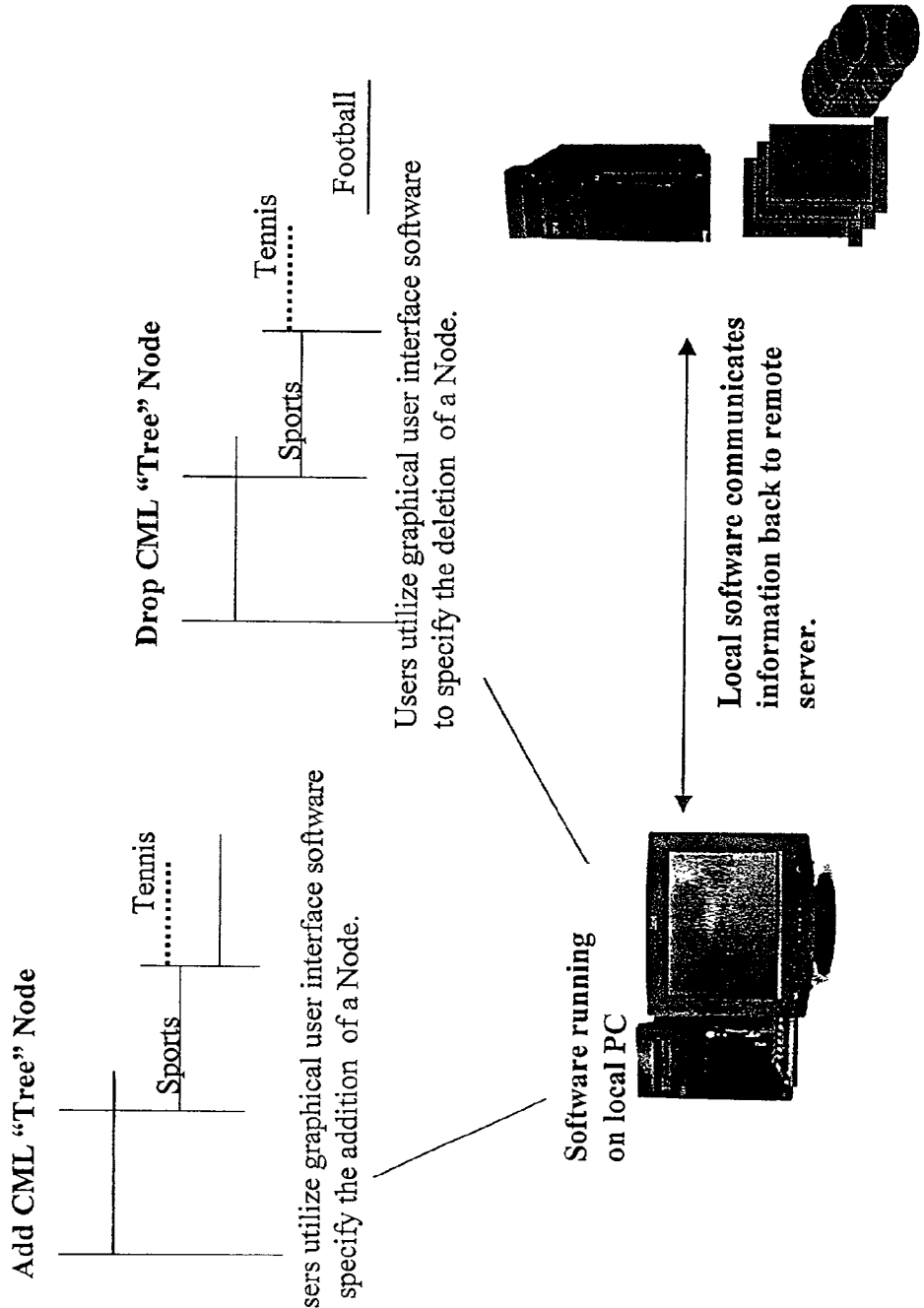
Figure 14A    User adds/drops node from Tree

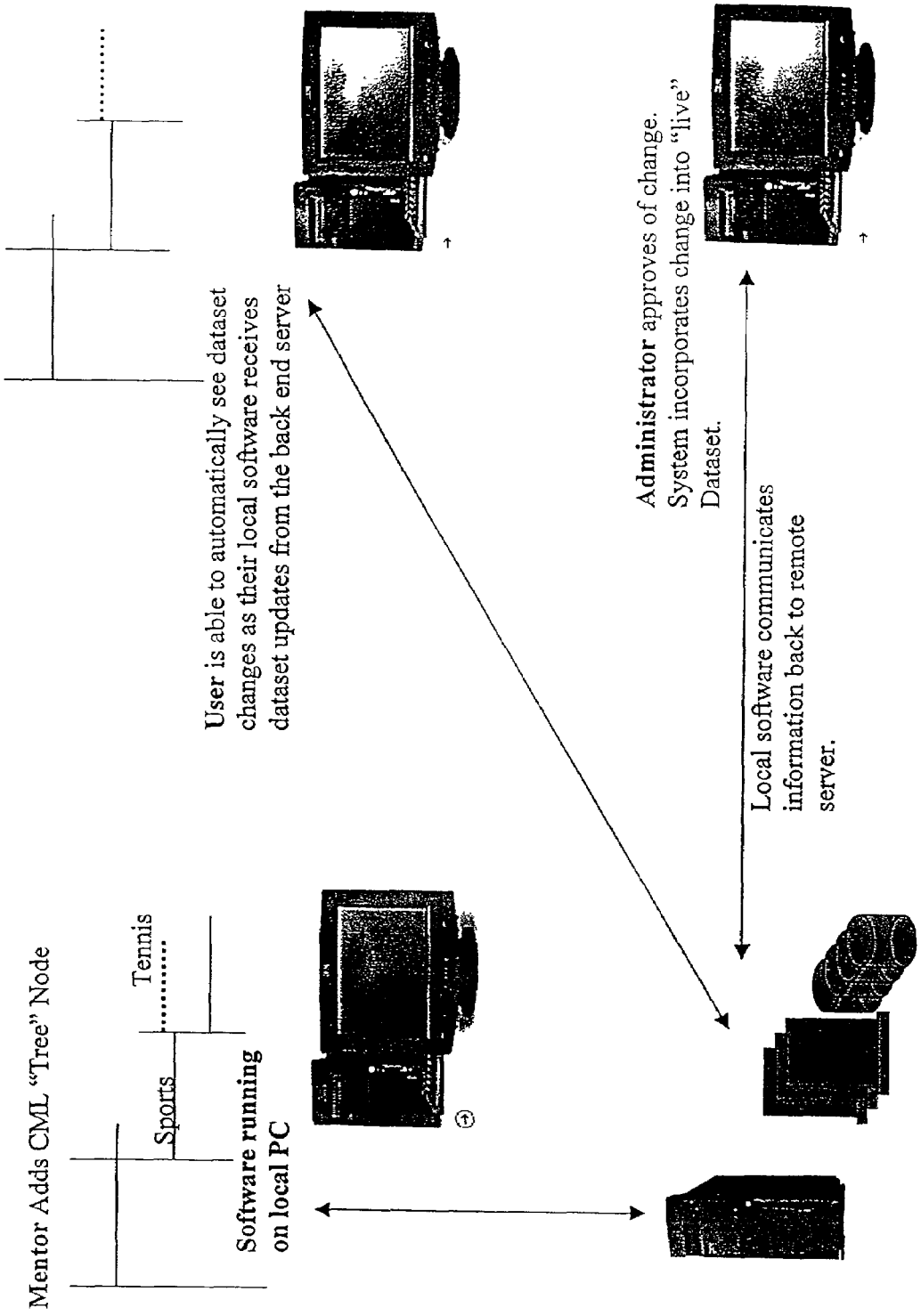

Figure 15  CML is Morphed (Recast) into different Views
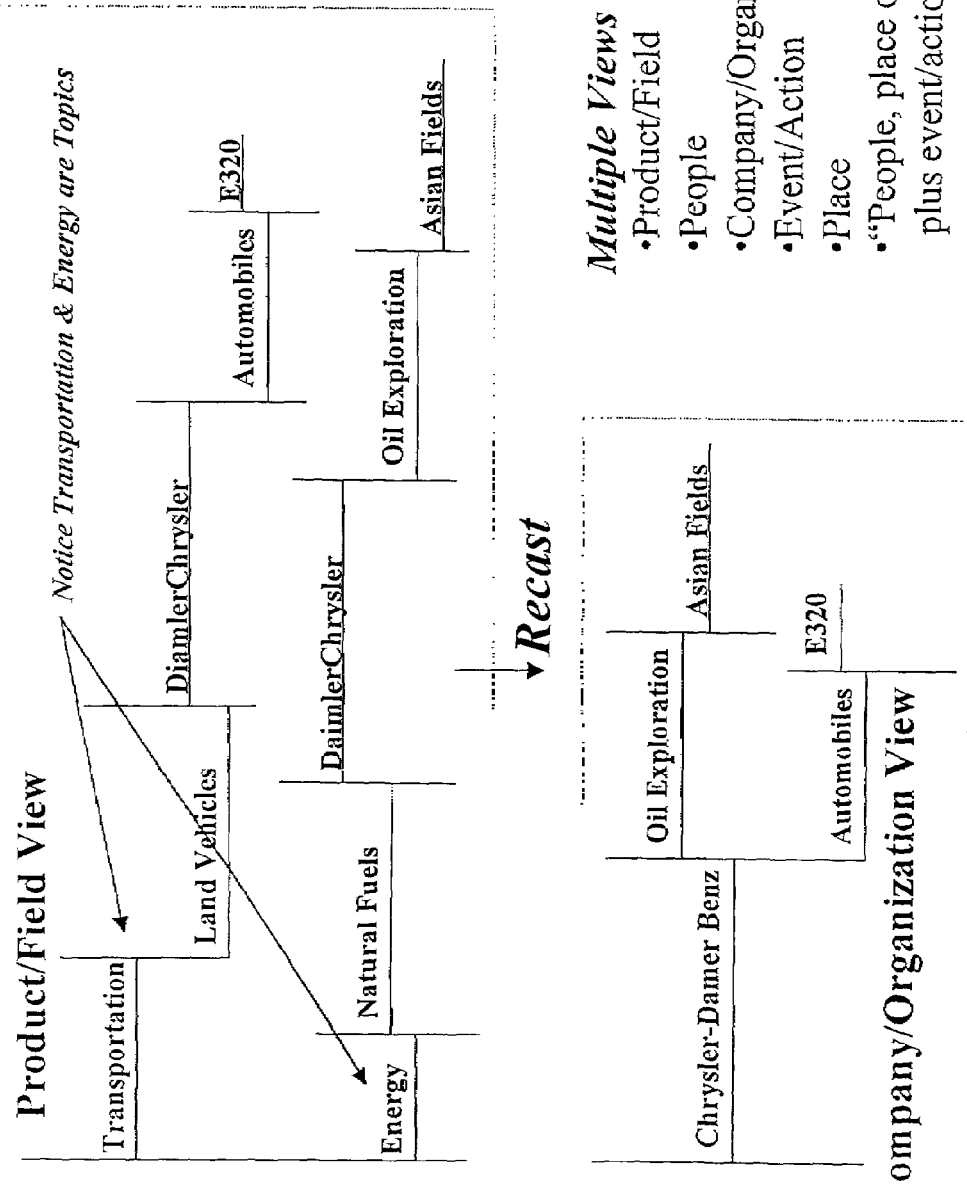

Figure 16 Ability to "Prune" the Tree
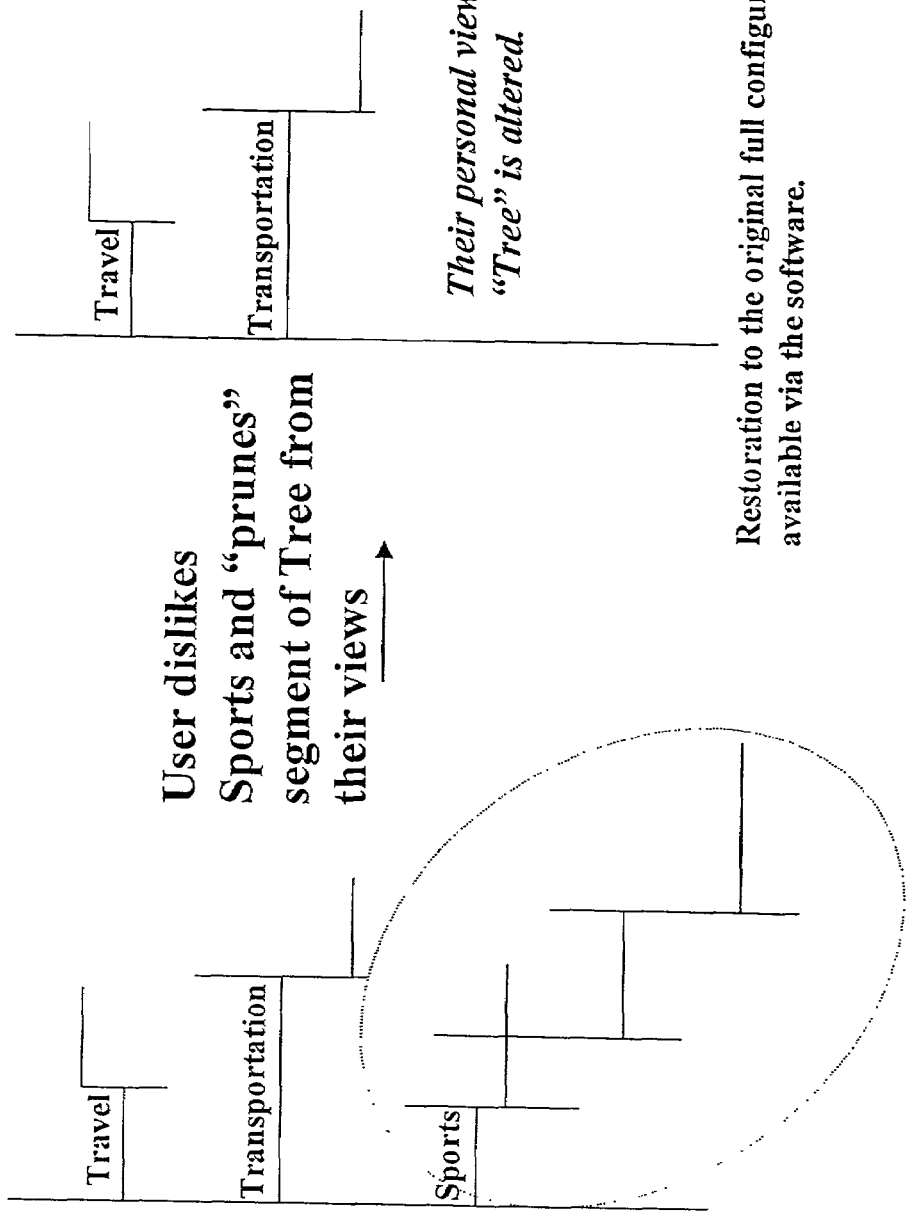

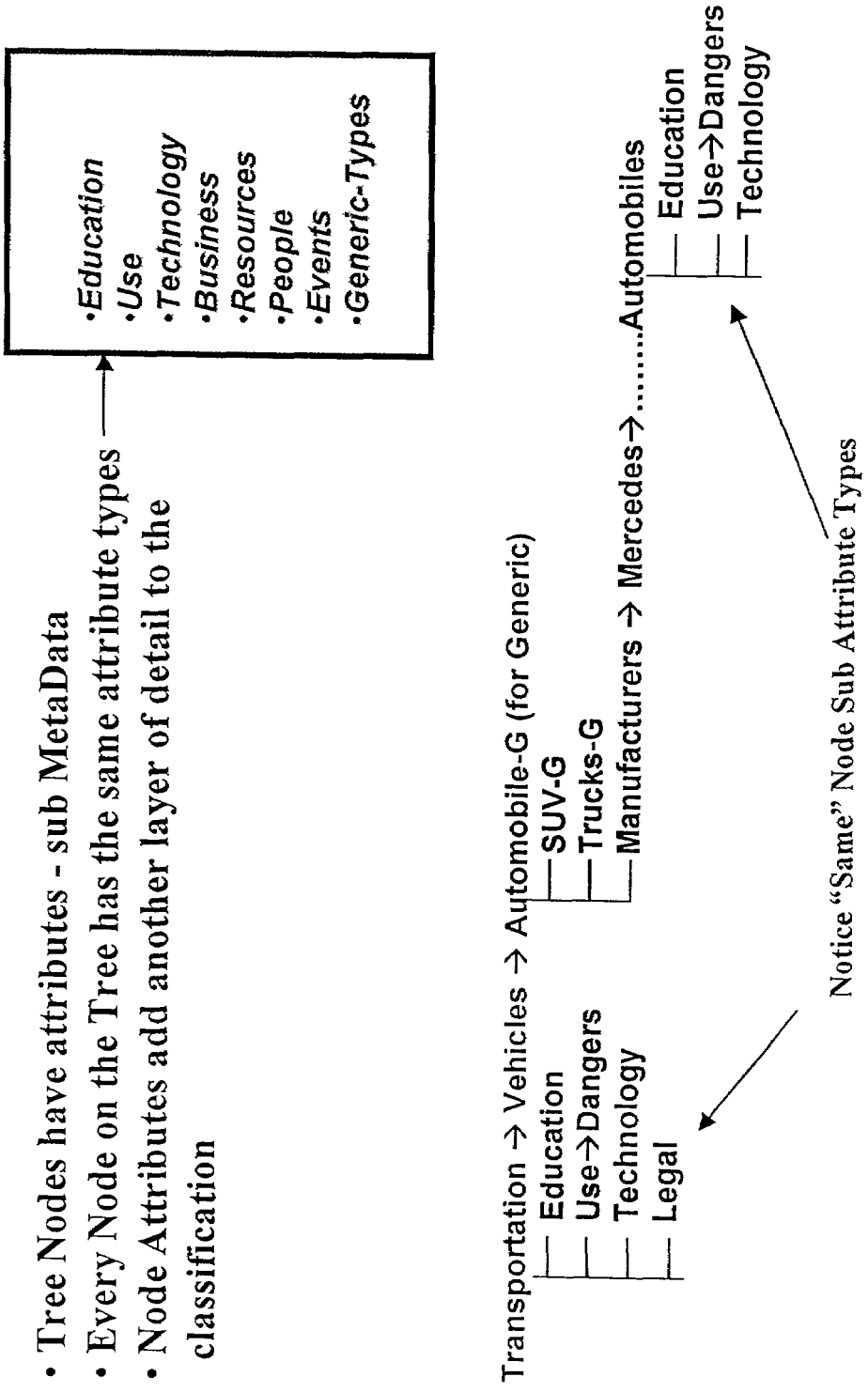
Figure 17 Tree Node Attributes

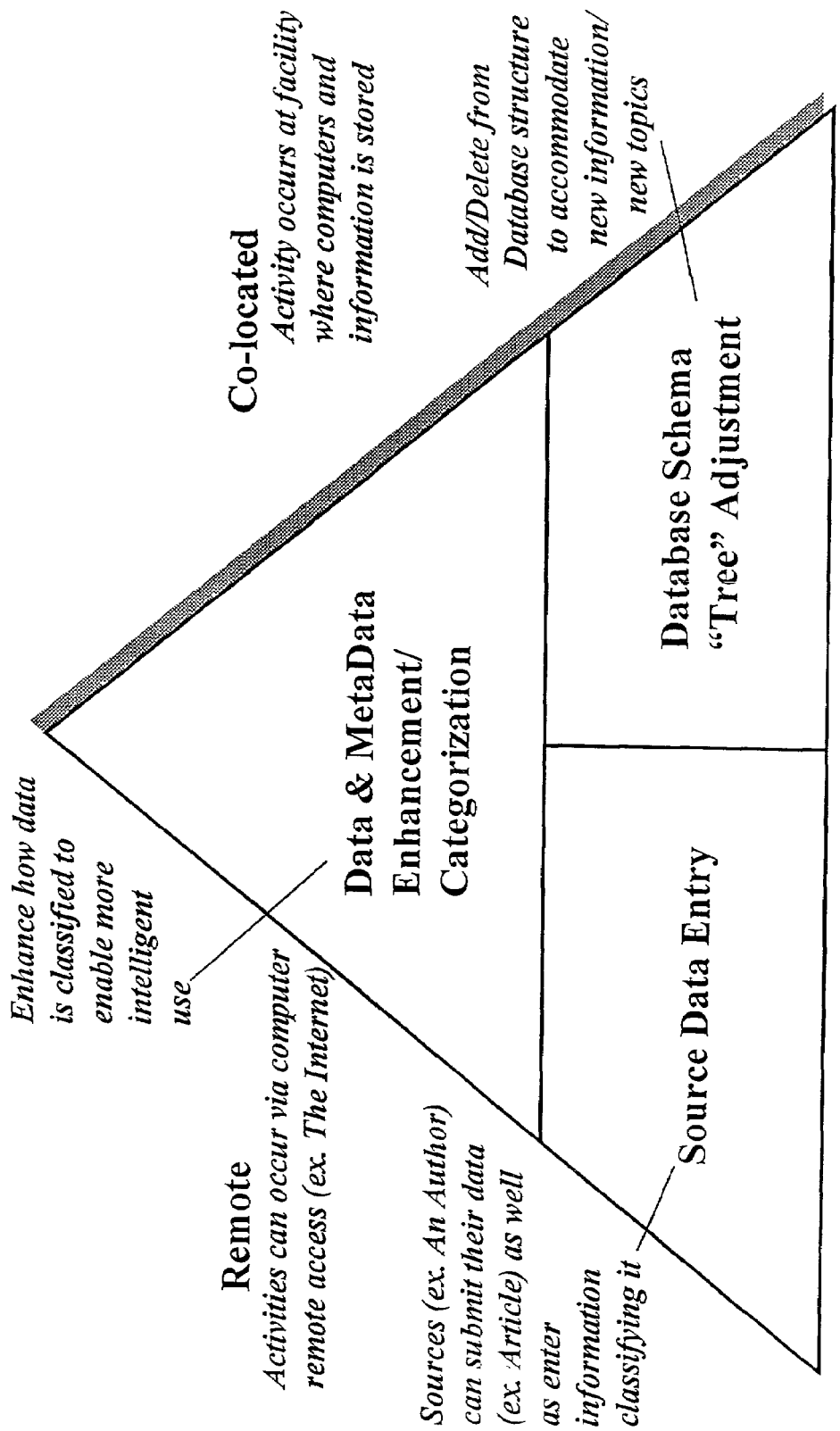
Figure 18    Classification/ Enhancement System (CES)

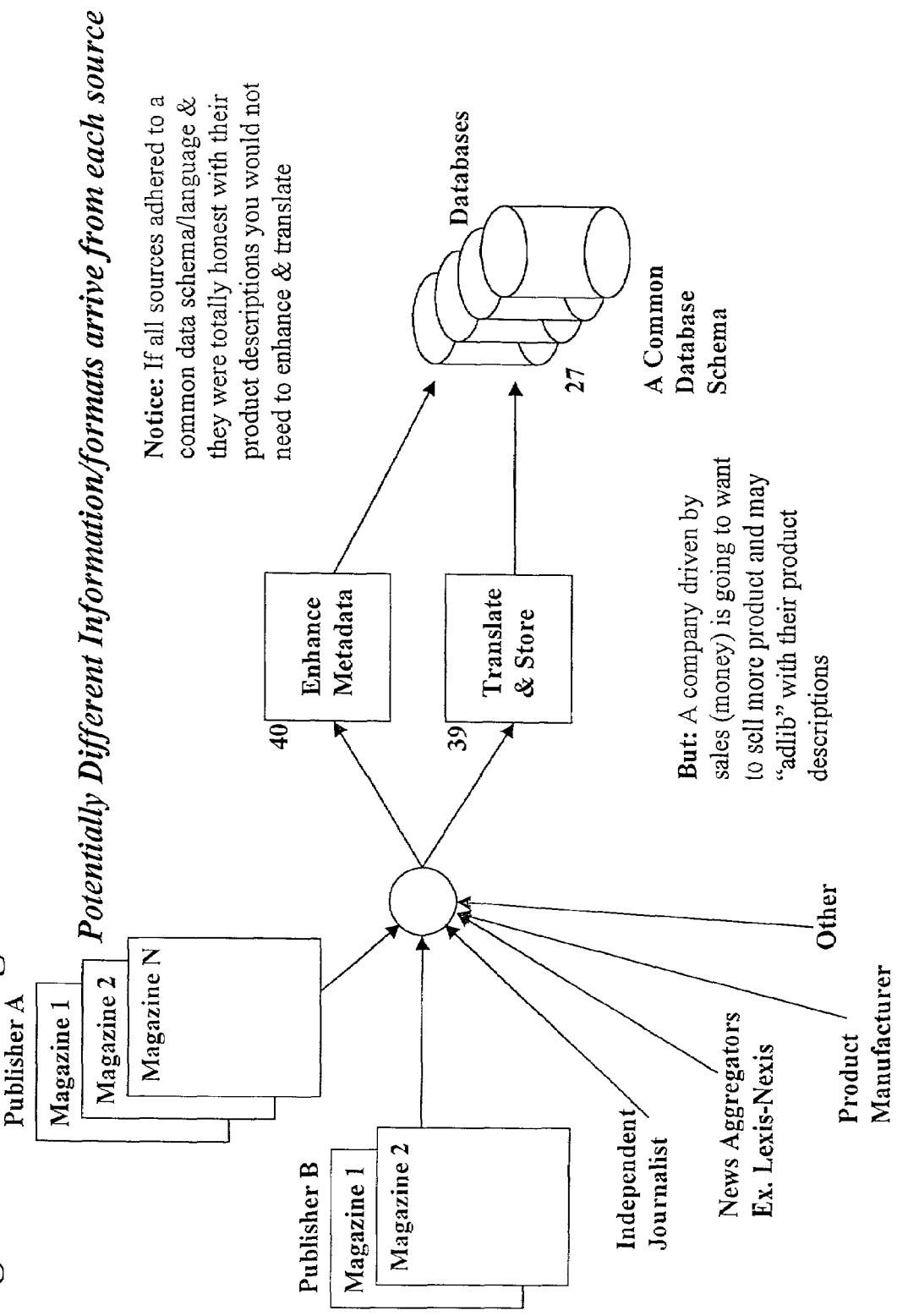
Figure 19  Integrate and Store information from Diverse Sources

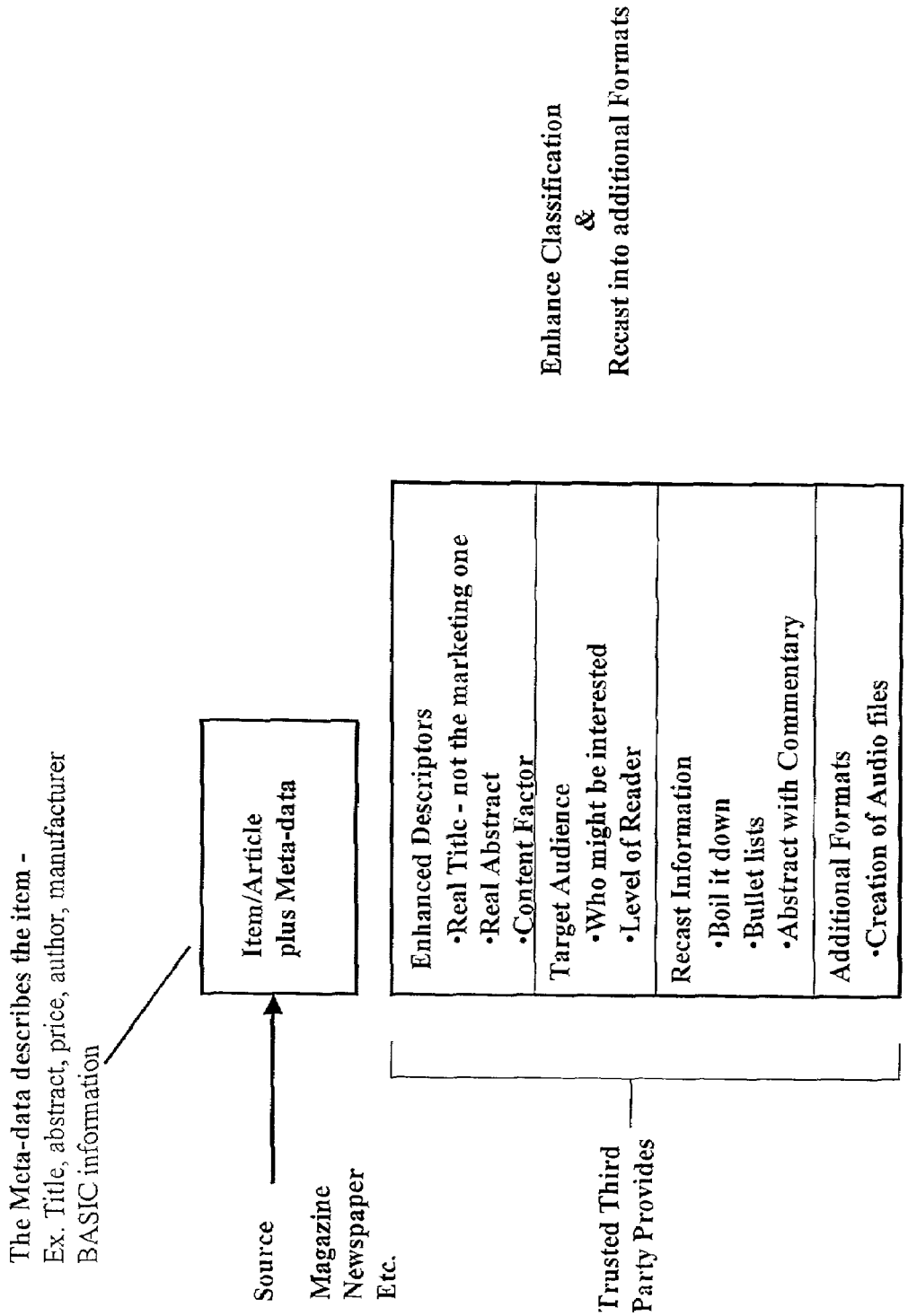
Figure 20 — Trusted Third Party MetaData Enhancement

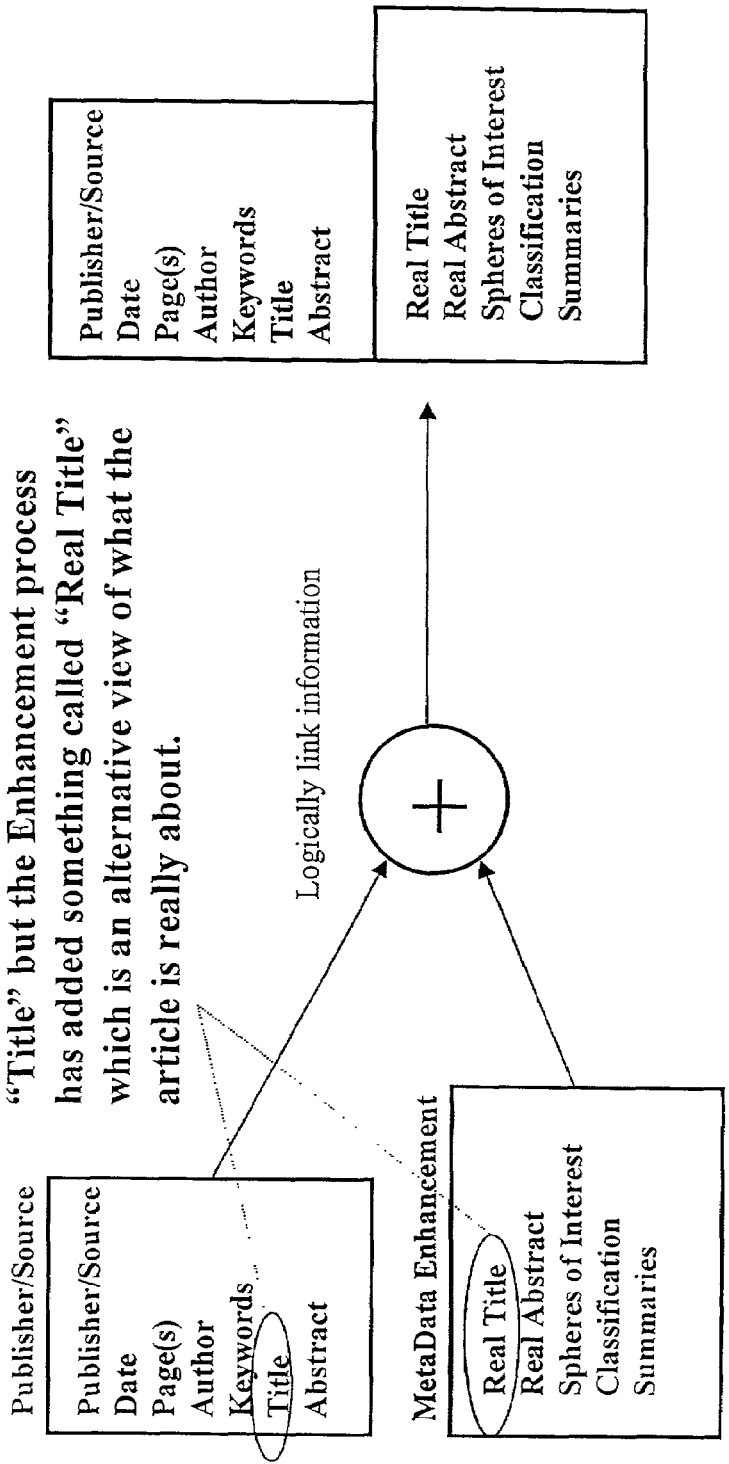
Figure 21   New Interpretations and/or Additions to MetaData

Figure 22  Data Type Feature Set/ Content "Nuggets"

Articles describing Cars typically have a generic set of information

*Horse Power*
*Torque*
*2WD/AWD*
*Number of Doors*
*Hard Top/Soft Top*

→ Identifying and extracting generic information allows for intelligent integration & utilization

*Nancy is looking for 4 door cars with AWD*

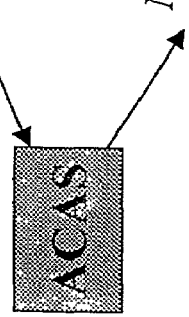

*Nancy receives aggregated information based on generic descriptors*

CES allows identification, extraction as well as entry/capture of information nuggets with subsequent utilization in the aggregation logic.

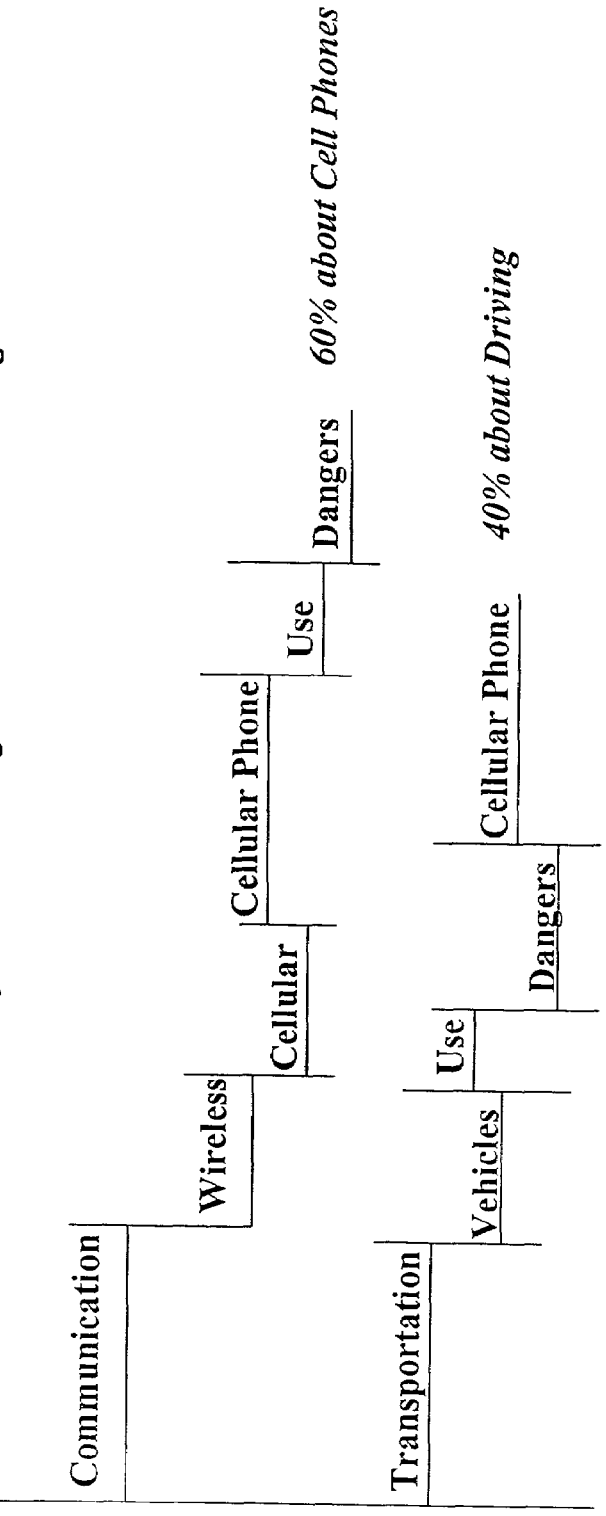
Figure 23  How items (the "things") are classified and entered

Figure 24 Classification Examples

Article comparing BMW 528 with E-Class
Transportation→Vehicle→Manufacturers→Mercedes→Automobiles→E-Class 50%
Transportation→Vehicle→Manufacturers→BMW→Automobiles→E-Class 50%

Article on the US Navy Seals; training and operations
Governments→US→Military→Navy→Seals→Training 50% and
Governments→US→Military→Navy→Seals→Operations 50%

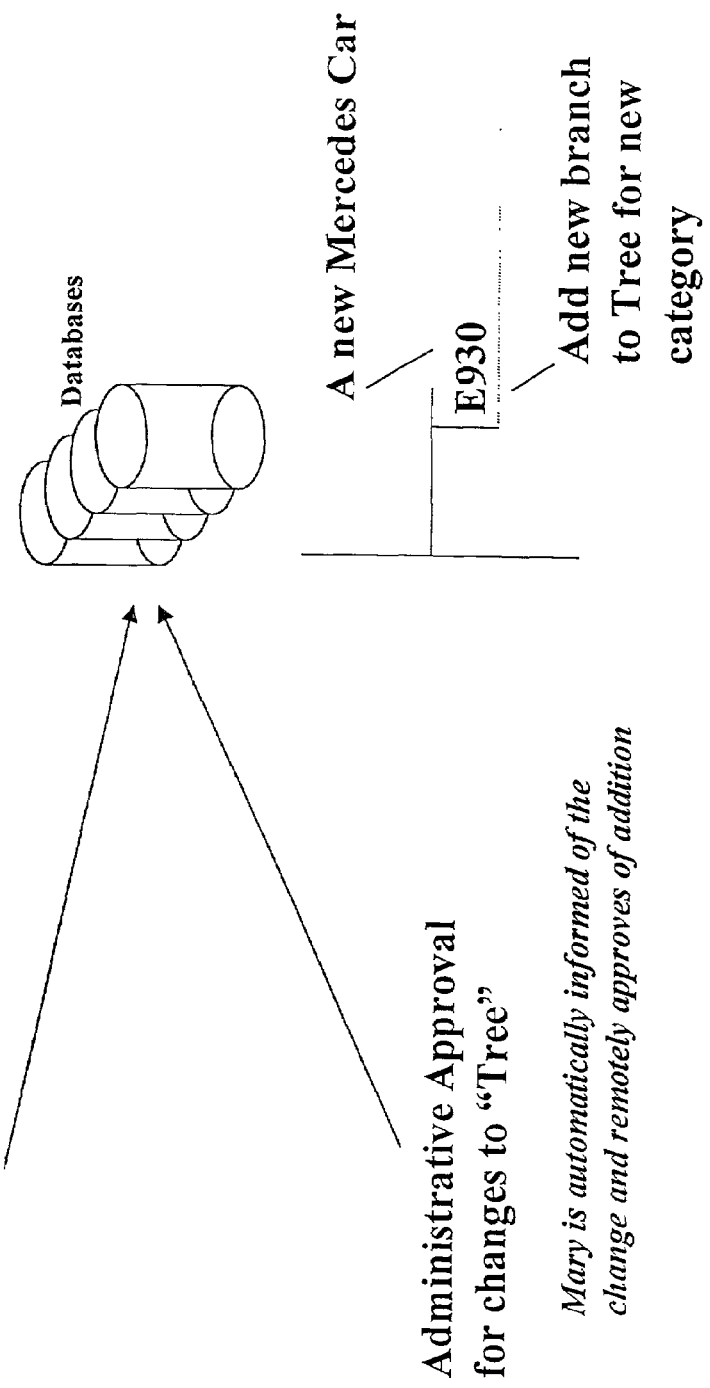
Figure 25  Database Schema "Tree" Adjustment

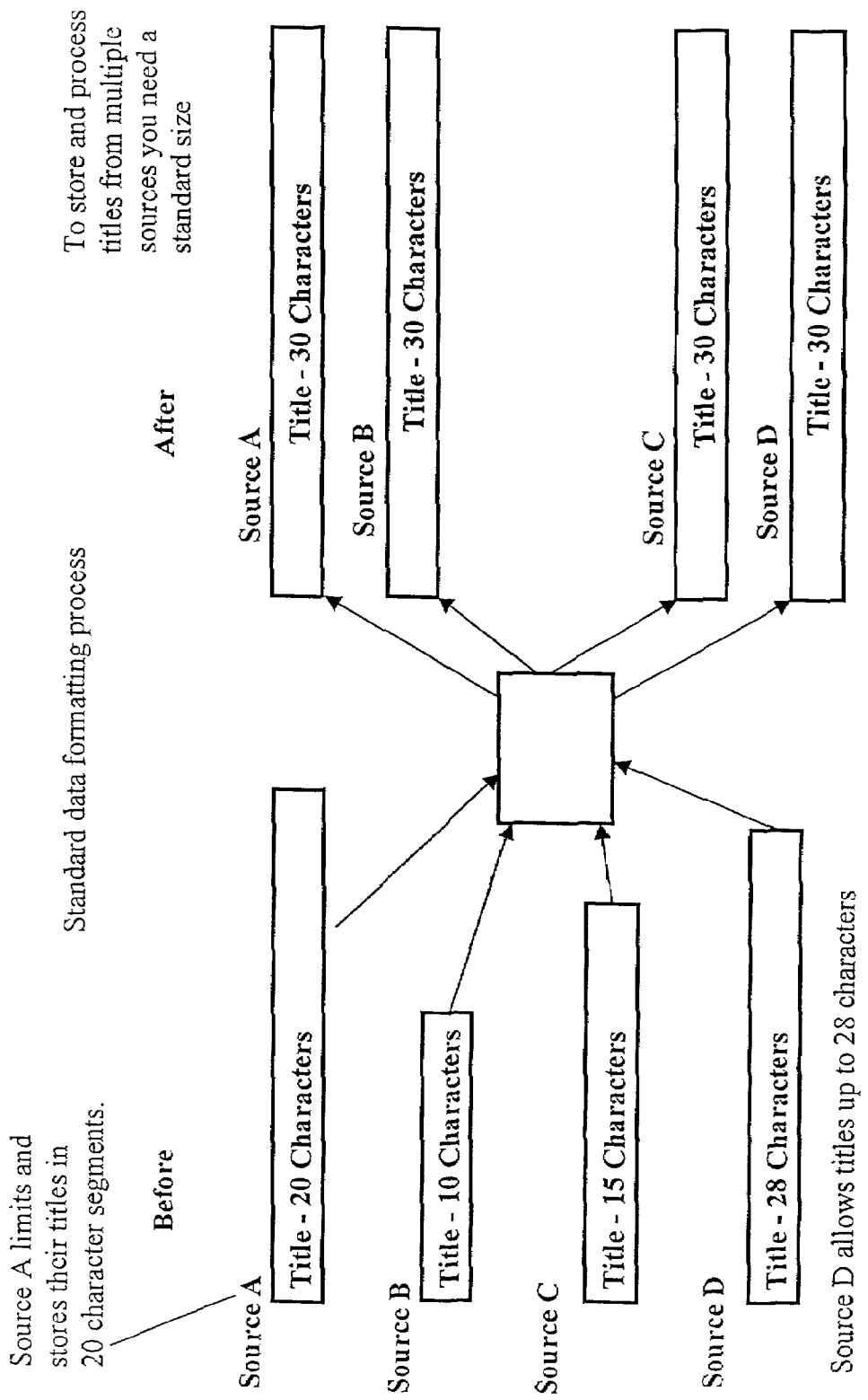
Figure 26 Translation of Meta-Data

Figure 27 Data Source Characterization

Jacky & Nick both write an Article

Jacky has 13 yrs experience, a PhD on the topic and owns a business in the field.

Nick is a reporter with limited background in the subject matter.

A

B

Which article is more valuable?

The background of the author/ source is often overlooked by the general public

CES allows entry/capture of information regarding the source and utilization in the aggregation logic.

*Buck requests articles written by authors with experience >10yrs*

*Buck receives only Article A*

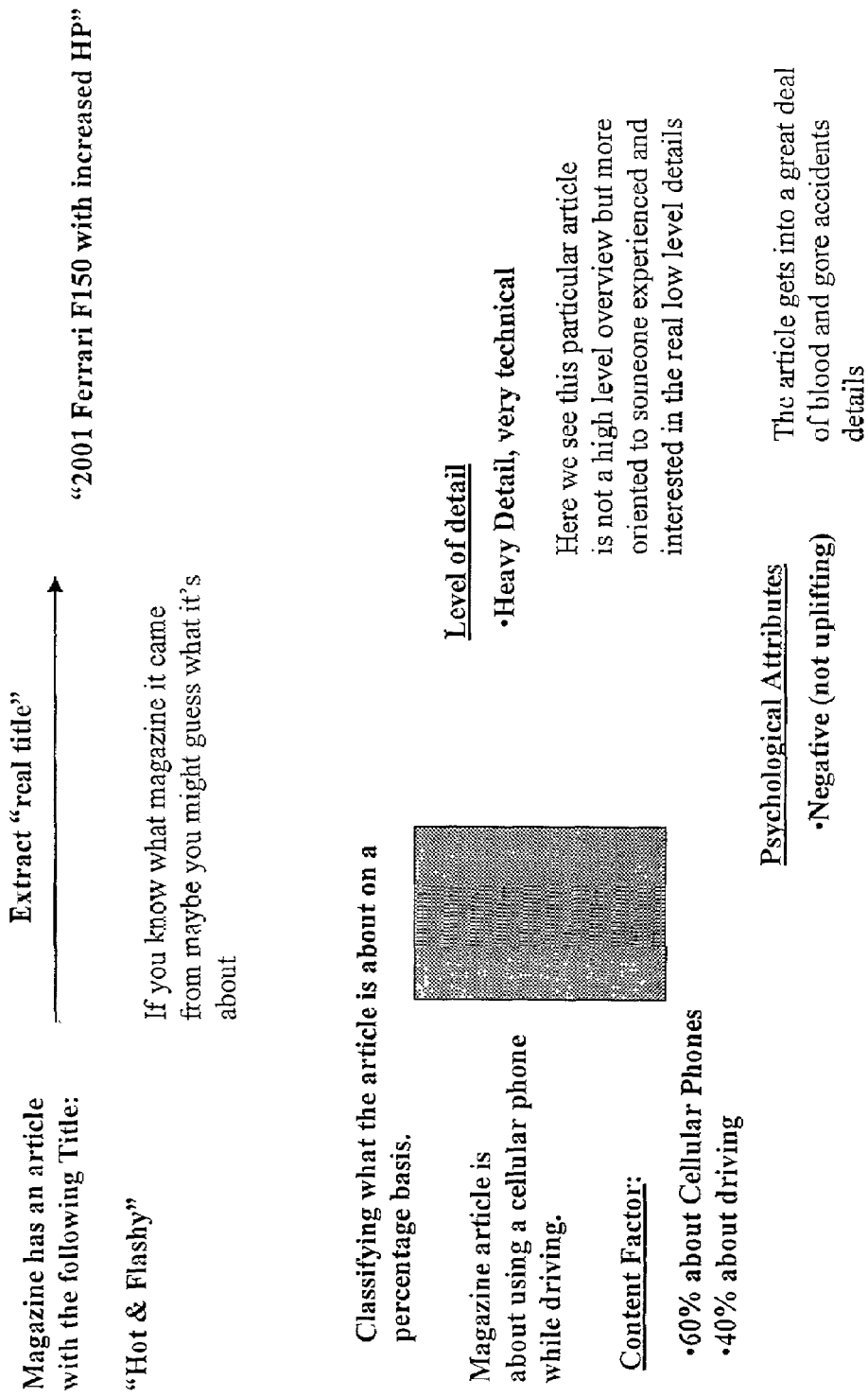

Figure 29 Target Audience Identification

"Hey I thought you might be interested in this article I came across - right up your alley."

Identifying who might be interested in the item.

The general classification of someone potentially interested

Generic Types - Gardener, Skier, Business Person, Programmer, Mother etc.

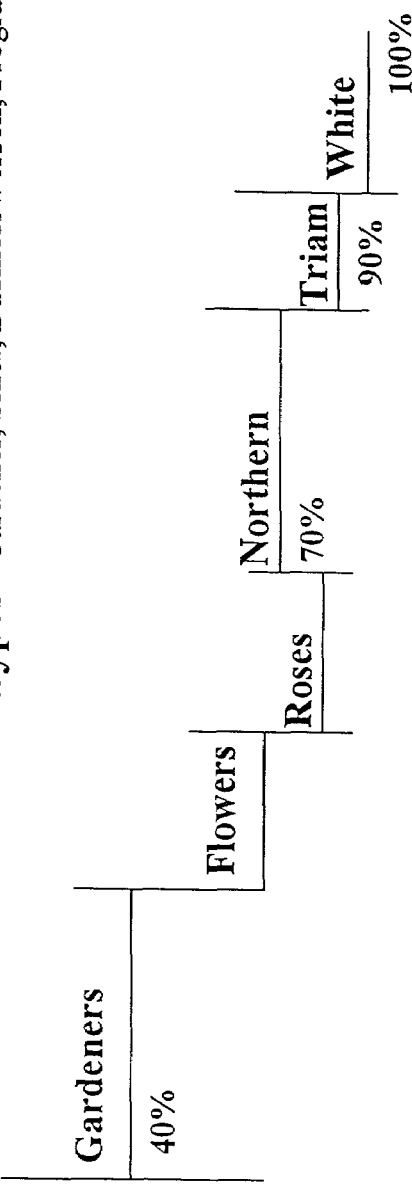

Attributes of the audience -
- Expertise of potential reader - level of understanding
- Experience in field
- Level of detail
- Etc.

The TME process not only identifies "what it is?"/ meta data/ descriptors but whom might be potentially interested in it.

Figure 30 Mentors provide information based on experience

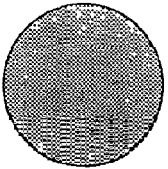

"What's Hot? What's the latest?"

Here-N-Now    What are the latest tools, techniques, concepts, trends in this field?

- Good Books
- Ways to learn - training
- Guidance
- Etc

"How to get started in this field"

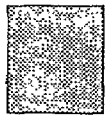

Novice-Guidebook

Ground-Zero "I'm really interested in something but don't know where to start"

If you're a novice or beginner - Why learn from scratch? On your own.

Mind-Basics/Back to the Basics

"Thirty thousand foot view"

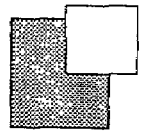

What are the key concepts, facts, tips, and information to know about the topic?

Figure 31  CES Remote Access /Remote Source Data Entry

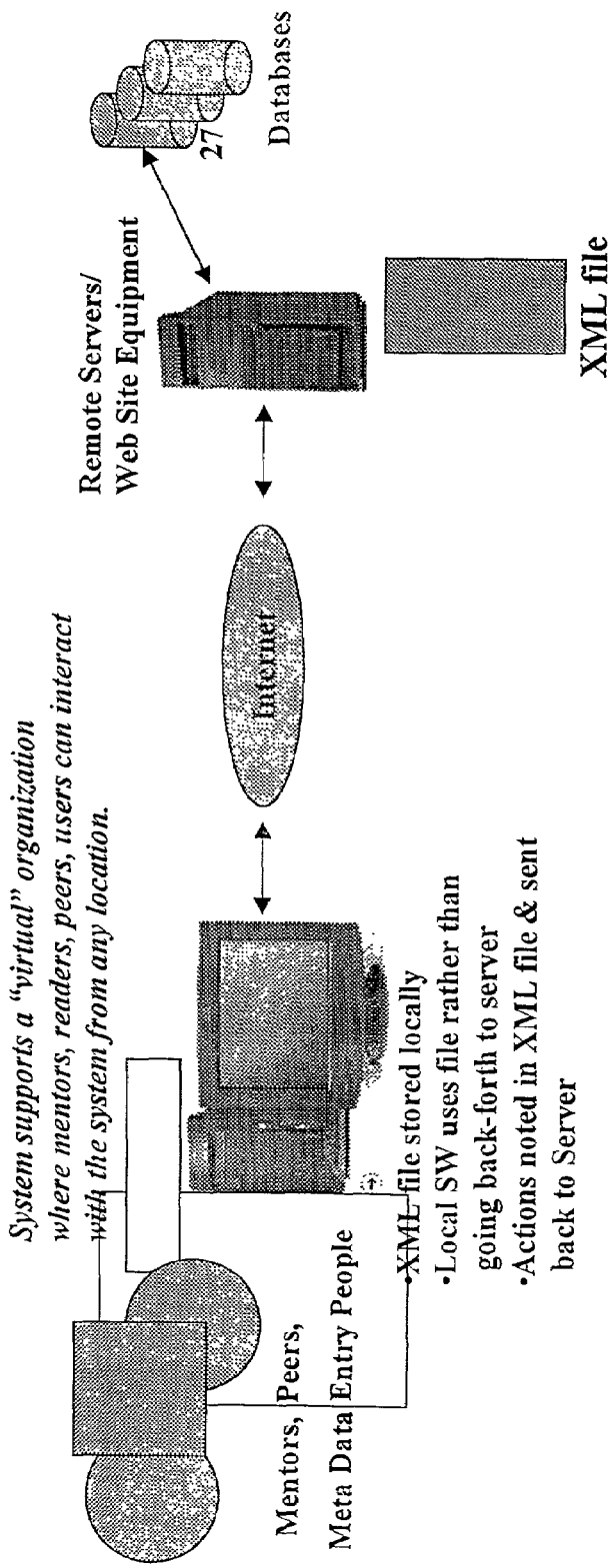

*Author remotely enters classification information/ MetaData as well as the actual material (ex. Article) itself*

*Someone reviewing a collection of articles, generating meta data, and entering it into the web site system can do this from the comfort of their home, or anywhere for that matter.*

*System supports a "virtual" organization where mentors, readers, peers, users can interact with the system from any location.*

- Allows for the originator of the information to specify their interpretation of what it's about, who might be interested in it, key points etc.
- Record the information as the source material (ex. Article) is created.

Figure 32    Adjust MetaData as Information (Item) ages over time

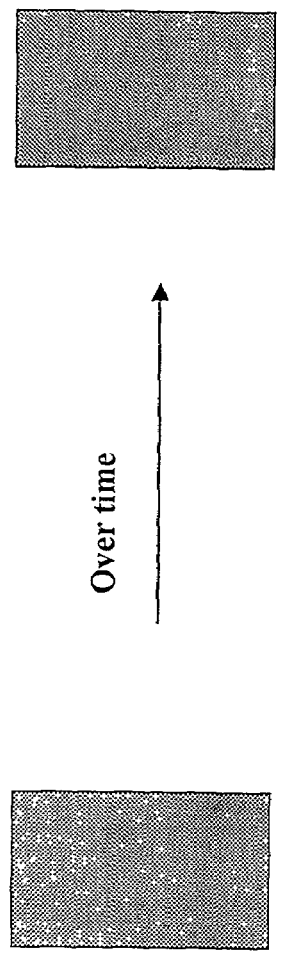

Over time

Article about the State of the Art/ Latest
Database Product from Oracle

Current Meta Data identifies it as:
- New/Current/ State of the Art
- Novel features
- Ease of use factor - complicated right now Current Meta Data identifies it as:
- Last years model
- Features
- Ease of use factor - user friendly dues to increased utilities/GUI/features Meta Data changes over time

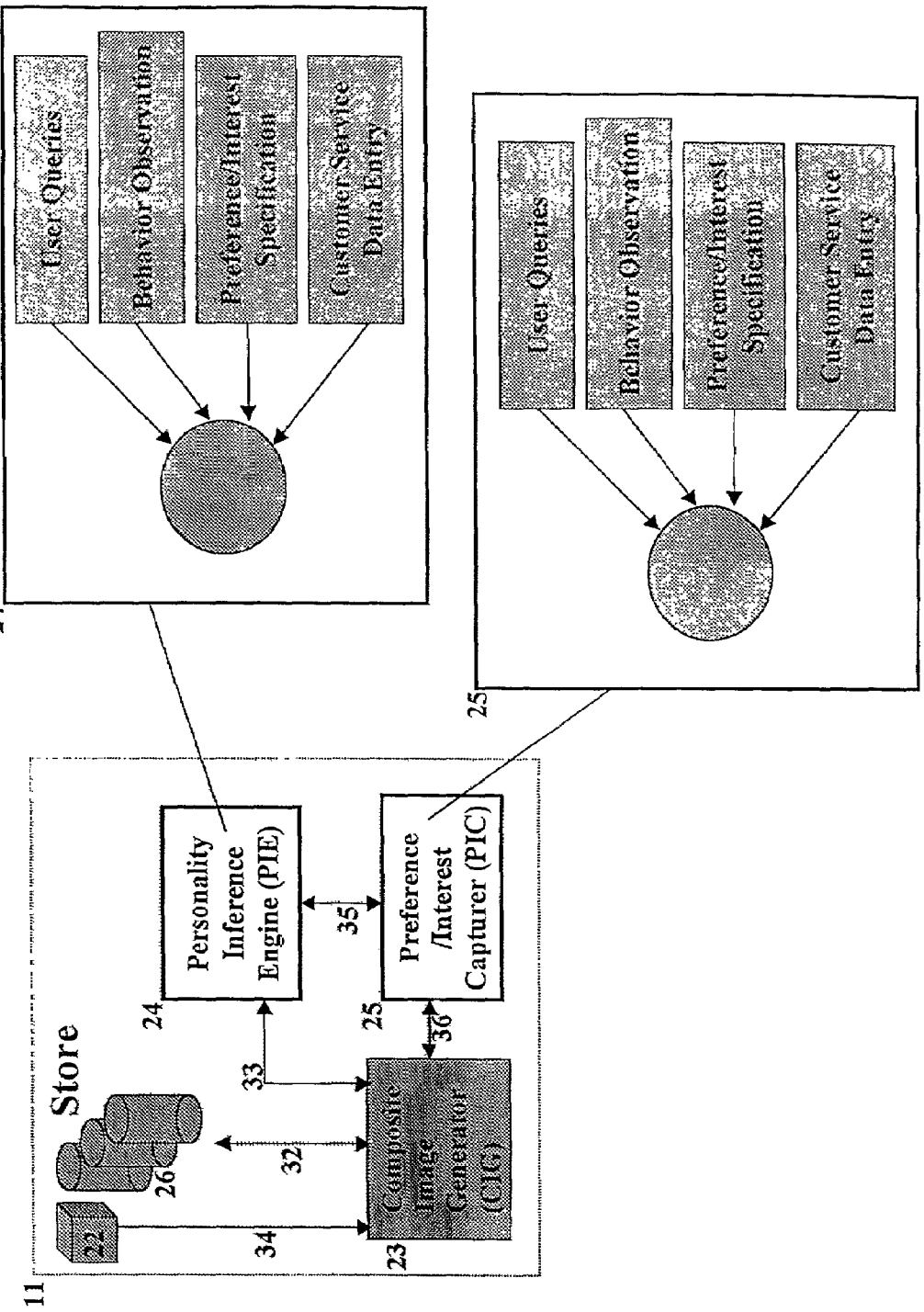
Figure 33    PPE Information Gathering

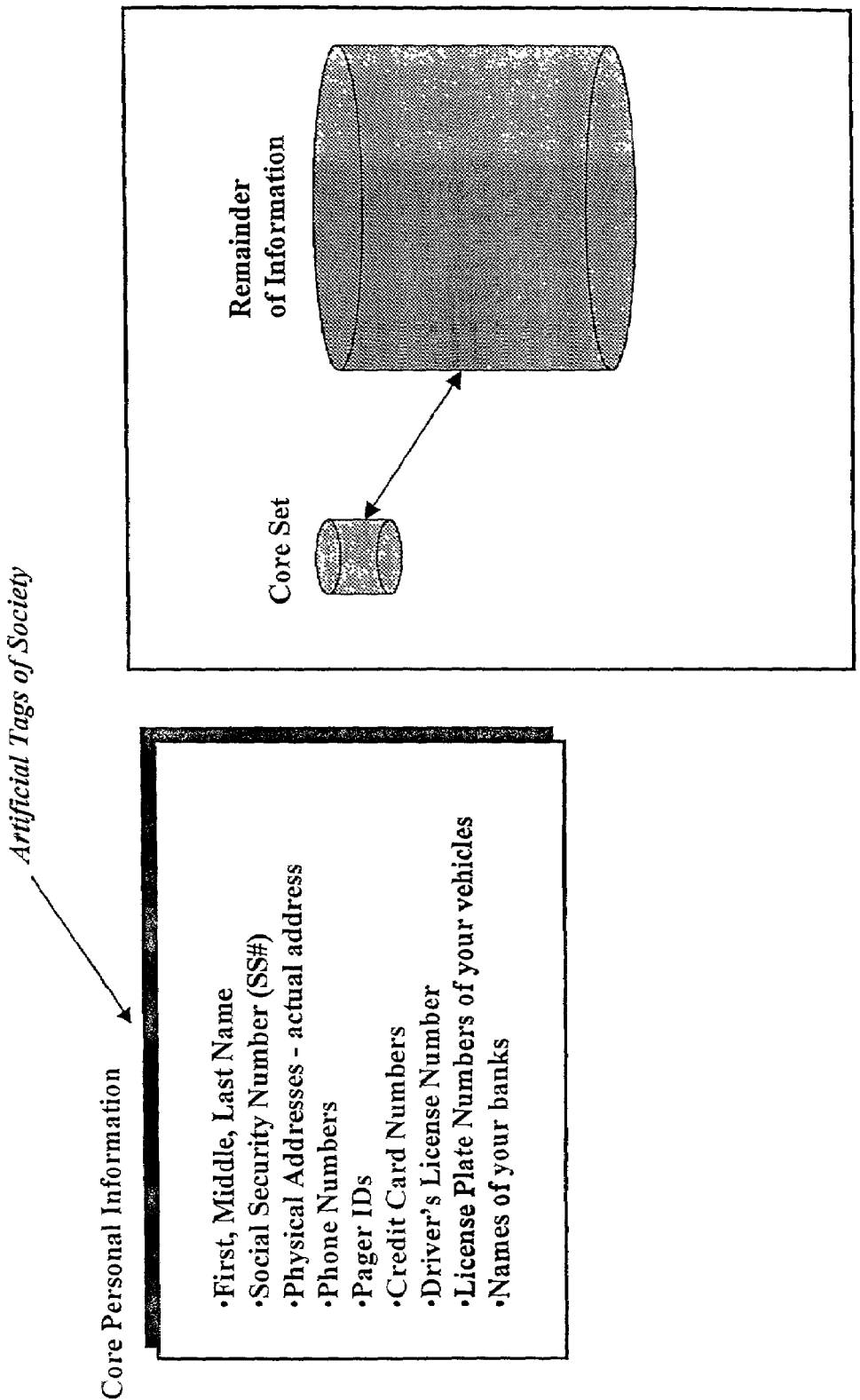
Figure 34  Core Set - Societal Tags

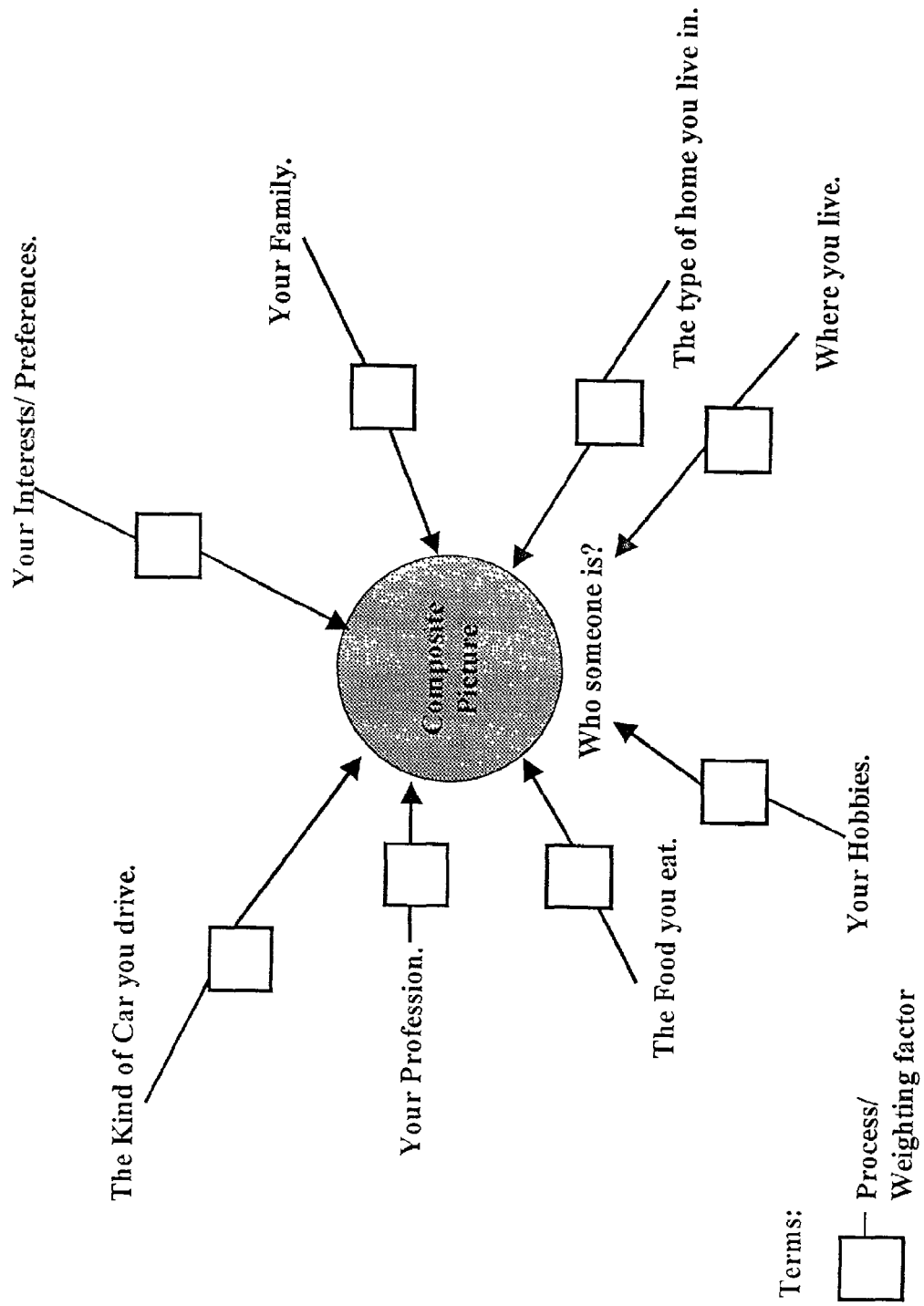
Figure 35  Information is Processed and Incorporated

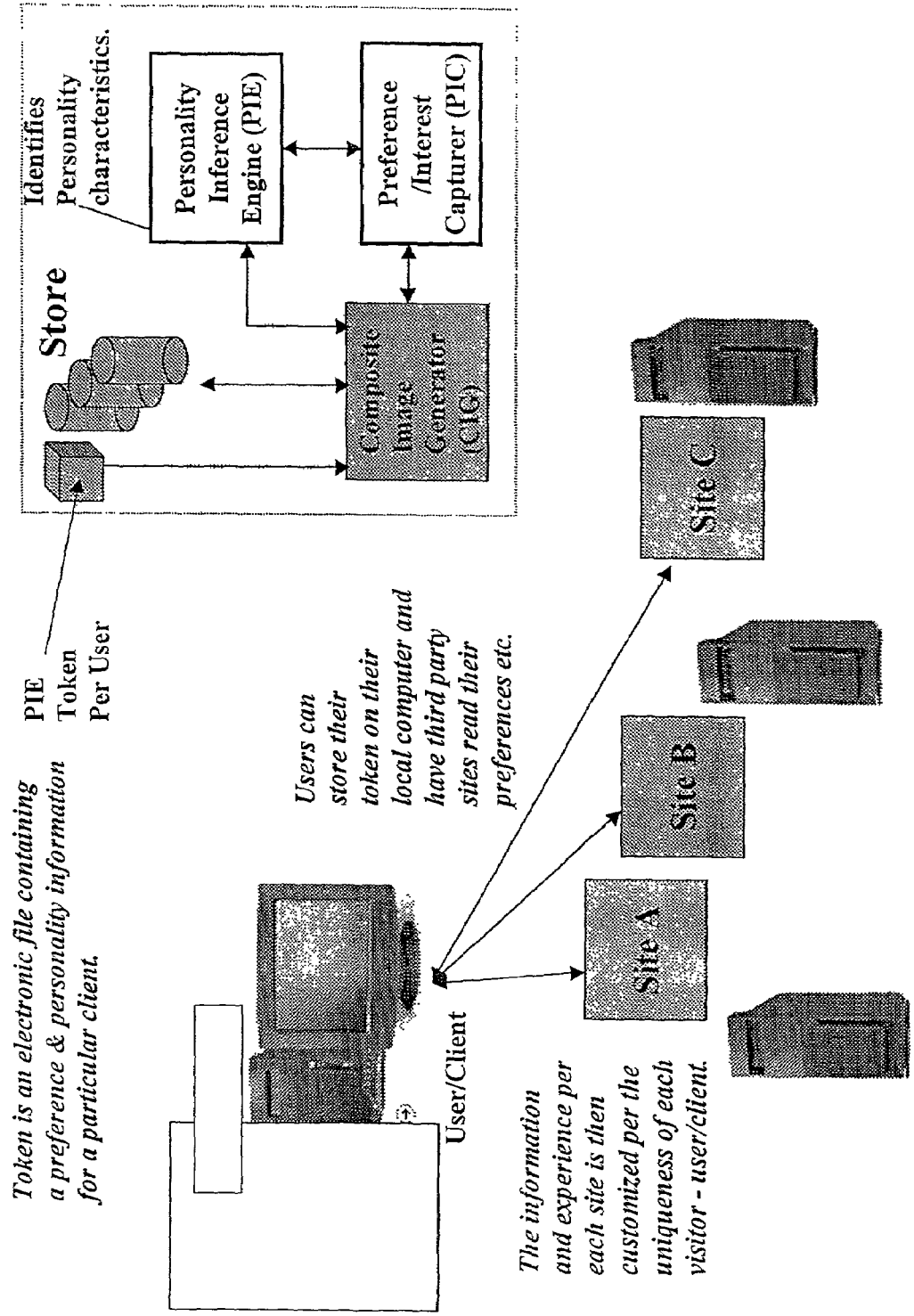
Figure 36  Preference/Personality Token

Figure 37 Capture Current Interests & Preferences
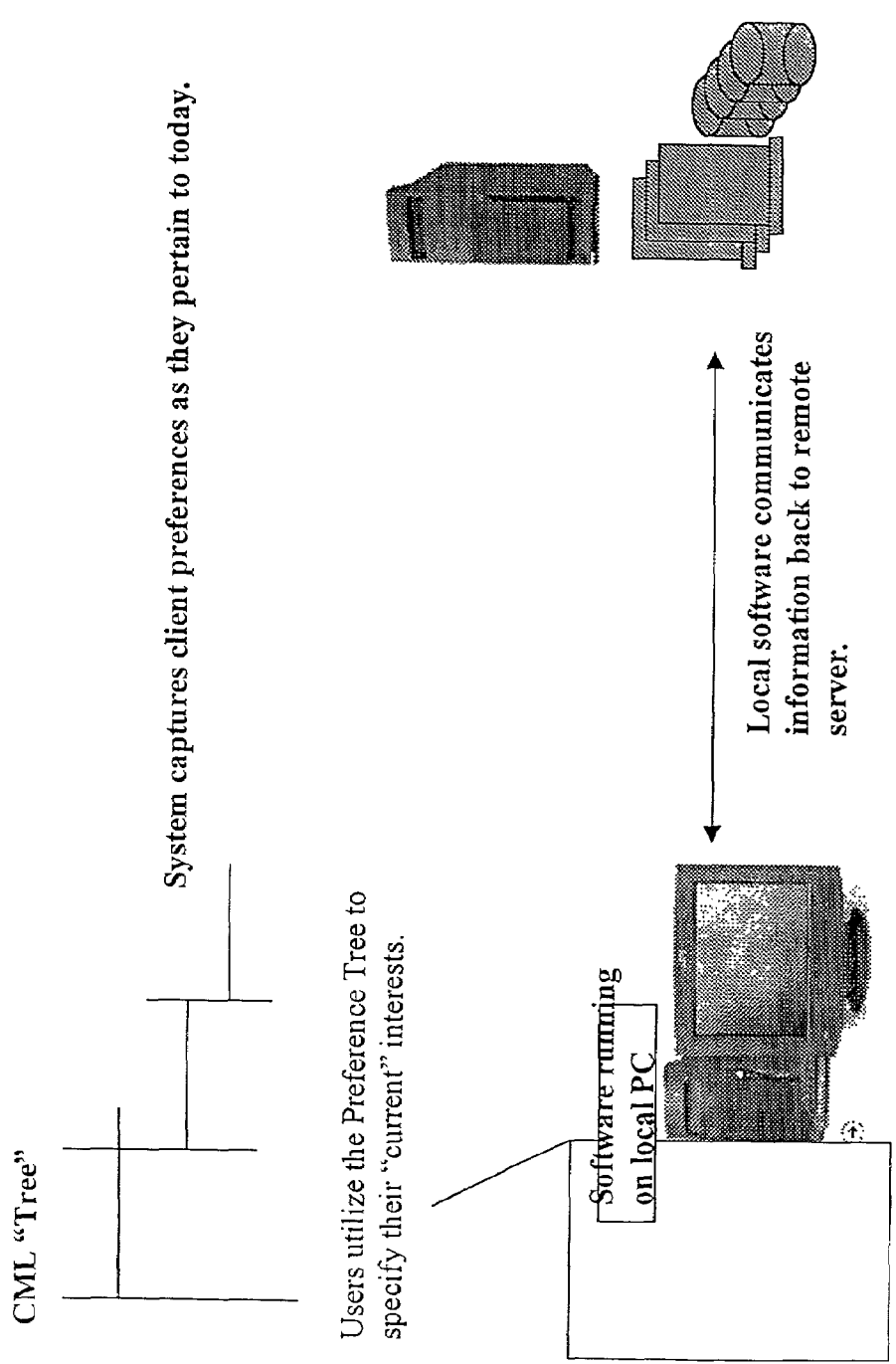

Figure 38 Derive Information from Preference Tree Usage

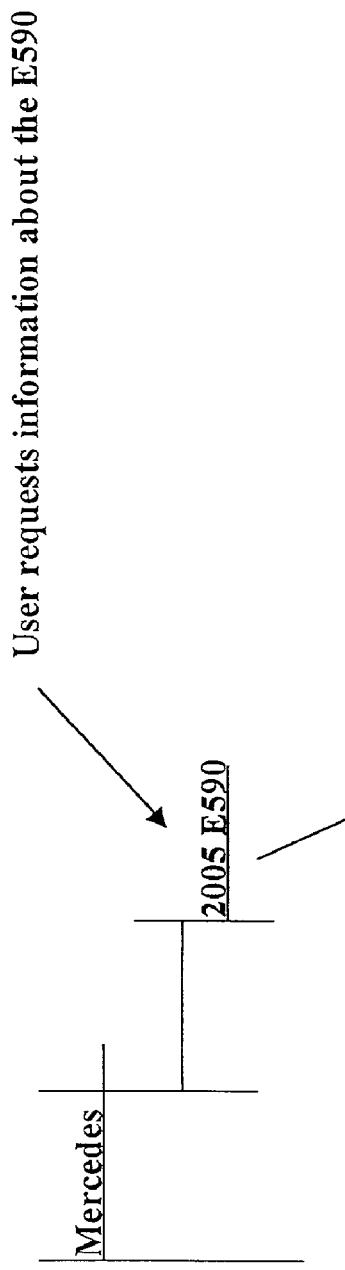

User requests information about the E590

System interjects questions/ prompts for selections
to further refine selection and quantify nature of client's interest.

For example,
• Interested because they're in the market for a car
• Natural interest in luxury sedans - a "car buff"
• They own one already
• They work for a competitor Every time the client interacts with the system something is tracked, monitored, gathered and stored.

Figure 39 Defining clients using the CML
Clients are defined using the CML 'target audience' definitions and language.
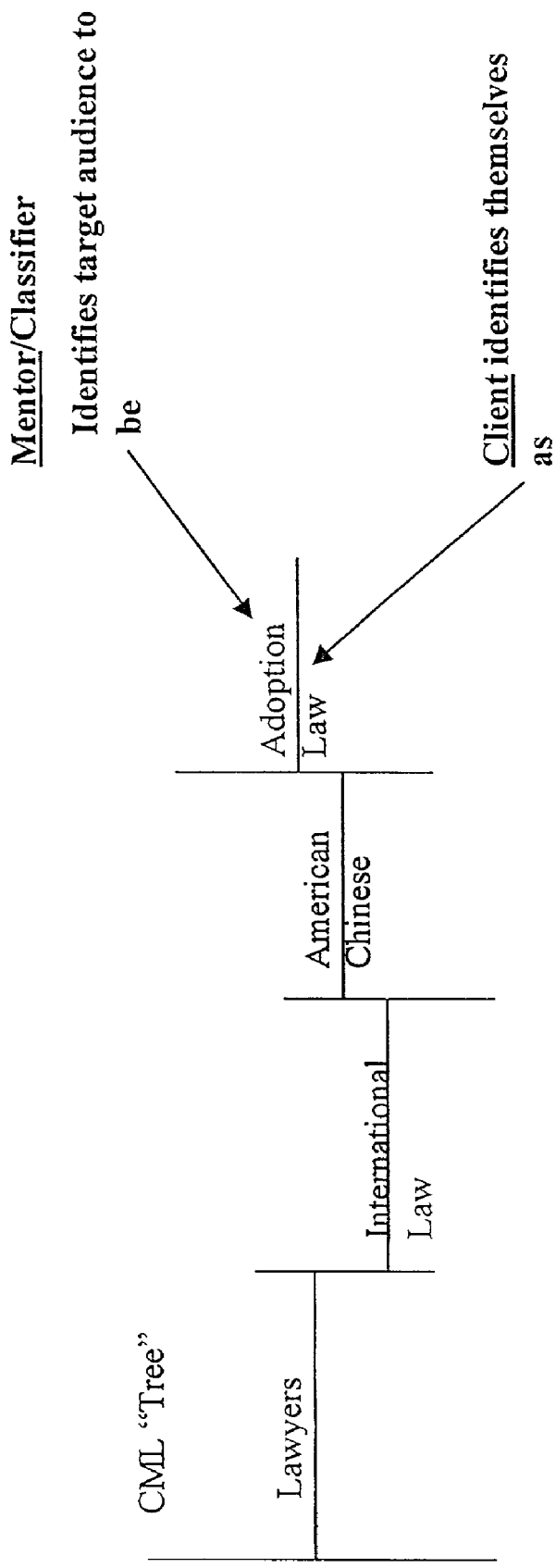
Target audience and clients are specified using one single very specific language.

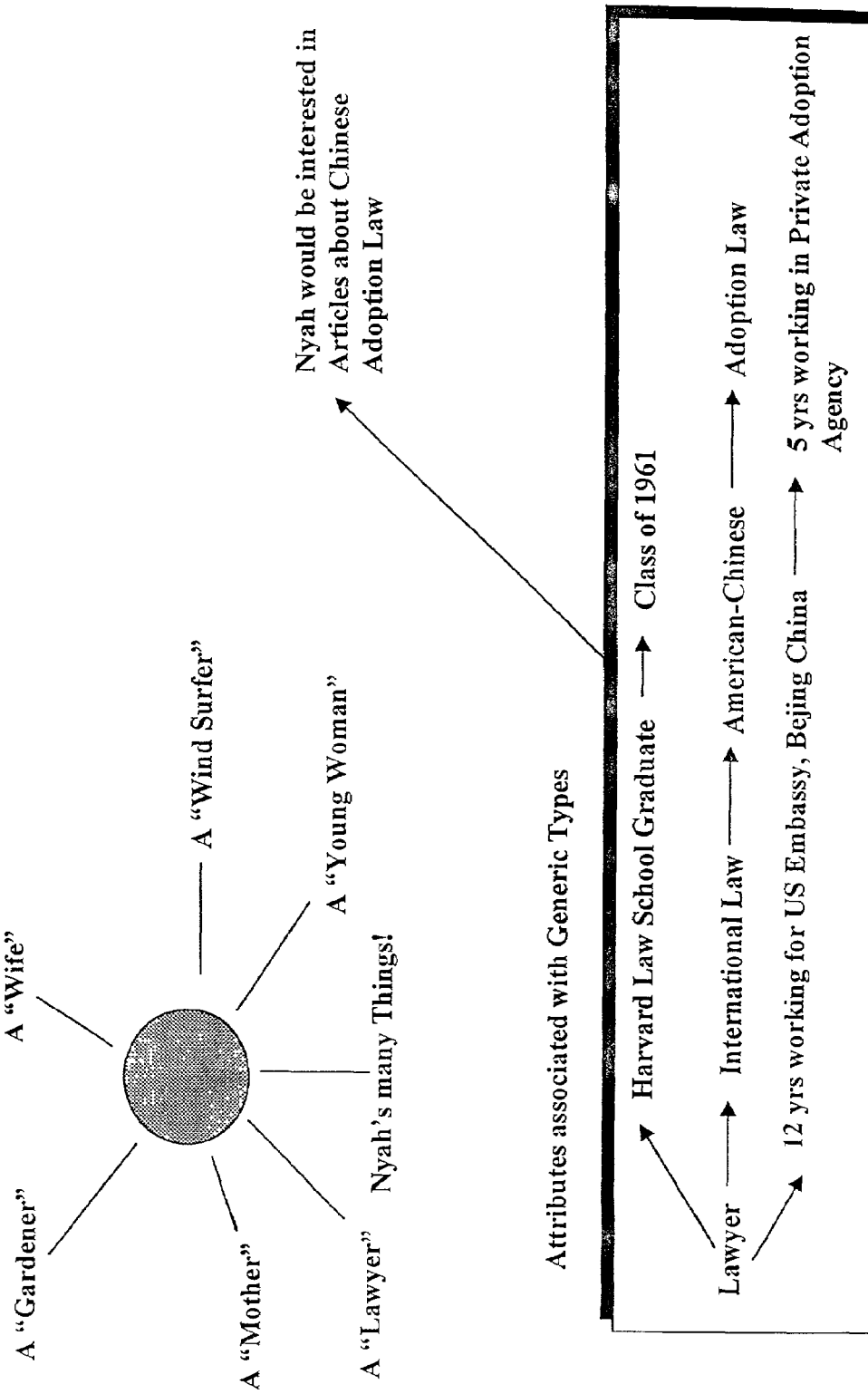
Figure 40    Classify people as per Generic types

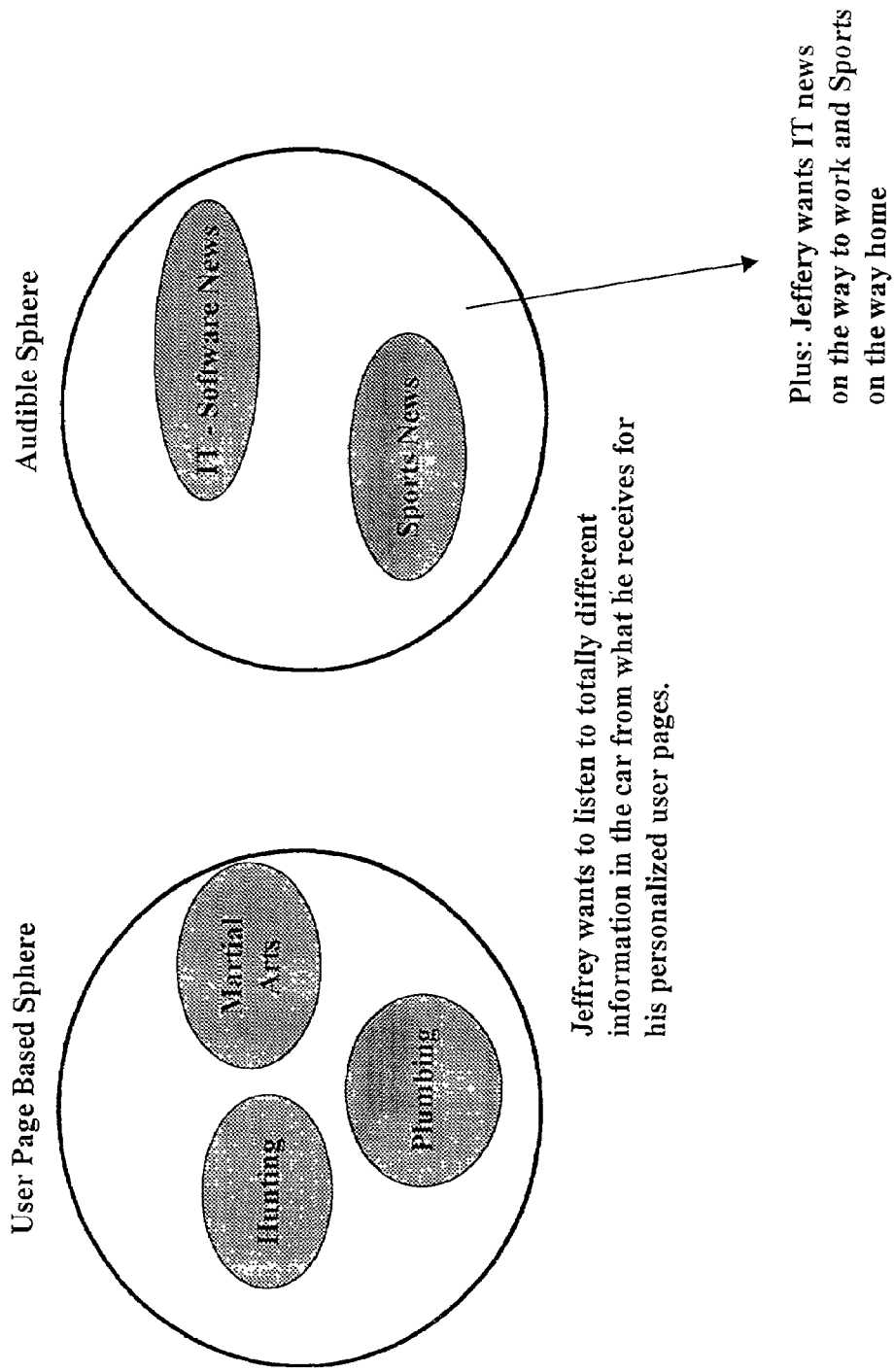
Figure 41  Multi Medium Spheres of Interest

Figure 42 Key User Functions

*"My Personal Web Pages"*    *"Text, Images and Video Displayed how I want it"*

Personalized Pages

- Reading & parsing Data file sent from web site
- Customized Information Rendering
- Voice recognition/synthesis
- "Linked" information - data, text, images, video
- "Tagging" Information
- Information Management - deleting, retaining, marking etc.

*"Listening to a collection of audio segments I requested"*

Audio Management

- Loading and playing aggregated audio file
- "Linked" segments - "Jump to this other segment to listen to more"
- Audio Management - deleting, retaining, marking etc.

*"Let me tell you more about myself"*

Profiling Services

- Query mechanisms - user interacts to provide personal information about themselves
- Altering personal data

*"Let me change the credit card used or email address"*

Account management

- User account status
- General account updates, changes, deletions

*"Let me specify what I want, when and in what format!"*

Information/Service Request and Management

- Preference Tree
- Information specification & request
- Profiling Queries - "What's the nature of your interest in this topic?"

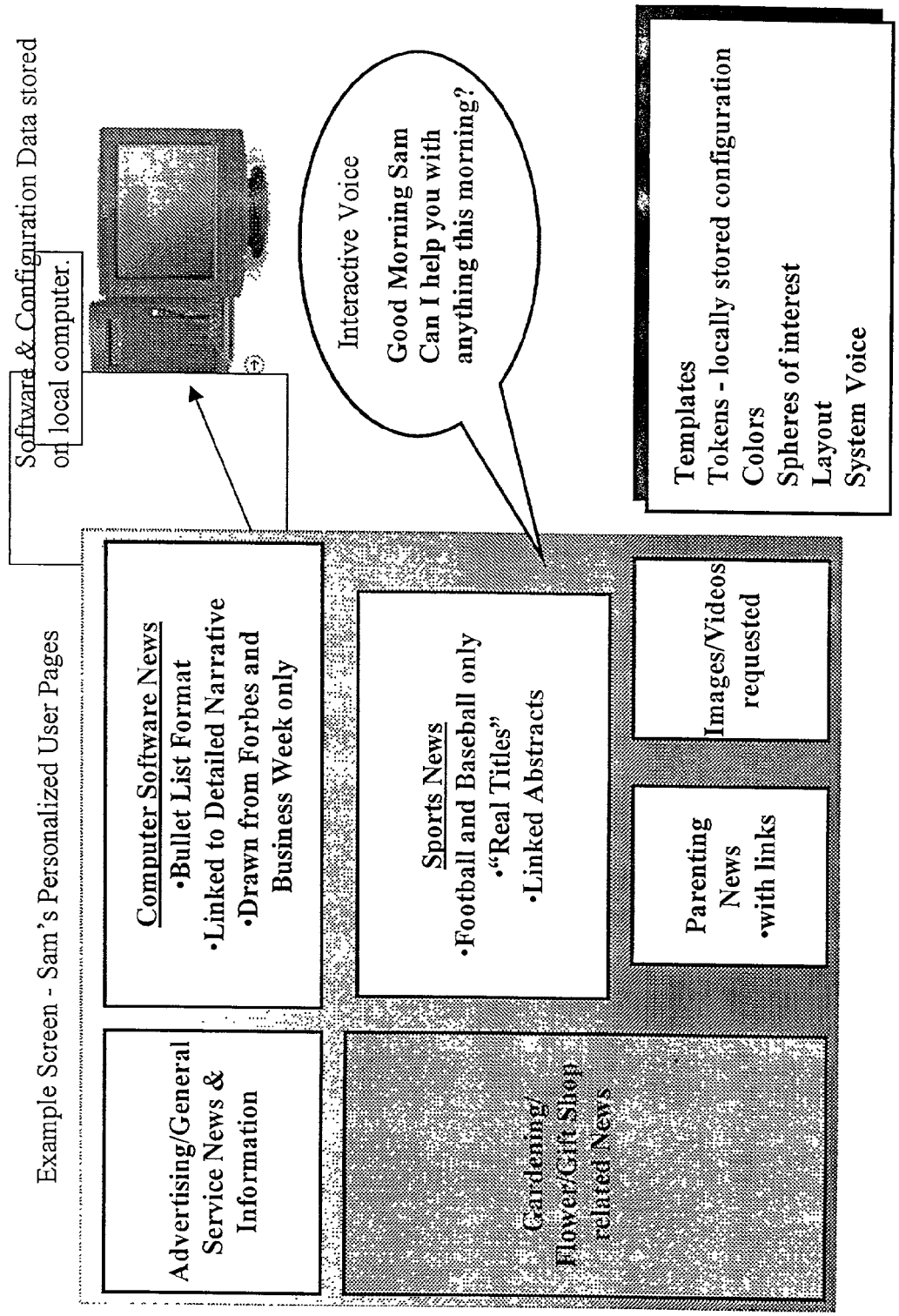
Figure 43 — Personalized User Interface & Interaction

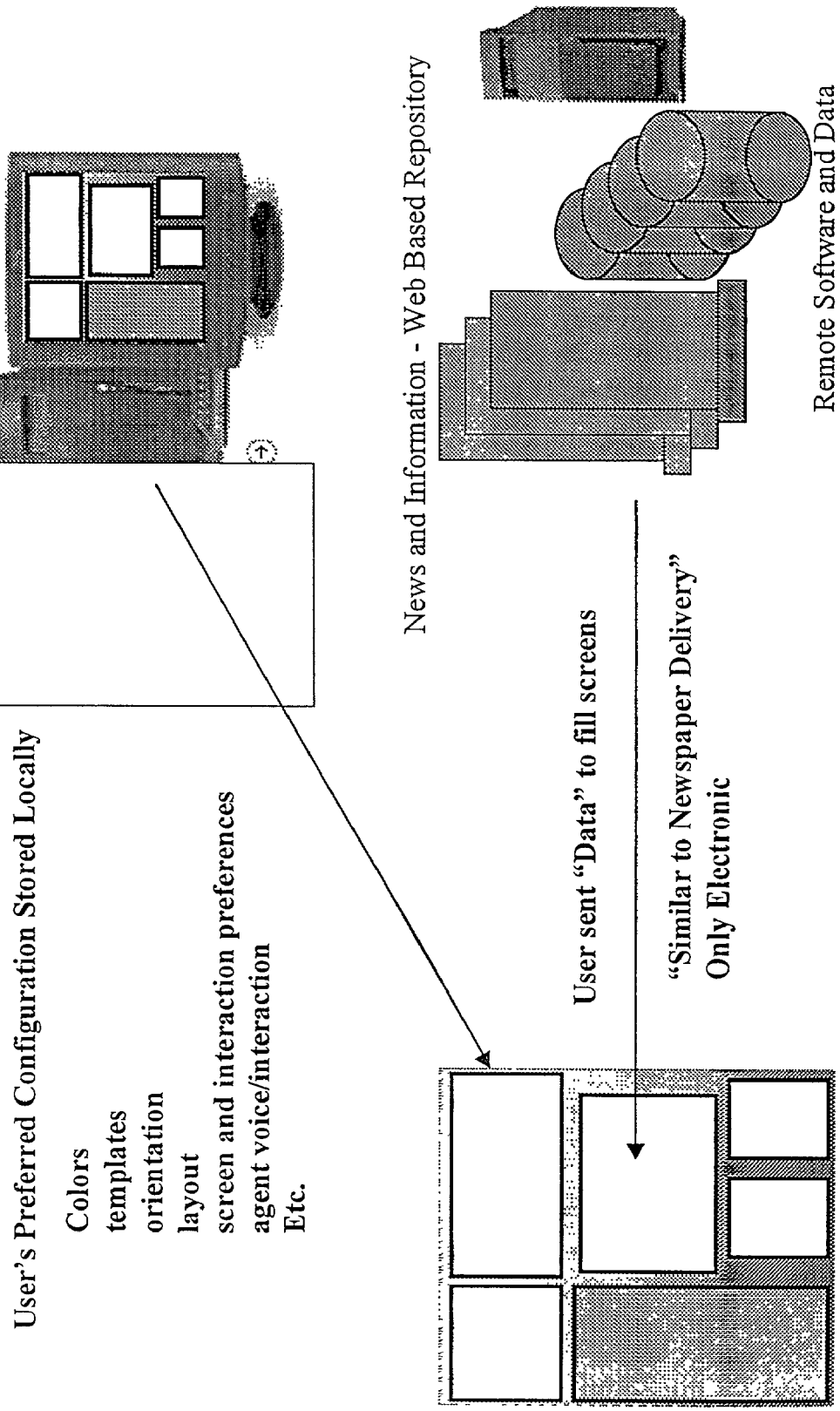

Figure 45    Local Software image with CML Preference Tree
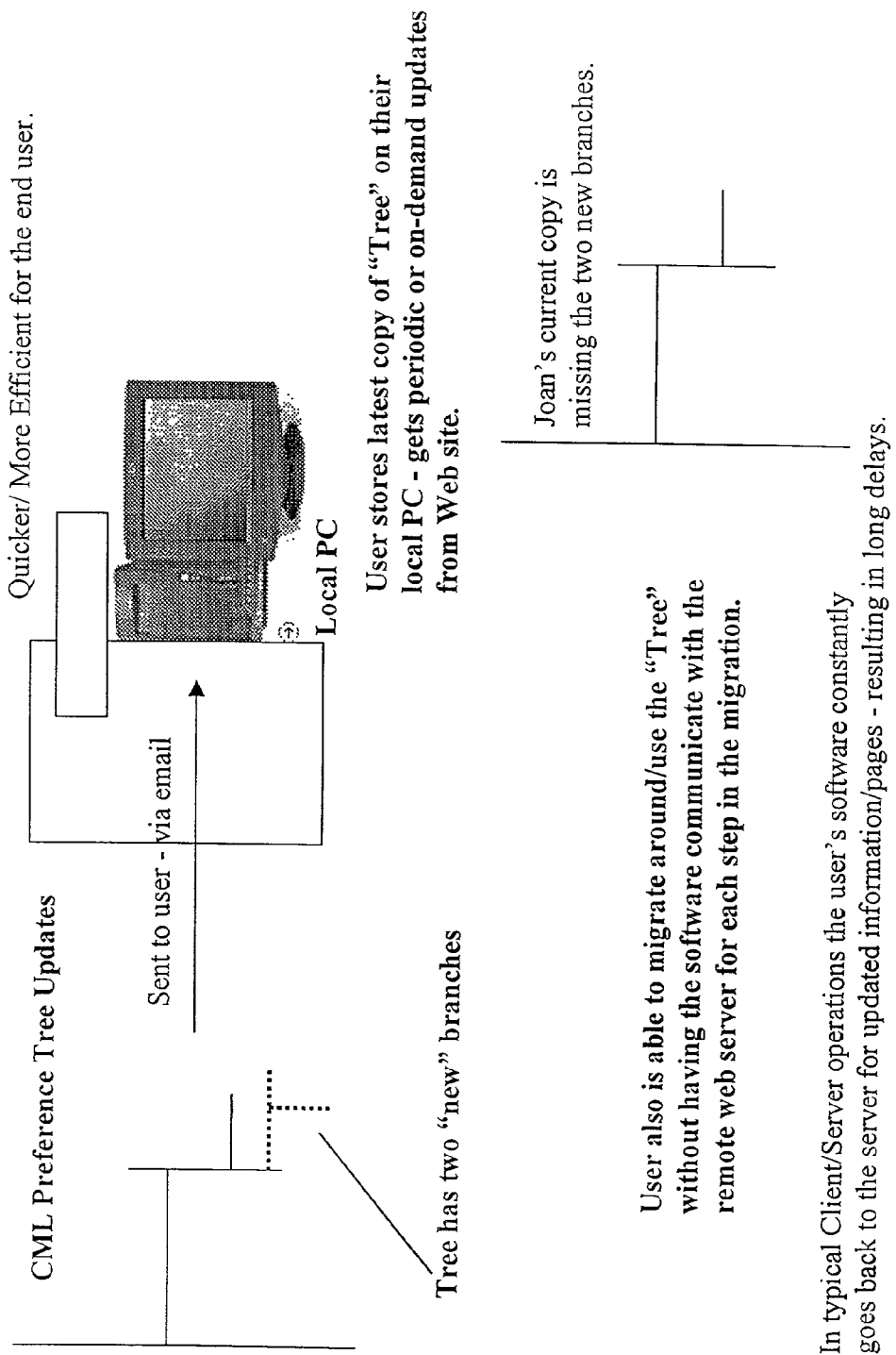

Figure 46 User sent "Information Data file"

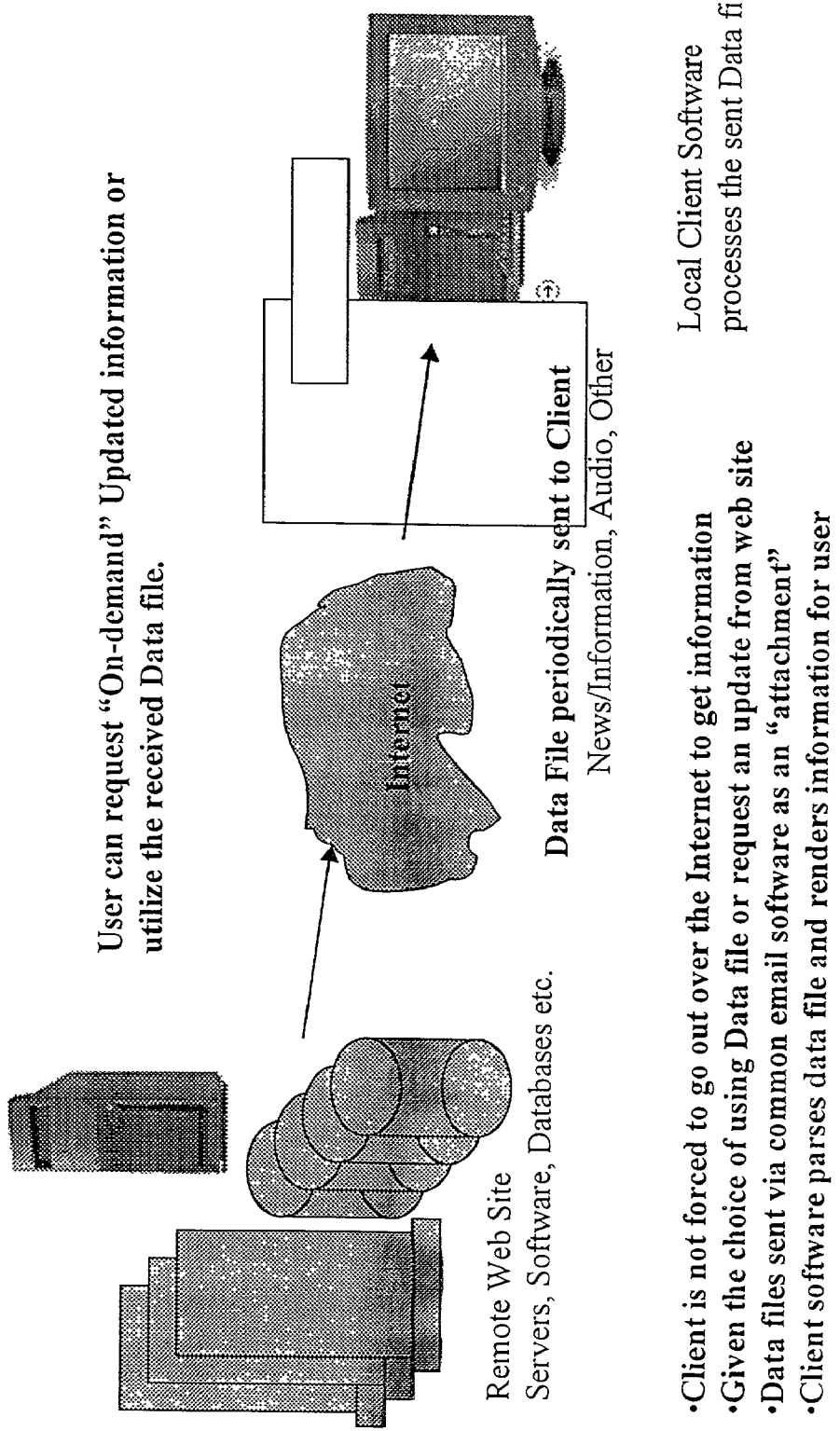

User's don't log into the server on a daily basis

User can request "On-demand" Updated information or utilize the received Data file.

Data File periodically sent to Client News/Information, Audio, Other

Local Client Software processes the sent Data file.

Remote Web Site Servers, Software, Databases etc.

- Client is not forced to go out over the Internet to get information
- Given the choice of using Data file or request an update from web site
- Data files sent via common email software as an "attachment"
- Client software parses data file and renders information for user

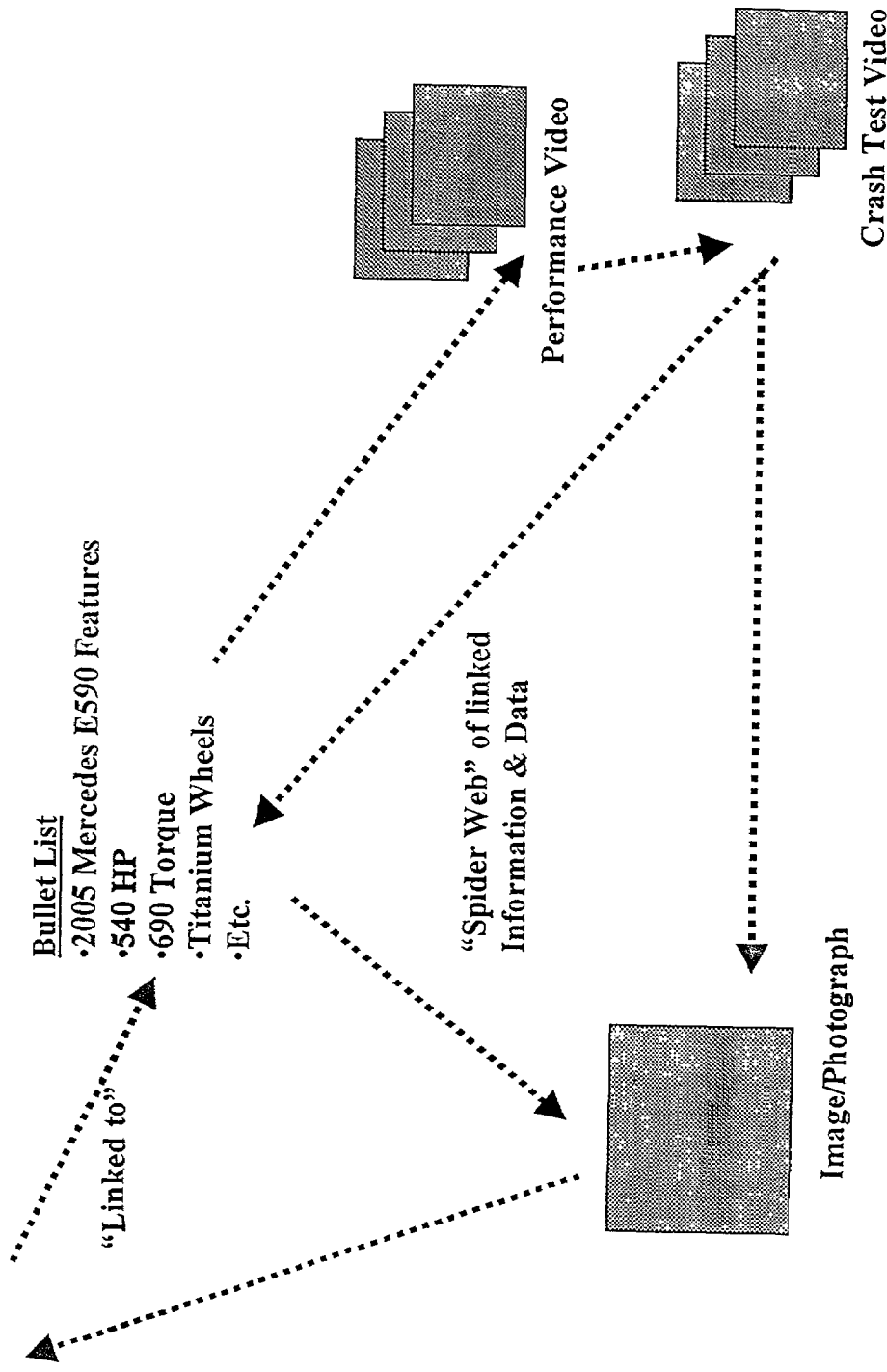
Figure 47 Hyper-Linked/Logically linked information

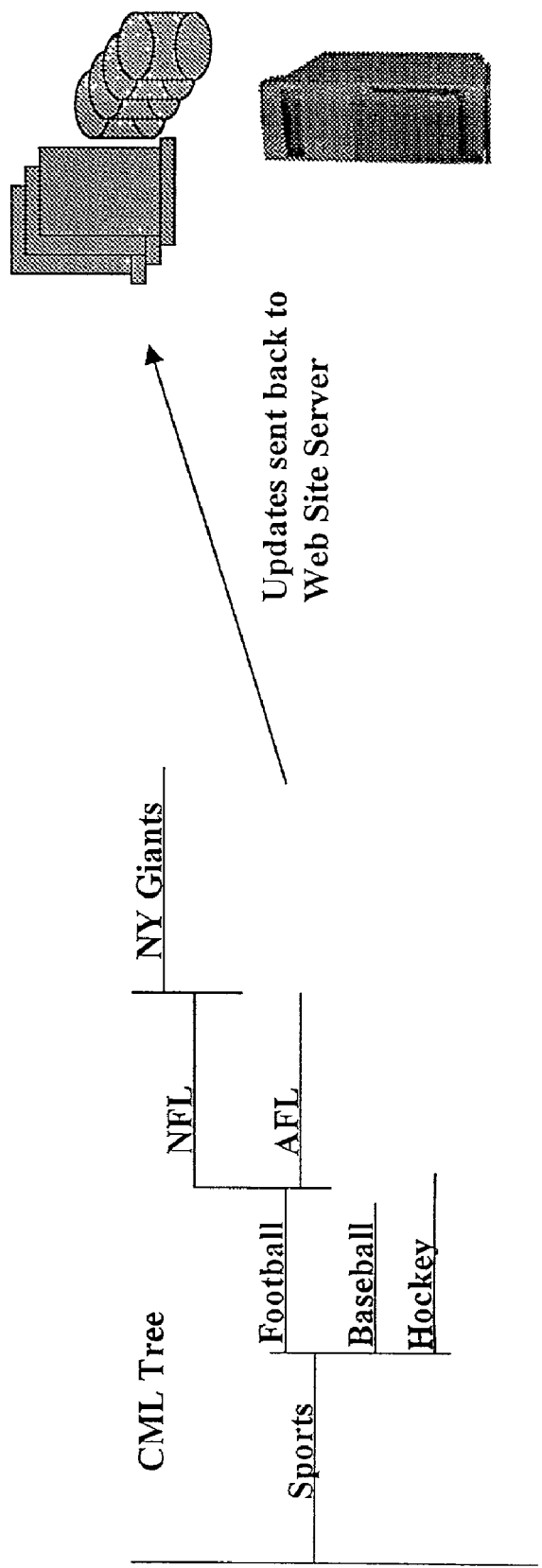
Figure 48  Clients use the Tree to specify items of interest
Users make selections using the Tree.
If the user is content with their current settings the system continues to interact with the user in the same way - example - send news according to their preferences.

Figure 49 User Configurable Preference Weightings
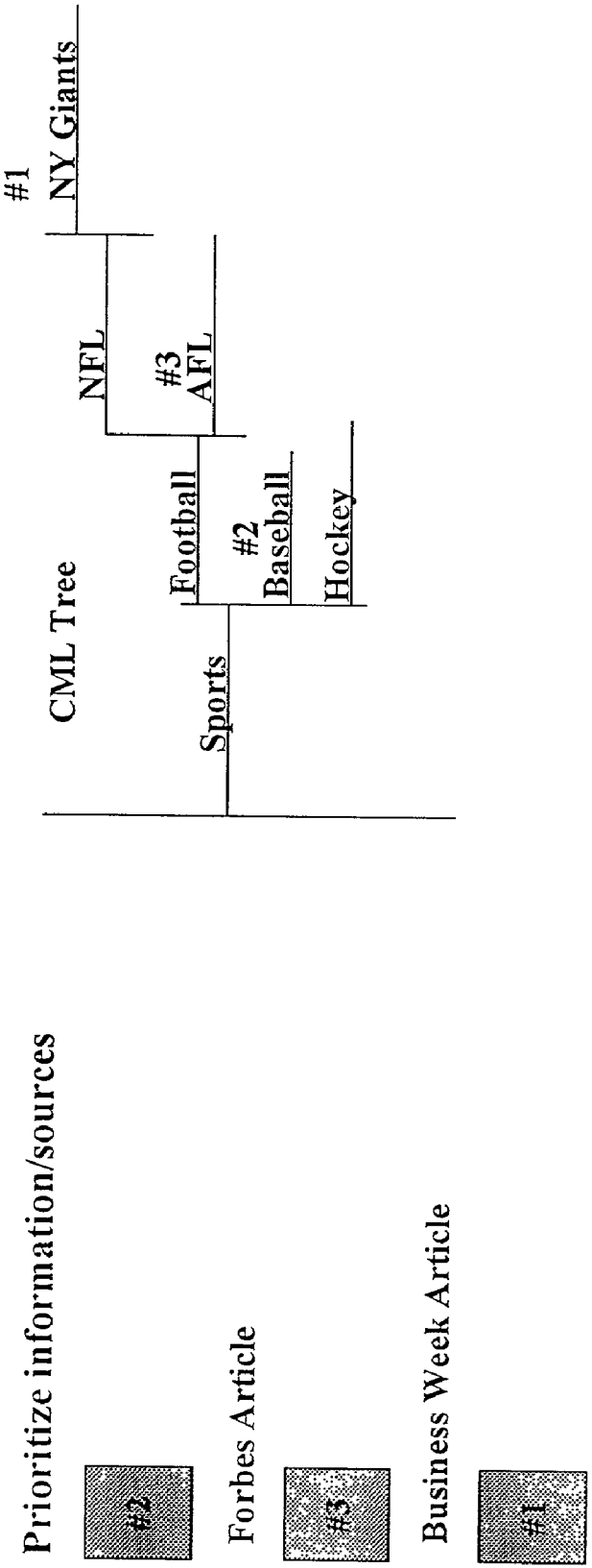
Index = weight1 X parameter1 + weight2 X parameter2 + weight3 X parameter3

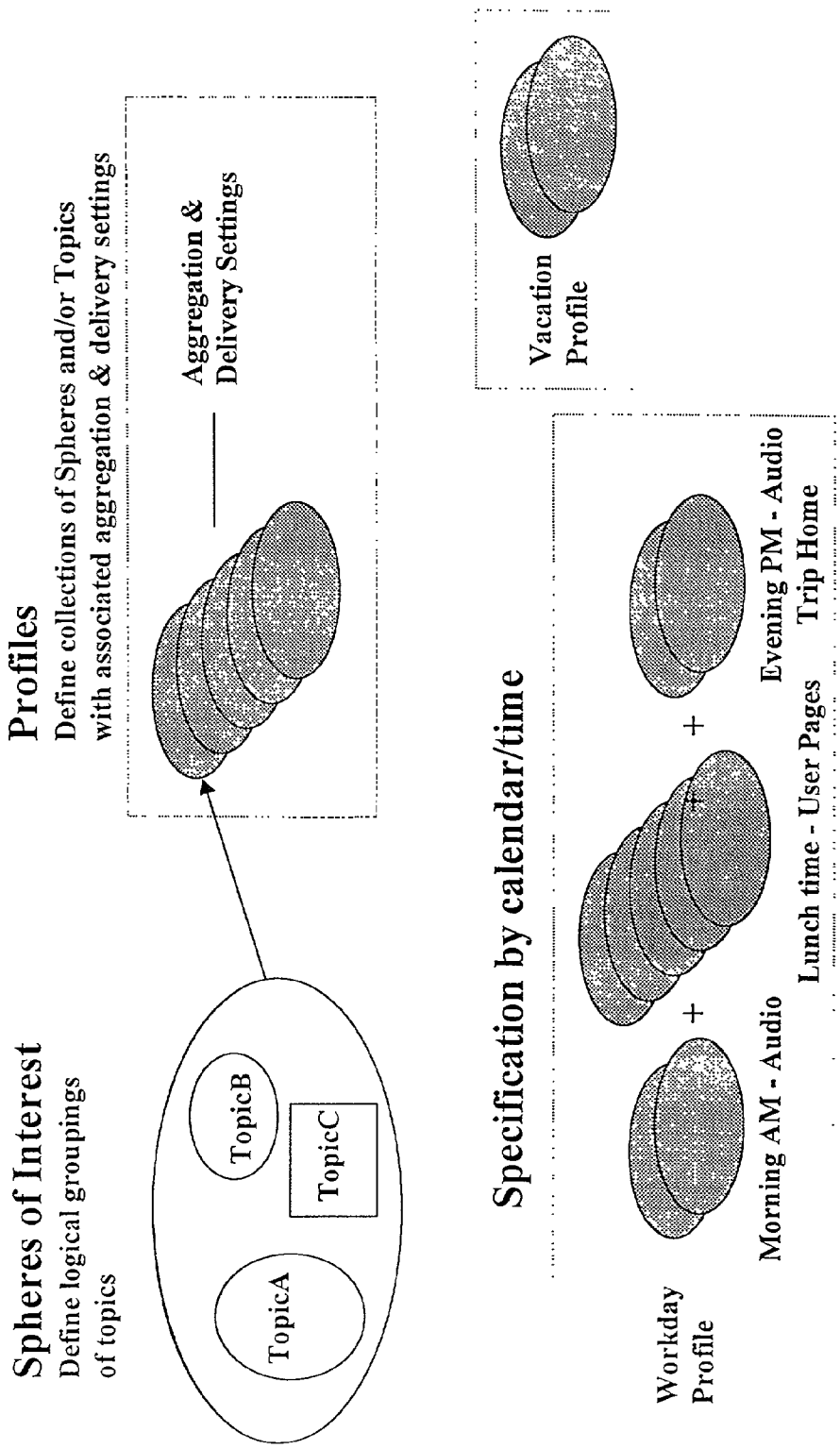
Figure 50  Multiple Aggregation Profiles
*Users/clients are allowed multiple profiles*

Figure 51 Audio file selection and management

User specifies how they would like the audio info delivered etc.

Notice:
Three (3) Spheres of Interest

I prefer 1) "Real Title" linked to 2) Narrative descriptions for Gardening material The Overall Format "Give me articles from these magazines in this priority order"
• Parenting magazine
• Today's Parent magazine
• Working Mother magazine Grouping Audio Selections I prefer bullet lists only – just the high points

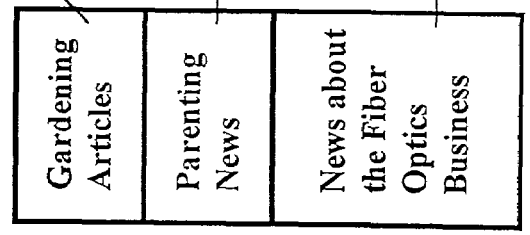

Gardening Articles

Parenting News

News about the Fiber Optics Business

Figure 52 Deleting Information from user's listing

You present all this great information to a user - Now how do you know when to delete an item? Do you just automatically delete material (send new "stuff") or possibly something more sophisticated?

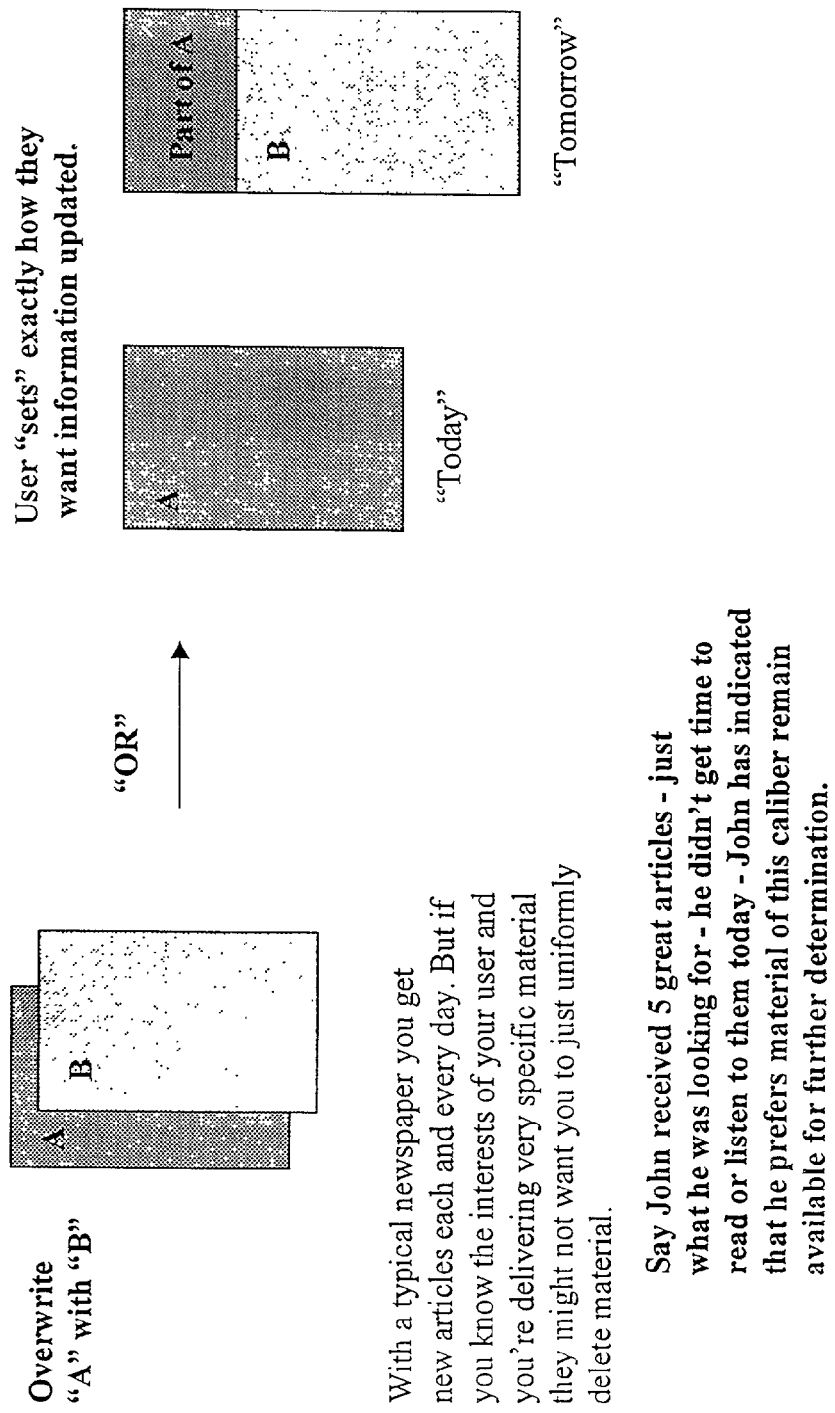

Overwrite
"A" with "B"

"OR"

User "sets" exactly how they want information updated.

"Today"   "Tomorrow"

With a typical newspaper you get new articles each and every day. But if you know the interests of your user and you're delivering very specific material they might not want you to just uniformly delete material.

Say John received 5 great articles - just what he was looking for - he didn't get time to read or listen to them today - John has indicated that he prefers material of this caliber remain available for further determination.

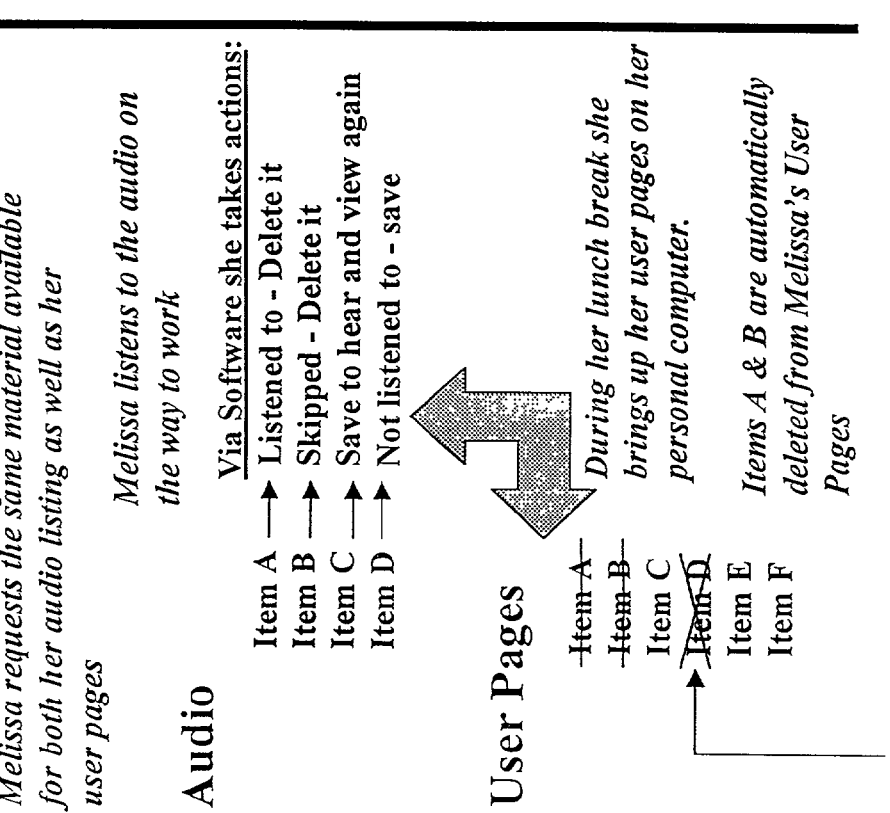

Figure 53    Synchronizing/Reconciliation of Multiple Mediums

Day 1 - Monday

*Melissa requests the same material available for both her audio listing as well as her user pages*

Audio

*Melissa listens to the audio on the way to work*

Via Software she takes actions:
- Item A → Listened to - Delete it
- Item B → Skipped - Delete it
- Item C → Save to hear and view again
- Item D → Not listened to - save

User Pages

*During her lunch break she brings up her user pages on her personal computer.*

- ~~Item A~~
- ~~Item B~~
- Item C
- ~~Item D~~
- Item E
- Item F

*Items A & B are automatically deleted from Melissa's User Pages*

At the end of lunch Melissa saves C,E,F and deletes D

Day 2 - Tuesday

*System updates her audio listing per her actions (delete D and save C,E,F) and blends in new material*

Audio

- Item W
- Item X
- Item Y
- Item F
- Item C
- Item E

*System also rearranges listing per Melissa's preferences - for example items W,X, & Y are of greater interest to her, and likewise F is of greater significance than E*

System synchronizes and reconciles the audio and user page listings.

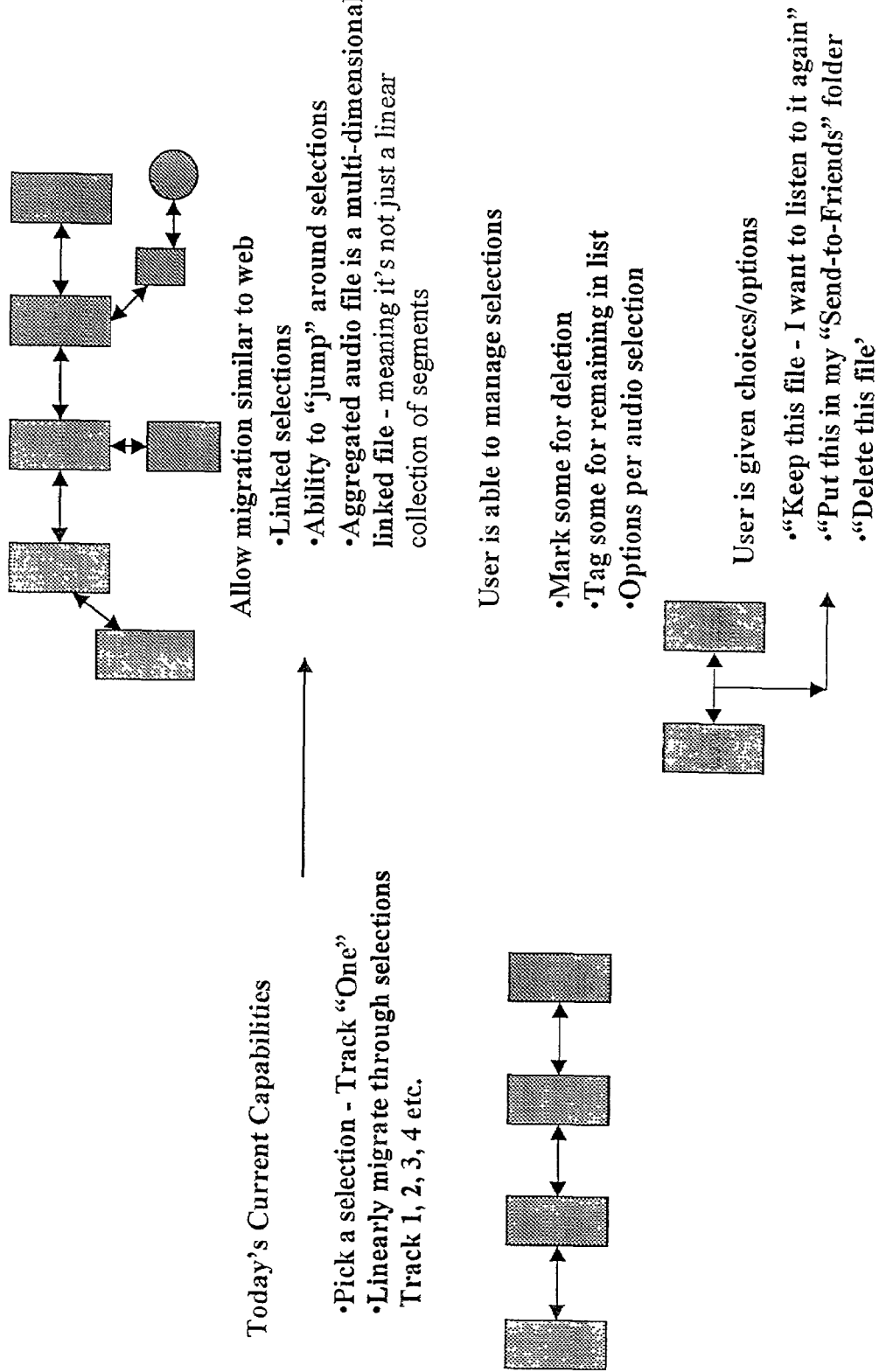
Figure 54  Intelligent management of audio selections

Figure 55    Intelligent Electronic Books
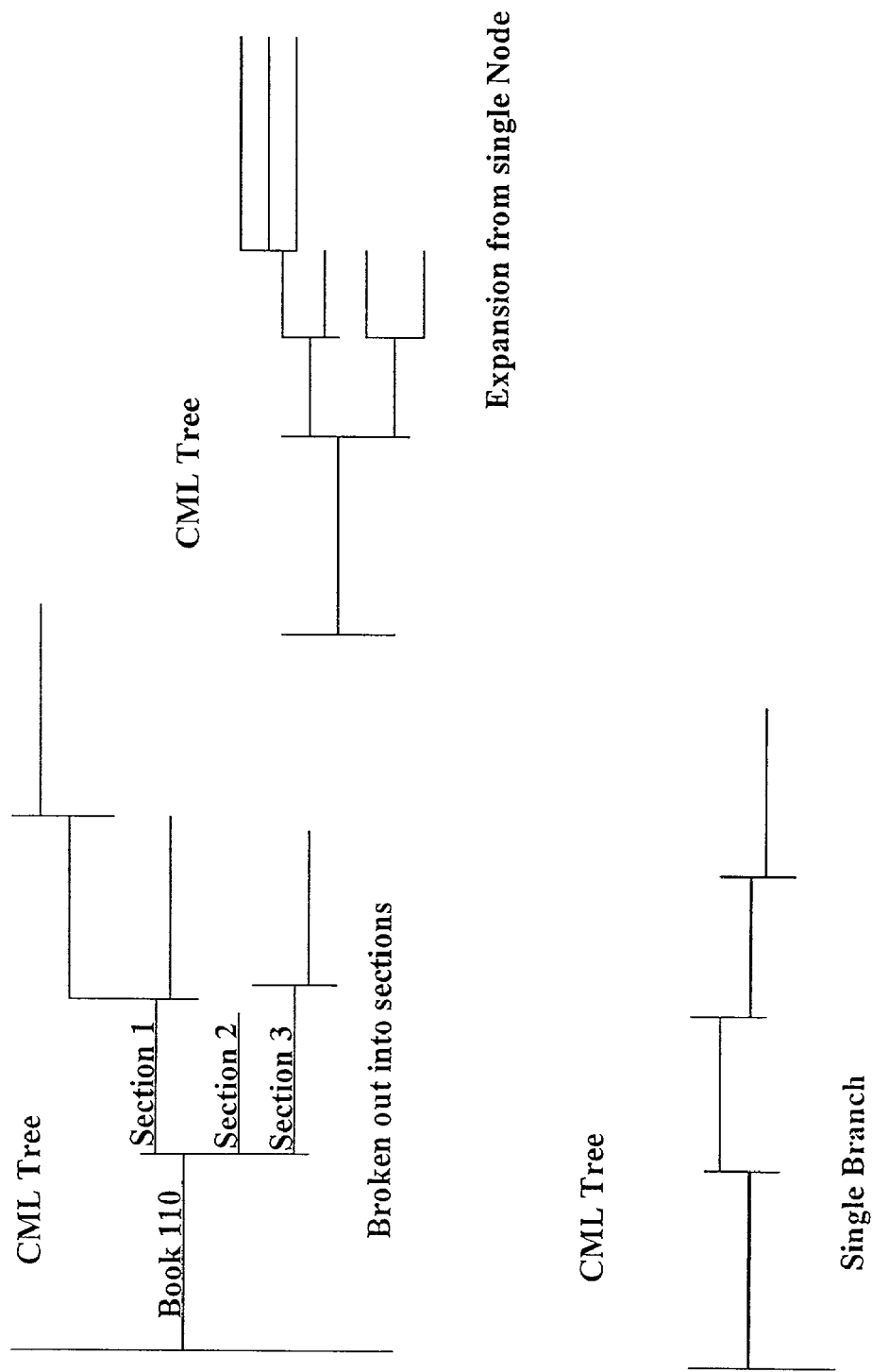

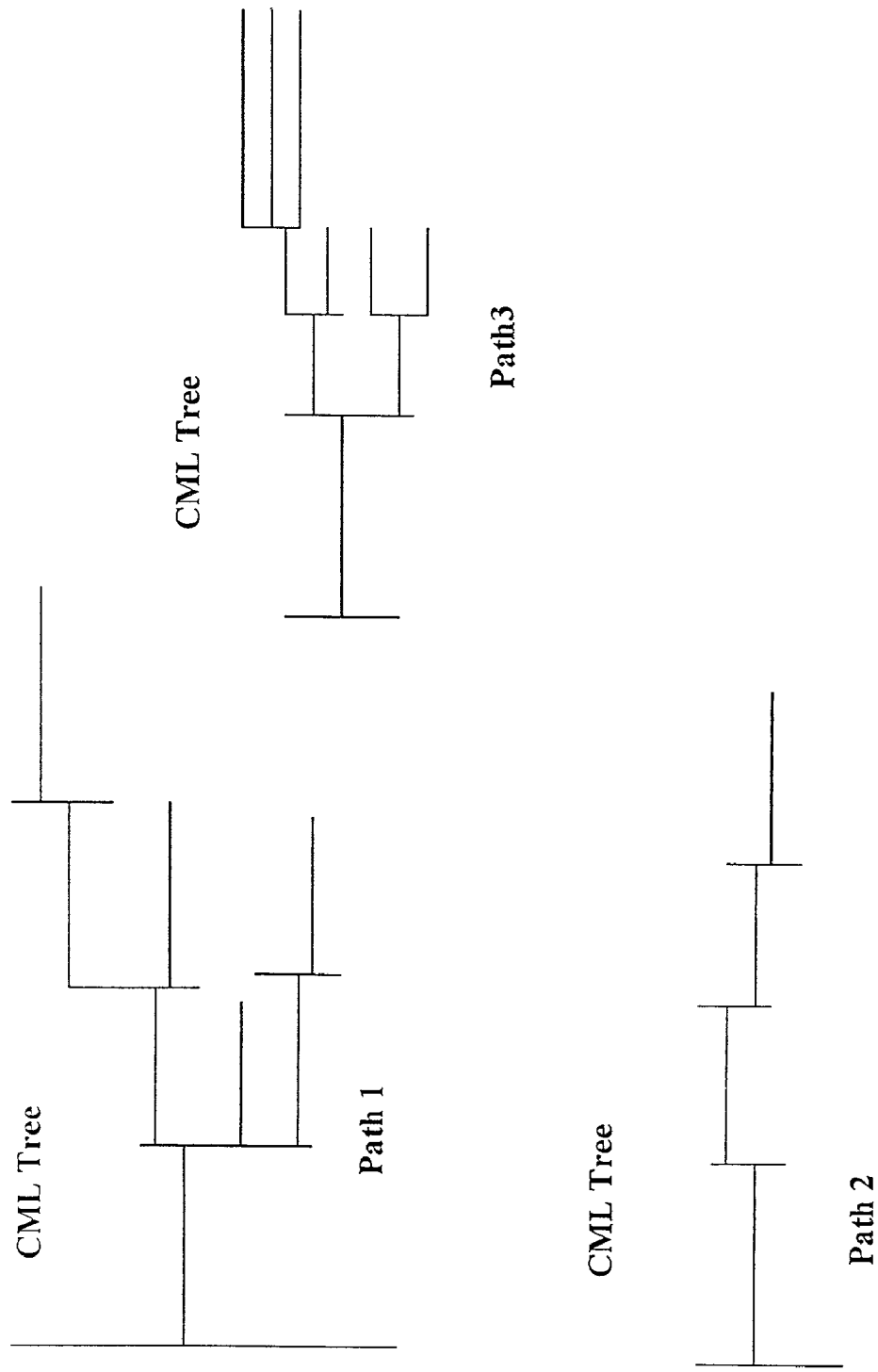
Figure 56  Intelligent Learning Paths

Figure 57  Anonymous Product Inquiry

User selects product areas for which they are looking for information

Boats — Row Boats

Software running on local PC

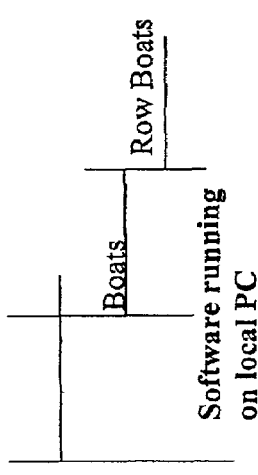

System receives request for information on "row boats" and 1) posts anonymous interest locally and 2) notifies via email potential suppliers whom have registered with the service

System receives information via translated email account and passes information to user via their 'true" email address

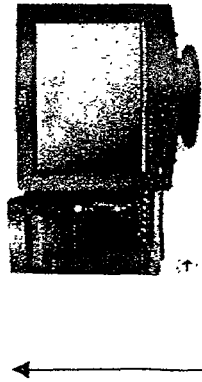

Supplier sends requested product information to System server

Supplier either 1) manually sees posting on System site or 2) receives email of interest

SYSTEM FOR TIMELY DELIVERY OF PERSONALIZED AGGREGATIONS OF, INCLUDING CURRENTLY-GENERATED, KNOWLEDGE

INTRODUCTION

1. Field of the Invention

This invention relates an adaptive knowledge-characterization and -aggregation system involving knowledge collection, editing, selection, and personalized delivery; and more particularly to methods and apparatus for knowledge as well as individual user (knowledge seeker) characterization, graphical display of the knowledge, selection of hierarchical knowledge, and the retrieval and aggregation of personalized knowledge.

In addition, in a broader sense this invention relates to the fields of psychology, sociology, distance learning/education, agent services, mentoring, peer-to-peer counseling, and customizable information-storage and -retrieval as well as the web-based service businesses.

The method and apparatus can be used in many fields, including e-commerce, news, book publishing, as well as distance learning.

2. Background of the Invention

Vast amounts of knowledge have already been generated and recorded, as in old books, films, audio recordings, tapes, newspapers, magazines, and computer databases. In addition much new knowledge is being generated, as in current newspapers, magazines, catalogs, and audio recordings.

There is a need for an automated method and apparatus that can effectively assist people to not only more effectively utilize their time but also enrich their lives, through better access to knowledge (information, data, and wisdom, in writings).

Distance Learning—

"Get a Book" is often heard. But the reality of distance learning and textbooks in general is that they're constructed according to the "one size fits all" mentality. Of course, there are varying levels and categories of textbooks—beginner/introductory, advanced, etc. However, a person will typically purchase a number of books, read a little from each, and then attempt to aggregate the knowledge from the disjoint sources to form a cohesive understanding of the material from his point of interest. This while at the same time trying to fend off the inevitable frustrations and self doubts that crop up when learning new material. The same frustrations and doubts magically grow with the difficulty of the material.

Distance learning today is a mixture of on-line administrative and course services combined with traditional services such as conference calls, shipment of course materials by way of standard carriers, and distribution of lectures via VCR tapes. The use of internet-related educational services is growing, and it provides the multi-faceted value of the "on-campus"/"live" educational experience, especially for the post-high school teen. Distance learning is utilized too by the older "working" population, where time, work, and societal pressures make not only learning a new field a growing problem but staying abreast of any field increasing difficult. Today, in corporate America there is a growing shift away from company-sponsored education towards a more "individual's" responsibility. Increasingly words such as "Your services no longer match our corporate needs" are heard. This shift corresponds to a growing short term view held by corporate executives: it no longer matters that an individual has worked for a company for 20 years—it's what can the employee do for the company tomorrow and the next week that's important.

Change

Nothing in life stays the same. Even how a fixed object (say a particular car—1994 Nissan 300 ZX Twin Turbo) is viewed, changes over time. Once classified as "state of the art", the "in" car over time becomes possibly the collector's item. The car may not change—abet some few additional miles—, but how it's characterized will always change. An event once thought to be due to some cause, may later be deemed to have a totally different origin due to recent discoveries.

Current Issues and Characteristics

Some of the issues and characteristics of news and information today are as follows:

Different writing styles not only of the authors but the publication itself

Certain author/source biases—everyone has inherent biases

Different target audiences

Information is not always 100% accurate

Electronically stored in different ways/formats

Keywords/Identifiers/MetaData—not always accurate and true

Different learning value to different people

Different levels of detail and information

Different focus/purpose—some "for-profit", some "non-profit"

Often driven by business models (profit considerations)

Exposure to only one/few may give a distorted view of reality

Overcomplicated or simplistic treatment of a simple topic—frustrating the audience Lack of unified standards Inadequate accountability for the completeness of the information Standards are a great idea but one that runs counter to competitive nature of a free marketplace. Typically businesses extend their products beyond the common standard in order to differentiate themselves from the competition.

The above mentioned factors along with the fact the media industry has seen a significant consolidation of power in an increasingly smaller set of companies, lends itself to an interesting scenario for the average consumer—the everyday individual.

News, information and knowledge is distributed in a number of ways. Publishers incorporate material from both in-house writers as well as material generated externally. Wholesale-information services exist, as do aggregators such as search engines and services like Dialog and Nexis-Lexis. Most of these news aggregators, like Dialog, cater to the business client and tend to be quite expensive Information characterization, storage, retrieval and delivery is used in most of the industries. From manufacturers like Toyota, to publishing conglomerates like AOL-Time Warner, Inc., to store chains like Barnes and Noble, knowledge processing is embedded in the business systems.

Information characterization (metadata—information used to describe something else: e.g., title, abstract, author, publication date, edition, page numbers, publication name, and including alphanumeric as well as numeric attributes identifying the object at a very high level) about an article, is done to varying standards. Some metadata, like an article's title, is chosen more for marketing value (sales) than it is to clearly and accurately represent the material contained therein.

Characteristics of current information search and aggregation services: most operate in "keywords" only. Many are driven more by business models rather than consumer interests. Many manipulate the outcome/results unbeknown to the user—the average consumer sees little of the behind the scenes operations which determine specific results. The metadata used in the aggregation process may not be totally accurate; a business driven by the bottom line may ad-lib when it comes to describing their product (describing only their strong points, and downplaying or ignoring their weaknesses). The search size varies from service to service, and is not intuitively obvious to the user. (The average user mistakenly assumes that since it's Internet based, it must be searching far and wide.) Quite often the service will return hordes of useless information as well as duplicate entries. Many services have non-intuitive search string requirements which are complex expressions such as—Bob Sled+"Red"/Alaska OR Alps/-Olympics—. Many services including E-commerce sites follow past usage—"You chose this last time, you must want another".

There exists quite a lot of activity currently trying to develop automated-text-analysis methods, processes and software. Many of these activities center around trying to do some sort of statistical analysis on the text itself—extract the essence of a body of text in an automated way. Whether any of these automated analysis approaches meets the mark in terms of accuracy, effectiveness and efficiency has yet to be decided. What is known is that the value of any metadata extraction method is impacted by the accuracy, content, and form of the metadata provided directly by the source/publisher/author.

Today's information systems are built upon somewhat fixed schemas which require time consuming often manual operations. Often too the software needed to effectuate a needed change in the underlying data structure, is unavailable.

When boiled down, one finds five principal problems with current information access:

Information Overload—thousands of magazines/newspapers stored in different often incompatible ways The current search engines don't provide an effective/efficient means of screening, filtering and aggregating information—the "ten thousand hits"

Business and socioeconomic conditions often dictate information availability and content—a cheaper, better shovel made by a small company in Maine, USA, verses a hard-sell marketer's product line—swaying the facts to sell product or directly/indirectly misrepresenting the truth about a product/article Limited Time—one can't give people more time, but we can help them spend it rather than waste it.

No method currently exists that captures, characterizes and ultimately incorporates personality and preference information on an individual basis to enhance the service offered.

One final problem with current technology is the lack of any method of automatically aggregating independent-audio selections into a cohesive file. Plus a lack of an "hyper-link" type option within the audio file itself whereby the usr is able as in Web Pages to jump to other selections based on predetermined relationships. For example, a user is able to listen to a high-level abstract and if they like it jump to a more comprehensive selection. And finally, there exists no means by which a user can reconcile audio files with written Web-based-text equivalent files. In other words, given two medium by which users can access personal information, how does the apparatus make sure news reviewed in text form doesn't appear in the next audio file—news and information management with disjoint but connected mediums. As previously mentioned, a user who just read an article may not want to listen to the same article on the way home from work.

2. Prior Art

| U.S. Pat. No. | Date Issued | Authors | Description |
| --- | --- | --- | --- |
| 5,983,227 | Nov. 9, 1999 | Nazem, Patel | Custom HTML Page Server; locally stored data; use of zipcodes; flush user data |
| 5,828,990 | Oct. 27, 1998 | Nishino, Sugimoto | Electronic News and delivery apparatus; |
| 5,615,325 | Mar. 25, 1997 | Peden | Graphical Viewer for Heirarchical Datasets |
| 6,151,600 | Nov. 21, 2000 | Dedrick | Electronic Information Appraisal Agent |
| 6,026,375 | Feb. 15, 2000 | Chess | System and method for generating trusted descriptions of information products |
| 6,167,397 | Dec. 26, 2000 | Jacobson, Krishna Murthy, Srivestera | Clustering documents on search query |
| 5,862,223 | Jan. 19, 1999 | Walker, Schneier, Jorasch | Cryptographically-assisted network system for export commerce |
| 6,167,392 | Dec. 26, 2000 | Ostrovsky, Kushilevitz | Private information retrieval from single storage system |
| 6,175,830 | Jan. 16, 2001 | Maynard | System |
| 5,793,497 | Aug. 11, 1998 | Funk | Delivering and Modifying Information Electronically |
| 6,032,145 | Feb. 29, 2000 | Beau, Neal, Wilmsen | Database Manipulation |

Nazem and Patel (U.S. Pat. No. 5,983,227) deliver user-customized information by means of a HTML and client-server based design which locally stores current information. Users choose among a small set of broad categories and a few standard screen templates. (The assignee, Yahoo, Inc., operates it is believed an online web site with said service characteristics.) User-specified zip codes are used to customize information such as local weather and sports scores. Users are identified by means of a cookie. Every conceivable piece of information that possibly might be requested, is stored in local server memory. The design offers a simple customization scheme through a limited set of broad interest categories and browser-based display layouts. Nazem's design user's pages are "flushed", or in other words the data once delivered is simply overwritten with a new set upon the next delivery.

Nishino and Sugimoto (U.S. Pat. No. 5,828,990) describe a news-translation and -delivery apparatus which translates news articles into different languages and delivers the new formulations to clients who registered for the service and to news groups, through an e-mail based process. The translation requires the incoming articles to conform to a preset format. Partial translation of articles is possible, allowing for utilization of portions of material. Their method also allows incoming articles to be classified into multiple news groups. They also generate list files for transmission of material to groups of clients, and allow for prohibiting translation of material of a predetermined type such as distasteful information and for translating the material once rather than on a client basis.

Peden (U.S. Pat. No. 5,615,325) enables users to customize their personal view of a fixed data set by annotating, attribution, and add/drop of hierarchical data nodes. Through annotation the user can add comments to the view, while attribution allows the user to highlight a portion of the display. An acyclic graphical representation is used to enable a greater amount of the data to be viewed in some cases. (If the depth of the hierarchical structure is large, it may perhaps actually be more efficient to utilize the Microsoft "Tree" like structure.) In the case of a hierarchical data set with many sub directories, the acyclic representation may result in a complicated display, as many nodes would be randomly placed on the user's screen. Peden's system does not alter the underlying data set, just the person's view of it.

Dedrick (U.S. Pat. No. 6,151,600) describes a system for obtaining electronic information from an electronic information server based on particular user-preference information. The system also updates the information acquired per customer as the new information becomes available (updates can be periodic such as daily, hourly, etc.). The system automatically retrieves electronic information for an individual user in accordance with the user's characteristics which are observed by the system. In other words the system monitors the activities of the users and modifies search queries accordingly. The system automatically presents advertisements to users based on their profiling. Consumers are allowed to control aspects of the advertisement delivery.

In Dedrick the publishers/suppliers of electronic information are provided with tools (i.e. software) by which they can not only customize material for consumers but also monitor their activities. Thus if publishers are to adhere to a standard interface format, they must incorporate software for this format into their own systems. Tools are provided to the publishers to allow them to translate material into various formats automatically.

Dedrick's users can store their information locally on their own computer. (This may represent interesting security challenges to the overall system. From a security standpoint you would want the data managed centrally by the company, not by the individual users. For example, a user will not typically have the IT sophistication necessary to implement strong security measures in their home environment. Having system critical data stored locally separate from the core databases, runs counter to current security concepts and increases the possibility of attack from outside sources.)

Dedrick's system does a statistical compilation of user information. It monitors user's behavior and sends this information back to the supplier/advertiser. The content adapter customizes electronic content to be sent to the individual end users based on the user profile contained in the personal profile database. Information from publishers contains a header with variables that can be modified per user's tastes/preferences. Users can override their profile; for ex., change a background color from blue (their usual color) to white. The user's profile information, minus sensitive information such as name and credit card number, is transmitted back to the supplier/publisher. Users can select which information not to be sent.

Dedrick proposes to protect personal information while making it available to outside parties (no detail on how this is to be implemented seems evident). He also proposes a mechanism to supply particular advertisements to users based on their profiles. He further proposes having software components running on systems from the user all the way to the publishers/suppliers.

Chess (U.S. Pat. No. 6,026,374) describes a system for providing vendor-independent descriptions and evaluations of information products, using a trusted third party. In this situation there are three players: the customer, the vendor/supplier, and the trusted third party. The goal is to provide the customer with vendor-independent evaluation information which might be useful in purchasing decisions. The trusted third party provides information to the customer, based on the output of a computer program sent to the vendor. While in theory this might work, there may be a couple of potential problems. The notion of counting keywords in a vendor product descriptions, relies on the complete honesty of the vendor to provide accurate product descriptions. Just counting keywords provides only a very rudimentary information feedback. Furthermore, counting the number of occurrences of say the word "security" in an IP product, may tell you practically nothing about how useful the product actually is. Trusting that the vendor will execute such a program in a standard manner, is questionable as well. But Chess does have the idea of automating the extraction of evaluation type information from sources such as vendors and suppliers.

Jacobson, Krishnamurthy, and Srivastava (U.S. Pat. No. 6,167,397) describe a method of clustering or aggregating documents that appear to be related to each other based on searches for keywords within the material itself. The response to the query is spread across multiple documents. The central idea is to identify documents which contain predefined keywords, and then the further refine the resultant set based on the occurrence of other keywords in the surrounding neighborhood of the initial keywords.

Walker, Schneier, and Jorasch (U.S. Pat. No. 5,862,223) describe a method and apparatus for users to request information from experts. Users seeking a solution to something enter a request into the system. The system identifies the appropriate expert based on predetermined qualifications, requests a solution from said expert, and passes it back to the user.

Ostrovsky and Kushilevitz (U.S. Pat. No. 6,167,392) describe a method of extracting information from a single electronic storage device source without the source being able to see what it is you are requesting: somewhat like blocking your phone number when making a call; e.g. anonymous calling.

Maynard (U.S. Pat. No. 6,175,830) discloses an information management, retrieval and display system that generates a finite element informational resource and displays the results of a search in a collapsible/expandable format based upon a user-selected criteria or hierarchy. The system retrieves information by (a) dividing the informational resource into a plurality of finite elements, (b) assigning a categorical tag to each of the plurality of finite elements, (c) generating a searchable database record for each of the plurality of finite elements, (d) supplying a search string, (e) searching the database for records containing the search string, and (f) arranging and displaying the results of the searching step in a hierarchical structure.

Bowman, Ortega, Hamrick, Spiegel, and Kohn (U.S. Pat. No. 6,169,986) describe a search technique whereby the standard keyword search query is augmented by using additional refinement keywords. As the user enters search keywords, the method provides possible additional keywords to use in refining the search.

Schulhof and Janky (U.S. Pat. No. 5,557,541) describe a programmable-portable audio storage and retrieval device and associated system for distributing subscription and on-demand audio programming; basically a mechanism to download and playback audio files similar to MP3 players currently on the market. The user of the device initiates and defines the download process (the source of the audio material does not initiate the download). The user selects audio material specifically. Thus the patent is concerned with the "back-end" user (download & playback) utilization of the audio information.

Schulhof, Janky, and Jasmin (U.S. Pat. No. 5,841,979) describe a system to select and download an "omnibus" (aggregated) single file to a removable high density disk or PCMCIA card. The audio file may include e-mail from which the system strips information not pertinent to the user (the e-mail message is not a standard e-mail message of just text; the message included as part of the standard email format, is in an audio format rather than pure text.

A personal audio-storage and playback device receives text files, performs text recognition as well as text-to-speech (text to audio) conversion. The e-mail raw text file is downloaded to the device which processes it (ex. stripping off headers) and eventually converts the e-mail message to an audible signal. The text-to-audio conversion is done in this end-user device. A "menu" of available information is provided to the user for possible download. A central library of digitally compressed text or audio files can be downloaded to users. A user-setup order-entry and audio-selection" system permits a user to enter a "personal user profile of automated features". Users may select audio material from a predetermined selection of broad categories. The patent is focused on the delivery end of the service. The removable storage medium containing the audio material would be sent to a client by way of common carriers such as the US Postal Service, Federal Express etc. Users enter catalog numbers of selected audio programs.

The system may be operated in four possible modes. In user setup/order entry mode, "users can configure the system to follow certain canonical paths through a built-in menu system". The user "may also enter a personal user profile of automated features". The system uses an intelligent agent to service a user's order.

Schulhof and Janky (U.S. Pat. No. 5,572,442) describe system for distributing subscription and on-demand audio programming, which includes a portable audio-recording and playback device. Users select audio files for download and playback by an audio-file delivery mechanism. The patent focuses on the delivery aspect of the audio-subscription type services.

Dassan (U.S. Pat. No. 5,761,662) describes an automatic method and system for the retrieval of information based on a user-defined profile for generating a personalized newspaper. A client/server apparatus uses standard computer hardware, CGI scripts, forms, HTML and the Internet "www", as the communication mechanism/platform. The user configures a rudimentary profile consisting of 1) topics of interest 2) defined news sources, 3) keywords, 4) date(s) from which source material can be gathered and 5) an indication of case sensitiveness. The profile is stored as an ASCII character file on the server. The user can gather material on demand or at specific periodic intervals of time. The system parses "large text files" obtained from various news sources (i.e. information sources), and extracts the individual files, as well as the associated titles, for storage. The retrieval method is a straight text-word matching query activity. The source material can be raw news feeds. Users are also given the means to look up news articles—a search capability. User account access is password protected. The system presents the user with broad categories from which to make selections.

Herz, Eisener, and Ungar (U.S. Pat. No. 5,835,087) describe in a "system for generation of object profiles for a system for customized electronic identification of desirable objects", an automated mathematical method for extracting items based on user-defined as well as user-observed parameters. They also describe a mathematical method of matching users with objects of potential interest. The objects span the globe, from news articles, books, movies, people, services, to products. You request something, and the system with associated mathematical algorithms will attempt to locate it. A "profile" of user interests is generated based on user-entered information and mathematical measurements based on the user's activities, such as past purchases. The design is based on mathematical models, algorithms, and measurement. For example, statistical measurements are made of the occurrence of each word in a given textual document; (i.e. counting the number of times particular words appear in the text): the notion being that one can determine what an article is about via mathematical methods including word counting. Information is gathered for potential objects of user interest such as news articles. This information again is represented in numerical form; basically extracting information about objects through mathematical means. Object summary information is referred to as a "target profile". In this way target profiles are generated for vast numbers of objects: a profile for every news article, a profile for an individual, a car, house, mortgage, etc. Then the system compares (matches) the users interest profile with that of the target profile and extracts all the potential possible matches. Much like currently available search engines, the output would include grades of matches.

Funk (U.S. Pat. No. 5,793,497) describes an automated system for delivering personalized information to users via e-mail or facsimile. The system delivers information related to the securities industry, such as account summary information; (ex., a summary of a user's portfolio—stocks, bonds, mutual find balances, current valuation etc.). It delivers information via customized emails at predetermined intervals. It extracts information from a database, based on parameters defining users such as name, account number, etc. Users update their account information via e-mail, fax or voice mail. So Funk teaches the notion of extracting information automatically for users based on simple user data, such as name and account number.

Beall, Neal, and Wilmsen (U.S. Pat. No. 6,032,145) describes a web-based electronic-catalog-database requisition system wherein users enter free-form search text, and the system queries the database using several search techniques, namely proximity searching, string manipulation, stemming, fuzzy logic, soundex matching, and word count techniques. The searchable items have predefined terms (i.e. attributes and parameters that define the item). The system combines keyword searching with hierarchical searching. The user interface is capable of processing misspelled words and word fragments. The catalog items are categorized. The system processes user text-string input and returns a list of applicable items. It also automates the electronic requisition process (i.e. actual order placing). The database is a "universal" catalog in which items from different suppliers have one single record. Users can combine attributes in search strings such as manufacturer, model number and color (ex. "bic red pen"). A proximity query will attempt to match the exact string. Next a word-count query is performed where the system attempts to match individual words. A fuzzy logic type search is used next. The authors describe it as a "word wheel" where the system tests for combinations and permutations of the alphanumeric characters in the user entered search string; for example testing for misspelled words. The software also ranks the items located. Another search method used is a "soundex" or "sounds-like" type search of keywords. The system uses categories to refine searching and allows users to hand walk through a categorically-listed database. Users can enter parameters to refine searching, such as manufacturer's name.

SUMMARY OF THE INVENTION

If you were to ask the average person "what they want", many of the responses would equate to a simple expression "More Life". There are many needs and aspirations in life; whether it be more fun, learning and growing as a person, more time, "real" help and assistance, or just efficient and timely access to information/knowledge you need.

Accordingly, one object of the invention is to enable people to enrich their lives.

But "One size does not fit all".

Thus another object of the invention is to give many people "more life".

One component of life is time. This argues for effective and efficient use of both work and leisure time; saving time verses wasting time. Efficient and effective use of time is quite often inherently linked to an individual's access to the information they need in very precise circumstances. People quite often under-utilize their time, due to a lack of awareness and/or access to information or resources.

Hence another object of the invention is to save people time in gathering knowledge.

Equally important as timely access, is good knowledge (information and wisdom). Note how quickly a job gets done when one is working along side someone with previous experience: word of mouth advice (on where to go—what to see) type of thing; a colleague passing someone an article they think appropriate given their circumstances, or offering their honest opinion on a recently published book. Expert support and mentoring are highly useful in knowledge utilization.

Thus another object of the invention is to efficiently utilize expertise in the characterization and delivery of essentially topical knowledge while customizing it to specific individuals.

Also of tremendous value is peer support: guidance and information particular to an individual's needs and circumstances.

Therefore another object of this invention is to provide ready access to peer support and guidance, when gathering information specific to an individual's needs and circumstances.

Beyond knowledge, information and wisdom lies the vision some call "darma"—purpose in life—or "What it is you want from this gift called life?". It's not all that often that people reflect and examine their lives: the life lived thus far, as well as the one they intend to live thereafter. Herein lies the nature of a typically unforeseen problem which most people are paying a very dear price for: people get caught up in the day-to-day activities and never take the time to think about where they are and where they want to go, let alone measure their progress on a periodic basis. A great percentage of people have thought about a goal, but more often than not have dismissed it as "not-possible". Fundamental to this type of self-exploration (this problem/this issue) is once again awareness and the availability of useful information. Quite often people will dismiss a "dream" for lack of anywhere to turn to for reasonable information (knowledge): "I can't become an actress, I don't know where to start."

Accordingly, a further object of the invention is to facilitate ready access to knowledge particularized to the user.

An enhanced knowledge-access method and apparatus must be a conduit, and include an aggregator, and perhaps a filter and/or a mediator; it need not necessarily generate knowledge. In addition it is desirable that such a method and apparatus provide a service that truly touches a user as a person, and provides him or her with an experiential interaction that lifts one as a person—helps the particular person to learn and grow by providing him with customized knowledge.

Employees can not remain abreast of today's business needs because distance learning falls short in:
  A lack of ability to personalize the educational experience—one that takes into account the individual's background, interests, experience, and so forth;
  A lack of intelligent access to information needed, as well as a lack of integration of information from diverse sources; and
  A lack of a more collaborative learning experience where an individual has access to a multitude of "teachers" and "peers".

How a good friend/colleague or a mom/dad describes an article/product is quite often different from how it's represented by the source/seller. The publisher of an article or book may enhance/"adlib" the title/description in order to sell more product. For a given topic, an article in one publication may be better or more accurate than a similar one in another magazine.

In a particular situation, it might be more appropriate is have access to bits and pieces of information, than an entire textbook—most of which need not be read. The trouble is that textbook material ordinarily is not available in bits and pieces. Nor is a distance learning path, methodology, and apparatus customized to the specific needs of the inquiring individual. If you have to learn to program in Microsoft's Visual C++, it would be easier to follow a customized learning path with an associated mentor. Most people become much more proficient at tasks if these methods and apparatus were available to them.

Today, many information services, including E-commerce sites, follow rather than predict—"You chose this last time— you must want another". None of them aggregate based on very detailed characterization of the client.

Thus another object of the invention is to enable predicting knowledge of interest that is based on more than past ordering.

There also does not exist any direct path by which a journalist might market an article he/she has written for direct consumption by the public besides simply posting it on a web site.

Thus a further object of the invention is to provide such a direct path on the Internet.

A real problem in knowledge retrieval is that the source does not provide metadata sufficient enough to satisfy the needs of the end user. Chances are that the format is different, too.

Hence another object of the invention is to enable the ready provision and utilization of sufficient and good metadata.

A further object of the invention is to provide an improved metadata schema—the overall structure, identifiers, linkages, and relationships. How something is stored and retrieved, is directly dependent upon how the item is classified.

This object is accomplished through a more comprehensive, time varying, and multidimensional model of metadata.

The greater the depth of classification reflected by the metadata, the more accurate the classification, the more integrated and automated the process, the more adaptable and time changeable—the greater the ability to extract and fully utilize the information (knowledge). There currently exist no automated method or apparatus, whereby a hierarchical data structure used in information storage and retrieval systems is modifiable via easy-to-use interfaces with no associated software changes.

Therefore, another object of the invention is to allow real time changes to the database, and more specifically by non-technical people, while maintaining the integrity of the data and the associated storage and retrieval systems.

A further object of the invention is to allow the number (depth and breadth) of classification categories to be potentially unlimited and adaptable.

Yet another object of the invention is to allow the user text-based display of the information categories to be very configurable.

Still another object of the invention is to provide an overall matching mechanism which accounts for a great range of inputs including personality traits of the particular user.

A yet further object of the invention is to enable the user to control the manner in which the data is handled from saving to deletion, including whether user's pages are "flushed" (overwritten with a new set of knowledge upon the next delivery).

A still further object of the invention is to provide a system for delivering an electronic newspaper wherein the data is aggregated and delivered based on general interests of the user.

A yet still further object of the invention is to provide an electronic newspaper system wherein the user is capable of receiving a real time update via an asynchronous delivery method.

A yet still another object of the invention is to provide a system wherein knowledge can be delivered upon one-time specific user inquiry or selection, and/or upon user general indication of interests, via an electronic newspaper Greater depth or classification as reflected by the metadata is achieved by characterizing a piece of information in multiple categories and topics.

It is an object of this invention to achieve even greater depths of classification.

To this end, the invention assigns percentages, weights and other parameters to the metadata. These additional attributes allow for a more precise aggregation and retrieval process.

The aggregation process of the invention gathers material on a client basis, and allows for collection, grouping, formatting, and prioritizing material across a broad spectrum of topics.

A "tree" like structure offers a more organized and standardized display technique. In case of automated news aggregation and delivery, with today's stresses on time, the user may not wish to utilize the selection mechanism frequently; rather he or she may want to pick general topics and have the system automatically deliver information for some period of time during which the selection is not altered. While the relative importance of a display mechanism is not as high as that of a method or mechanism for characterizing, aggregating and delivering the information, the invention utilizes the "tree-like display mechanism as well as the notion of being able to add and drop nodes from a user's personal view of the data.

Another object of the invention is to extend the ways a user may personally view the data.

To this end, the invention enables the underlying data set presentation to be altered; as by means of the graphical interface. The invention extends the user's personal view of the data by offering the user alternative views of the data set based on the data itself in other words the data is reorganized into entirely different views or "tree"-like structures.

An object of the invention is to take material "as is" that is, in their native database formats including metadata) from each publisher, as well as to aggregate and compile the material.

Another object of the invention is to maximize security and privacy.

To this end, the knowledge system of the invention manages data centrally.

One of the objects of the invention in securing the privacy of information, is to give the users ultimate control of how their personal information is used. To this end, a "client-oriented" business model has been designed in which clients enter personal information via "fuzzy-like" variables.

Another object of the invention is to better meet user needs. To this end, clients are classified and categorized.

A feature of this knowledge system is using expert metadata as part of the matching/search process. Two specification mechanisms are incorporated: the preference (i.e., current interests) mechanism; and the personal information about the particular user.

While the notion of counting keywords in vendor product descriptions, and otherwise automating the extraction of evaluation-type information from such sources as vendors and suppliers is commendable; the reality is that a person knowledgeable in the field can more quickly and more accurately evaluate a product than can any available automated program.

Thus an object of the invention is to facilitate the use of human experts to generate evaluation-type information, and the incorporation of very specific metadata by a metadata entry system into the corresponding customer search and matching mechanism.

A related object of the invention is to aggregate material via an intelligent aggregator utilizing predefined-content metadata.

Hence experts provide metadata and other general information to the knowledge system, and not in response to user's questions.

While there is value in disguising the nature of a query in certain circumstances, it is also plausible to implement user-identity disguise.

Accordingly, it is another object of the invention to enable user-identity disguise.

The most limiting factor in the expansion of the availability of audio-related news and entertainment is probably the lack of program material having the form and content desired by the subscriber.

It is an object of the invention to expand the availability of audio-related news and entertainment.

To this end, program material having the form and content desired by the subscriber, is enabled. The design accommodates the extraction of the text message from email, the conversion from text to speech, and then incorporation into the rest of the system. The text-to-audio conversion is done in the end-user device, rather than up-front in the aggregation process. Users may select audio material not only from a predetermined selection or broad categories, but also through intelligent aggregation based on user-defined preferences of automatically-gathered information. Thus audio content is automatically selected as well as aggregated based on previously-entered user's preferences—that is on intelligent front-end data manipulation. Artificial intelligence methods such as fuzzy logic, neural nets, and genetic algorithms are employed. In the case of audio-subscription services, extracting key summary information about article content is not only economically inexpensive but also mechanically simple, given that human readers traditionally transform the material into audio format.

The notion of extracting information automatically for users, continues to be an expanding field in today's market. This differs from an aggregated catalog where information is merely gathered together from various suppliers; even duplication of information not being considered.

It is another object of the invention to provide a secure automated knowledge system by which a database structure/schema can be modified by one of more persons either local to or remote of the hardware which houses the database. A request/approval process is incorporated into the method and apparatus to allow for validation of requests. Interactions between users and database infrastructure are via synchronous or asynchronous communications which utilize a standard, such as XML, based data files.

A further object of the invention is to allow for the entry and utilization of metadata associated with common data from multiple parties. The process is both secure and either synchronous or asynchronous. This metadata enhancement process enables a greater level of data classification and characterization by multiple independent parties.

Another object of the invention is to provide method and apparatus for adaptively characterizing individual personality and preference attributes, as well as the subsequent utilization in the aggregation and delivery of personalized news and information. Prioritization and weighting schemes are utilized in the aggregation and delivery methods. Fuzzy logic, like variability in parameters and associated logic, is incorporated into this method and apparatus.

The objects of the invention are achieved by the use of common metadata language across all input and output processes, a finite search space, XML based data transfer, and graphical user interfaces which enable visual representations of the database structure as well as serve as the foundation of user selection and request submission.

Thus the method and apparatus more effectively and efficiently aggregates and delivers personalized information by more accurately characterizing the incoming data as well as more precisely characterizing the intended recipient of said information.

Users are identified by means of a secure login; a password is required. Users are also identified by their particular interests such as gardening, and by more stringent security measures such as social security numbers. Even greater security measures can be incorporated: thus a biometric authentication mechanism could also be employed in the system.

This invention also specifies the use of one standard set of, such as XML-based, files for delivery of data to all parties.

BRIEF DESCRIPTION OF DRAWINGS OF A PREFERRED EMBODIMENT OF THE INVENTION

These and other objects, features, and advantages of the invention will become apparent from a reading of the following description of a preferred embodiment of the invention, when considered with the attached drawings wherein:

FIG. 1 is a high level overview of some of the ways in which individuals differ from one another.

FIG. 2 is a pictorial representation of realistic scenarios of differing information desires and needs.

FIG. 3 is a chart showing the concept of spheres or logical groupings of topics and information, per an individual.

FIG. 4 pictorially describes a scenario in which two fictional characters A and B have very realistic "like" differences in their perceptions of excitement and "fun".

FIG. 5 outlines some key attributes of everyday news and information.

FIG. 6 describes the overall goal of the inventive method and apparatus. (The goal is to provide personalized information and services based upon a more efficient and effective input data classification as well as a multifaceted approach of classifying the end user.)

FIG. 7 describes the four core modules or components of the inventive method and apparatus.

FIG. 8 provides a functional overview at another layer of detail with components described in FIG. 7.

FIG. 9 describes an operational scenario in which the method and apparatus might be used to draw out the concepts, through example.

FIG. 10 pictorially represents the key concept of an infinite search space, verses a restricted one, wherein both the input and output processes share a common data structure.

FIG. 11 describes the hierarchical nature of the CML (Common Metadata Language) Tree.

FIG. 12 shows examples of use and how non-technical people are able to modify the underlying database structure.

FIG. 13 describes how visual and setup/adaptation processes share software modules.

FIG. 14 describes the notion of adding and dropping a node/element from the database structure.

FIG. 14A describes how a user adds or drops a node from a tree.

FIG. 14B describes how a mentor proposes to modify a tree, an administrator approves the proposed change, and a user automatically sees the approved change.

FIG. 15 shows the concept of morphing or recasting the database tree into different views.

FIG. 16 shows the ability to prune the "Tree".

FIG. 17 describes how nodes within the database structure have similar attributes.

FIG. 18 is a high level overview of third party enhanced data classification component herein referred to as CES.

FIG. 19 describes how information from different sources is translated, metadata enhanced, and stored in a common repository.

FIG. 20 describes the concept of adding metadata to further describe source material.

FIG. 21 further shows the concept of refining the classification of incoming data through the addition of "extra" metadata.

FIG. 22 describes the concept of extracting data type feature sets—those core nuggets of information commonly found in like material.

FIG. 23 describes how data is classified and entered via the inventive method and apparatus.

FIG. 24 presents two classification examples to lay out the concept of how data is multidimensional.

FIG. 25 shows how the database "Tree" or structure is modified via an approval process.

FIG. 26 describes the translation of metadata, varying in size and format, being received from several sources.

FIG. 27 describes the notion of characterizing the source of the data itself such as attributes of an article author.

FIG. 28 describes some of the enhanced data descriptors used in this method and apparatus.

FIG. 29 describes how the same hierarchical-based graphical interface is used to classify the target audience for a particular piece of data.

FIG. 30 outlines three core information pieces provided for by mentors and utilized by end users of the method and apparatus.

FIG. 31 describes the virtual organization supported by the method and apparatus, and wherein all parties are able to interact via remotely connected computers.

FIG. 32 describes how select time-sensitive metadata is automatically adjusted.

FIG. 33 shows four key processes utilized in both the personality and preference mechanisms.

FIG. 34 describes the core set of information per clients which when separated enable more-efficient security measures.

FIG. 35 shows how a composite client image is generated through incorporation of a suite of information.

FIG. 36 describes how the client personality/preference token might be used.

FIG. 37 shows how a CML based "Tree" interfaces running on the client's computer captures and displays information, and ultimately communicates to the remote server operations.

FIG. 38 shows how the method and apparatus derives information about the client via observation of software utilization and migration.

FIG. 39 shows how clients describe themselves, as well as how input data classifiers describe target audiences through the CML based "Tree" interface.

FIG. 40 presents the concept of classifying individuals per multiple generic types.

FIG. 41 shows users being allowed multiple spheres which span not only varying topics but also physical mediums.

FIG. 42 describes key user functions.

FIG. 43 describes the personalized-user web-based data-presentation display wherein users are able to specify where information is displayed, and with what formats, linkages, colors and other template attributes.

FIG. 44 describes the concept of locally defined and stored configuration information, and the asynchronous "electronic newspaper" like interaction between client and host services.

FIG. 45 shows user being sent CML updates rather than the entire data structure definition information.

FIG. 46 shows user being automatically sent a "data" file per selections made without the necessity of interacting directly with remote servers.

FIG. 47 shows that users configure how data and information is logically linked per topic.

FIG. 48 describes how clients use the "Tree" graphical interface to make selections and input information.

FIG. 49 pictorially represents the concept of prioritization and weighting.

FIG. 50 shows that users are allowed multiple aggregation profiles to define the aggregation and delivery of data.

FIG. 51 describes how users specify the format of an aggregated audio file.

FIG. 52 shows the concept of deleting information from user's listings.

FIG. 53 shows the synchronization and reconciliation of listings corresponding to different delivery mediums.

FIG. 54 shows intelligent audio-file management and utilization.

FIG. 55 shows use of the inventive method and apparatus in book publication.

FIG. 56 graphically depicts how via the readily-adaptable "Tree"/database structure can form the foundation of a new type of web-based learning methodology.

FIG. 57 describes an anonymous product inquiry arrangement for eliminating spamming.

DETAILED DESCRIPTION OF A PREFERRED EMBODIMENT OF THE INVENTION

Prologue

Everyone's Unique

Drawing from scientific terminology, everyone is unique, multidimensional and time varying—people change over time, in one way or another. FIG. 1 depicts some of the ways in which people differ from one another. Personalities are unique, as are socioeconomic factors and pressures, and the physical bodies themselves. Health and well being (mental and physical) vary from one person to another. In addition everyone's financial conditions is unique, as is his or her history and past experiences. Individual learning skills vary from person to person and with learning techniques. One person may learn faster using self-study, whereas another might excel when offered personal mentoring. People have different areas of interest and preferences.

Therefore to optimally help, teach, assist and entertain individuals, the method and apparatus needs to accurately "understand"/characterize people as unique and time varying entities.

As depicted in FIG. 2, there exist varying information needs and preferred methods of interaction. Joe's a big picture person, and as such prefers seeing more of a high-level view of a topic. Ken prefers narrative, whereas Mary loves to see things in bullet lists rather than wade through text—"give it to her in as short and to the point as possible"—she might say. FIG. 2 goes on to depict various scenarios in which not only is what-information needed or desired different, but the manner in which it is preferred to be delivered will vary from one person to another.

Therefore one thing enabling a knowledge system to save people time and provide personalized information guidance and services, is efficient and effective capture, characterization, and, ultimately, utilization of personality and preference a attributes of each person.

Exploring "what" is to be delivered a bit farther, one will find that people have many general or broad areas of interest, each of which may encapsulate more specific sub-topics of interest. Referring now to FIG. 3, these general areas of interest are herein referred to as spheres of interest. Notice, in FIG. 3, that Mary is a mother of three children, one of which is gifted. She works in the business end of the home building industry, and previously was interested in sky diving. She gave it up last year—indicated by an "X" through the topic listing in FIG. 3. She has three general spheres of interest: family, fishing, and home building. Information regarding family and raising children is most important to her as indicated by "#1" and "#2", and in particular she is interested in news related to gifted children, "#2". Within her home building sphere of interest "#4", she has a more specific interest in architecture, "#3". As depicted in FIG. 3, her interest in fresh water stream fishing ranks $5^{th}$, whereas news related to family/parenting is her first priority.

John on the other hand is an unmarried farmer with health problems. He has a markedly different set of spheres of interest.

Thus we see simplified examples of how an individual has a multitude of spheres of interest, each of which may contain a number of topics as well as sub-spheres. Spheres are merely groupings or associations of topics into a broader classification.

Some spheres are larger than others, they vary in size and can be embedded with other spheres. The spheres of interest (the aggregate group) associated with every person will be not only unique, but multi-dimensional and vary over time. A twenty-year old interested in surfing may not be interested in surfing at age fifty. A sphere of interest related to a person's profession will obviously change as the person's career takes the inevitable shifts over time.

Therefore as part of capturing and characterizing an individual, the knowledge system should account for the individual's spheres of interest and utilize that information to aggregate and deliver knowledge in accordance with those desires.

In FIG. 4 is another example to bring out some concepts which may not be intuitively obvious. Given in FIG. 4 are two generic individuals: Person A who prefers a more wild and spirited existence, and Person B who might be older with a preference for different information and have different interactive needs. Handling the information and interactive needs of these two distinctly different people should in an optimal world be different.

Some of the ways in which a knowledge system may maximize the effectiveness and enjoyment of an information interaction, is to customize (i.e. personalize) the following:

Content—"what it is", the information itself, deliver what someone wants

Format—"How it's presented"

Medium—physical method of delivery—Examples: audible verses text; reconciling multiple mediums per topics Prioritization of Information—"I prefer A over B; but if C is available, C over A"

Sequencing of Information—these topics before those; the order of presentation

Timing and updating of information

The Interaction itself—such as web-based display

The knowledge system of the invention incorporates the above-mentioned customizations.

Mentors are people who have knowledge and/or experience which they are willing to share with others. Simply put "People whom have been there and done that."

They come from all ages and all walks of life. There's no precise formula or criteria by which someone is declared a mentor. They don't necessarily need an advanced degree, or societal certificates of any kind. They're simply people willing to share and help others. Of course receiving the proper gratitude and rewards for guidance offered, goes without saying. As does some mechanism by which access to and interaction with a mentor is controlled.

Someone willing to offer advice for free but inundated with hundreds of emails and requests for comment, is not realistic scenario. Mentors are out there, willing to share in their knowledge for a just reward; however there exists no automated mechanism by which to make the connection with those looking for assistance, or in a broader sense, by which to control the overall interaction. Of course, one way to control access is simply invoke a monetary price tag appropriate for the quality and quantity of the delivered help. But is this the best way? Mentoring is by no means a novel concept.

Mentors have existed throughout the centuries. They can simplify an otherwise complex matter. They're not afraid of teaching and sharing—not afraid of being less-valued for releasing some of the knowledge they have gathered. Quite often you here the phrase "information is power". Most things in life can be boiled down to a handful of key concepts, ideas, and steps by which something is accomplished. Mentors can provide a number of things including commentary on news and information, general information on a topic such as "how to guides", or customized support.

The knowledge system of the invention incorporates an automated conduit from mentors to those looking to learn. The conduit involves an information delivery apparatus flexible enough to handle varying depths of information on numerous topics; to integrate information from diverse sources; and to offer a more segmented electronic-learning methodology—a "pay for book section" is a possibility.

People learning the same topic often have very similar questions and interests. Likewise, there is a finite number of paths by which a topic is learned, and there's overlap in paths. Learning is more a problem with classification, storage, retrieval and distribution of information, than with lack of knowledge and experts willing to teach. The knowledge is out there—the problem is providing a system to automate the interaction—form the connection.

The world currently tends to offer a one size fits all educational interaction. Today's business world offers less training opportunities than it once did, and may replace the employee rather than re-educate him or her. So "Learn on your own or be left behind" is a current motto.

Another, largely unaddressed problem with today's educational system is that an individual's environment is quite often stronger than the educational system itself. Thus, to efficiently and effectively teach such people, aspects of the "individual"—"who they are as people" must be accounted for in the educational technique applied.

Distance learning shares problems and issues with many other fields. But how I learn about programming in C++, is similar to how Mary learns about home construction in order to be an educated consumer. What people want from distance learning is very similar to needs associated with consumer purchasing/E-commerce, and to the news industry.

People want:

Access to the specific information they need—but separated from the "fluff"

A screening service—ranks and classifies information for them

Access to experts—people who have been there done that

A system for learning whether anything is more efficient than what they currently have A learning pace and path appropriate for "you"

A community where people of like interest interact

Someone whom you can "ask" questions

Health—Mind/Body Interaction

Another field, in which characterization of the individual—their personality, their environment, history, etc. is beneficial to the delivery of a service (including the delivery of information), is the health industry. The interaction of a person's mind and body is a well-documented fact. The health services industry most certainly can be enhanced by incorporating very specific information pertaining to the individual in the delivery of services, in particular the delivery of pertinent information. Distribution of health information—known medical facts/studies, risk factors/illness causes, cures/medications, wellness programs, etc.—is very limited today. A system which securely and privately characterized an individual, along with providing pertinent information about their unique circumstances, would be useful today. Increasing people's awareness of health information, will enable them to make more intelligent decisions regarding their lifestyles. Very often today people don't become aware of looming dangers until they manifest themselves in some physical form.

The "Experience"/the Excitement

Individual characterization enables one to do more than just deliver customized news and information. It enables you to customize the experience—the interaction itself. To capture people's interest. To offer a sense of excitement, an experience, and/or a sense of community. Great businesses create an experience that continually lifts people out of negative and into positive perceptions. In other words they go beyond simply providing a service or product. They create an experience, they inspire and touch people. This characterization enables a person to customize all aspects of an interaction—from ads, to information, to the interaction method itself.

Personal Assistant—Customizable Services

It would be nice to have a personal agent that finds "things" for you when you need them, assists you with tasks or does them for you. That sorts through your incoming magazines and clips out articles they think you might be interested in. That also categorizes, sorts, and prioritizes everything based on "your" tastes"/preferences.

How would a personal assistant help with distance learning, mentoring, and information access? If you think about what an assistant does and how they do it, you'll soon discover that the level to which an assistant can help you is directly proportional to the level in which they know you as a person. The more an agent knows who you as a person are—your personality traits, socioeconomic conditions, environment, preferences in news topics and the like, or what products you're looking to buy—the more that agent can truly assist you with activities and tasks.

Correspondingly, the level to which a person is understood for his or her differences from and commonalties with others, is proportional to the knowledge system's ability to deliver customized information, mentoring and distance learning. As an assistant, the knowledge system takes care of things for you. It gets you the knowledge you need. It also acts on your behalf—as a "go-between" in various interactions.

But, characterizing the individual is half of the equation—effective and efficient characterization of incoming information of any form, is the other. Perhaps there is synergy in the ways one might characterize both the person as well as the information, such as in the reuse of methods, processes, methodologies, software etc.

What is News and Information?

Now referring to FIG. 5, observe some key concepts associated with news and information in general. A generic news article is a complex aggregation of material with distinct attributes. Readers commonly and at times mistakenly take an article for fact and at face value. To properly characterize a piece of news, many factors and issues need to be addressed. One is that the greater the degree to which one can characterize something, the greater the degree to which you can satisfy very precise information needs. If Joe stores all his tools in a huge bin called "Tools", it takes him longer to find (if at all—if the bin's large enough) the ¾ inch socket for his wrench. If he has a large number of tools, he will also become rapidly frustrated—"Ah", similar to the current Internet search engines.

Returning to news and information, as observed in FIG. 5 there are many attributes associated with the source of a piece of news and information. An author always has certain biases, credibility, education and experience levels, as well as affiliations. Where, whom or what the data or information came from, is important in thoroughly classifying it. An article written by someone with a PhD, or with their own business in the same field, might produce a more valuable article than a journalist merely capturing a story in a new field for him.

Moreover, information and data can be multi-sensory—in other words, information and data incorporated in many forms, such as audible and text segments. Quite often a piece of information can be "boiled down" summarized into varying levels of information disclosure, including bullet lists. With every piece of data and information there are associated "target" audiences/intended recipients. Capturing this type of information enables further classification of the material.

There are psychological aspects to every bit of information. Well documented are the psychological effects of various forms and types of news and information. Bombardment with endless news on "blood and gore" has a negative effect on a person's psyche. Collective, conscious, and mass propaganda, are also well documented effects, theories and activities. Needed is a method to not only classify material according to psychological factors, but to also utilize such data in the associated aggregation and delivery methods.

There are also educational aspects to information segments—things such as guidance, "how to", key nuggets of information, which may be further utilized down stream. Articles describing new models of cars all report a number of very distinct and standard bits of information such as horsepower, torque, number of doors, size of engine etc. If one were able to capture these nuggets or feature sets, one could further classify the material and utilize the information in such things as assisted buying. If one can automatically extract these feature sets across a spectrum of news articles, they easily become the basis of solid consumer-buying decision power.

Information/Mis-Information Overload

A person's perception of reality is just that—it may or may not be totally true. If someone tells you a bit of information—is it necessarily true? Just because a story appears in a major publication, does it mean it's 100% accurate? Quite often people assume so. One's perception of reality is limited by many factors including the method by which you access the information, the environment in which you live, your socio-economic conditions, and the availability of information.

How much time is wasted looking for information needed? Yes, search the Internet we're told. It produces hoards of useful but more often useless information, not necessarily categorized according to your intentions but more by the workings of the search engine and its underlying business models. This information is a potpourri of fact, fiction, marketing ploys, mis-information, opinion, hearsay, propaganda, and sometimes evil-spirited information. How often do people subscribe to magazines and never read them, or miss an article which they would have loved to have read or heard? Are the products sold in one large department store, the only ones manufactured throughout the world? Are those three types of shovels the only ones out there?

The behind-the-scenes workings of the systems, business models, and practices are not widely understood by the general public; nor are the psychological effects of many of the common business practices today. The underlying goal most of the time is of course to make money, which means influence consumer purchases—what ever they might be.

The Internet abounds with information on every conceivable subject. There are numerous sources of printed news and information (magazines, newspapers, on-line news etc.). Every subject category conceivable is covered today by at least several magazines. But who has the time, the patience, the energy to do much beyond working their day job, taking care of the home, and spending what leisure time they have in some pleasurable fashion? Unscrupulous businesses capitalize on this imbalance in ways unbeknown to many consumers.

If you look at different news sources (i.e. news conglomerates, publishers), not only do they store the actual article differently but the information (metadata) about the article is quite often unique. Making matters questionable is the fact that metadata like an article's title may be chosen more for its marketing value/sales rather than to clearly and accurately represent the material contained therein.

Metadata being information used to describe something else, one cannot underestimate the importance of the metadata, or more particularly of the metadata schema—the overall structure, identifiers, linkages and relationships. How something is stored and retrieved is directly dependent upon how the item is uniquely classified.

The knowledge system of this invention employs a more comprehensive, time varying and multidimensional model of metadata.

It's one thing to provide people with news and information they have specifically asked for or requested, but a whole different level when you're able to enrich their lives, touch them, give them more life and time through utilization of detailed analysis of who they are as individuals; to go beyond the obvious and dynamically learn who they are and use that information on behalf of that person. Such a discovery process involves great deal of trust on behalf of the individual and of the service provider.

If you tell someone you're interested in fishing, he can get you articles on fishing; but if he learns who your are as a person, he can offer you a much more.

It has been observed that there's quite a bit of misinformation out there. And there is the situation represented by the saying—"garbage in equals garbage out". Then too, the psychological aspects of information are not well accounted for. And most services today fail to see their clients as unique, time varying, multi-dimensional individuals.

No one knows the true nature of the information better than the source of the information itself. Who better to classify the article than the author himself/herself. While it might be more cost effective to utilize some automated method to process past information to extract metadata—in essence post processing—it is more accurate in the case of future/incoming information to incorporate a source data entry mechanism whereby the true author properly characterizes the material. The new knowledge system utilizes the author of the article to specify the metadata and characterization such as target audience through some automated data-entry mechanism. This new knowledge system actually takes a slightly different approach, incorporating a hybrid man/machine metadata process to achieve a more accurate and efficient means to data classification.

The "font-end" source metadata enhancement process/method herein employed utilizes human readers, as opposed to just automated electronic methods. Of course the readers interact with a highly structured and integrated suite of processes/procedures and associated electronic (software and hardware) components.

As automated processes mature or sources provide truly honest and accurate self appraisals, the need and benefit for enhanced "third party" metadata services will become lessened. Whether a software-based text analysis program ever give you the same information as can a person actually reading the text can, will be decided at some point in the not to distant future. The issue of relying only on the product source to provide streamlined, straightforward metadata for a knowledge system, is inconsistent with business practices' interests motivated to produce sales.

The Internet and current computer technology offer an interesting opportunity to enhance both the effective use of time and the quality of peoples' lives The knowledge system of this invention A) effectively integrates information from diverse sources, B) verifies, adds to or enhances source metadata (product data sheet; article title), and C) searches, queries, retrieves, and aggregates information. It identifies "things" people want, need and/or desire, given all the information and misinformation that's abundant in the world. It not only locates "things" for people, but also enriches their lives. It gives them more life. It "touches" people beyond helping them find that book they're looking for. It helps people live more and grow as people. It helps the person who from when they were a child wanted to become an actress but due to life's circumstances was never able to pursue their passion: there are countless people in the world with untapped passions and interests waiting to be unleashed with proper nurturing and guidance. The new knowledge system teaches people. It knows who someone is as a person—their personality, background, interests, etc.—to more effectively and efficiently teach them.

Method and Apparatus

FIG. 6 of the drawings shows a high level overview of the new and inventive knowledge system or adaptive characterization and aggregation system ACAS 28. The ACAS 28 system delivers personalized information, data and services 7, through the use of individual characterization 3, news and information 1, filtering and classification enhancement 2. ACAS utilizes client characterization information 4 to retrieve and aggregate at 6 news and information 5 of particular interest to the individual client.

FIG. 7 of the drawings shows that ACAS 28 consists of four interconnected core modules 8, 9, 10, 11, which share an underlying Common Metadata Language (CML) 12, also referred to as the database schema. The CML 12 ensures that the input data is specified consistent with how data is requested and aggregated on the output. The same hierarchical data space, the CML 12, is used throughout the ACAS 28 system. The CML guarantees consistency and aids in limiting the search space. (Today's search engines utilize an unlimited search space rather than restricted one and offer a higher matching rate.) Data 1, which is not limited to any field, consists of both the actual data item such as an news article itself and the source-supplied metadata which might be the publisher's abstract, keywords, title, author, publication date, etc. The Classification Enhancement System 8, herein referred to as the CES, enables the storage of the source data and metadata 1, as well as offers services which enable a third party to enter additional metadata as well as alternative renditions of the data itself. These renditions include bullet lists, summaries, summaries with expert comment, as well as varying mediums such as audible and textual formats. All of this metadata constitutes data characterization information. The use of database technology to store information and data is well documented and will not be repeated here.

The Preference/Personality Engine 11 (PPE) gathers and manipulates information provided by or observed from clients of the system and formulates composite images of the personalities and preferences of the clients. The PPE enables the ACAS system to offer services and gather information time sensitive and pertinent to each client in a highly efficient and effective manner. The client characterization information 20 when combined with the data characterization information, enables the Aggregation and Delivery System 9 (ADS) to gather, package, and deliver customized information 14 to the end user, the client, via a highly graphical and customizable interface 10. This interface is referred to as the Multi-Modal Interactive User Interface 10 (MIUI).

The MIUI 10 is a suite of data entry, display, and manipulation screens and tools. Through the MIUI the client is able to manipulate and enter personal information 15 to and with the PPE 11. Third parties also utilize the MIUI 10 to enter metadata including the additional renditions 21 previously described to the CES 8. The MIUI 10 additionally enables system users to modify 17, the CML 12 itself, as the hierarchical data schema changes over time.

This new and novel automated database update mechanism and process requires no software changes and requires no specific technical skills. The ability to add and delete items/parts of a database schema while maintaining system wide integrity is new and novel. An automated data entry and processing mechanism 8 which enables third party data entry and utilization 8 in the search, aggregation and delivery system 9 methods is novel as well. The ACAS system performs data retrieval and aggregation 9 based on a finite data set defined within the CML 12. All four core modules, 8, 9, 10, and 11 utilize the CML 12 as indicated by 16, 17, 18 and 19. By capturing and processing very specific information regarding the clients, the PPE 11 is able to formulate an image of a client which enables highly targeted information and service delivery.

FIG. 8, elaborates upon the concepts described in FIG. 7. The CES system enables the categorization 39 of the incoming data 1, as well as the entry of additional metadata and other data 30, via the enhancement component of the CES. The "raw" or unchanged source data and metadata 1 is categorized 29, enhanced 30, and stored in databases 27. Trusted third parties such as mentors and experts, can add valuable insight and additional information via this enhancement 30 component. The categorize component 39 allows for a greater depth and breadth of data categories, unique data attributes and is adaptive over time. The word "trusted" is herein used to depict the notion that those parties adding value to the original information must be authorized, monitored and of such character that they will not infect the nature of the information with distasteful or in any other way inappropriate input. Those parties participating as third parties are securely authenticated by this method and apparatus and their actions are monitored and validated. The method and apparatus makes direct unauthenticated and unapproved input into the mainstream database, not possible. Trust is a critical pillar to the method and apparatus—not only for the data input side but also in the security, protection, and utilization of the very personal information gathered on each and every client. Users and clients are also securely authenticated, as are all users of the method and apparatus. The activities of all users of said method and apparatus are logged meaning captured and stored securely. Secure authentication in client/server environments is well documented and will not be repeated here.

As shown in the upper right hand corner of FIG. 8, the PPE includes a Personality Inference Engine 24 (PIE), a Preference/Interest Capturer 25 (PIC), and a Composite Image Generator 23 (CIG) which combines, correlates and integrates client related information into an overall classification. PIC 25 processes client preference and interest information such as topics of interest—"what/how/when and in what format they want them"—also the "why"—why are they interested in these topics. PIE 24 processes information related to "who you are as a person"—all aspects including personality traits. PIE 24 also forms characterizations of each client which are refined over time. All client related information 32 is stored in databases 26. CIG also creates a Personality/Preference Token 22 per each client, which token is an encapsulation of personality and preference information. This token can then be used when the client interacts with other entities such as businesses and web sites. The web sites read the visitor's token and customize various aspects of the interaction based on information contained therein. The token 22 generated by ACAS 28 would be stored on the user's local machine and read and/or transmitted to outside sources such as third party web sites. End users/clients interact with the MUIU visualization and data entry screens 10, to enter and retrieve information 15 to and from the PPE 11. The ADS system 9 consists of an aggregation component 37 as well as a delivery module 38. Third parties also use MIUI 10 interfaces to enter and retrieve information 21, with the CES 8.

FIG. 9 describes a simplified view of a real-world operational scenario. News and information 1 from a publisher—say AOL Time Warner—would be reviewed, categorized 29, and the metadata entered into the ACAS system 28. The Mentors/Experts would also identify, characterize and enter additional metadata as well as other information 29, 30 such as bullet lists derived from the original information. Mentors also enter additional information 30 such as recommended books, products and services. Peers 42, may also enter information and metadata 1, 29, 30 into the ACAS 28 system. The consumer/client/end user 43, would enter preference and personal data 15 to the ACAS system and receive customize news, information and services 7. FIG. 9 graphically depicts one very simplified view out of many possible operational scenarios involving this invention.

People are multi-faceted; they have different interests, aspects and dimensions. You can say more than just "Mary's a doctor". Moreover how people are characterized will change over time. News articles as well are typically about multiple topics. Rare is the case where an article is strictly about one single topic. Most articles cannot be characterized into single areas. There are many aspects to a piece of information, including its target audience. The relative importance and value of the information win change with time as well. Businesses likewise are typically in a multitude of fields, and like information and people, will evolve over time. Thus we see most items in life are multifaceted and time varying.

Now referring to FIG. 10, it shows two fundamental data search issues being addressed by the invention. In the top half of the diagram is a simplified example of how in an optimum search scenario the way in which input data is classified and stored (here in one of three bins), must match the manner in which it's requested on the output. (If Sam were to have 1000 nondescript bins in which to store his hammer and had no agreed upon methodology with Sarrah, it would take Sarrah a much longer time in which to locate the said hammer. Similarly in the real world today, data is stored in varying formats, with varying metadata—the thousand bin scenario—forcing current search engines to search a pseudo infinite data space.)

In the right side of the bottom of FIG. 10, is pictorially represented the concept where if the search space is bounded, the efficiency and effectiveness of searches is greater than that of infinite search spaces.

(Databases today have a fixed underlying schema/structure. Changing this schema is typically a manual and time consuming process which inevitably means expensive. Back-end systems are tied to such schemas, as are numerous software processes. Alterations typically involve design modifications, software changes, subsequent testing, and production system updates. No automated tool/system exists for not only making the changes but ensuring system integrity. Likewise end users who are typically not technical experts, are not able to directly alter the schema.) The schema should be able to expand and contract over time in uniform as well as non-uniform ways. (In other words, very often a hierarchical data structure will expand in one particular area faster than another.) This invention incorporates these capabilities within software.

Metadata is simply data used to describe something else— for example attributes/descriptors. Metadata can be words, numbers, short text, attributes, and identifiers of many kinds. For a news article, metadata might be the title, the author, the publisher, the date, and the topic. The article itself would of course be yet another bit of data.

FIG. 11 is a visual representation of the CML 12 ("the Tree"). The CML is a hierarchical data structure, which extends from broad categories on one end to fine detail on the other end. FIG. 11 represents a hypothetical example whereby Daimler-Benz not only manufactures automobiles but synthesizes fuels from its Asian wells. Of particular importance is the notion that Daimler-Benz can appear in multiple places within the hierarchical data structure.

FIG. 12 extends "the tree" example to include alternative scenarios (news publishers, E-commerce site owner, and Academic Entity) in which the hierarchical structure might be used. Hierarchical data structures are used in many fields.

Now referring to FIG. 13, we see that Betty who has just finished an article, will input the article and metadata via the tree and software modules shared in components used on the back-end retrieval process. Ron, the client user, inputs his news and information selections, seeing the same tree. Input and output processes share common visual software routines, as well as other modules used for such things as migrating the tree and selecting items. The same core modules such as those used to set up the initial data schema, as well as those used in schema modification, are identical.

The software currently delivers content to user via standard email in addition to his being able to access content while connected directly to the back end servers. E-mail allows delivery of data to users regardless of whether they are on-line or not: like an electronic newspaper. When the users next logon—the data is there waiting for them. Users set up their preferences for information in addition to defining when it is to be delivered. This way Mary can have her news articles waiting for her at 6 AM to read or to be downloaded to her MP3 player for audio.

In FIG. 14, the automated addition and subtraction of tree nodes (database schema nodes) is discussed. The software utilized in this invention is able to adjust the database schema in real time by keeping track of all parent, and sub-nodes— those nodes below the current one.

Database software, from companies such as Oracle and Microsoft, allows designers to modify the underlying data schema—in essence, add and drop nodes to a hierarchical tree structure. What does not exist today is an automated method by which these changes made can be 1) approved prior to release and 2) reflected into user interfaces. Currently such data schema changes require software changes, recompiling of executables and "swapping" of old executables for new ones. The invention herein described completely automates the whole process of making a change from the back-end database side to the end user.

The system offers the ability to on-the-fly add/drop tree nodes to the database and have the change instantaneously reflected in all users screens on their computers. Now referring to FIG. 14A: A mentor decides to add a sub-node called "tennis" to the database under the general category "sports"—she uses the software graphical user interface to enter the required information for the addition. She is also able to delete the node called "Football", using the same software interface.

FIG. 14B describes the sequence of events. After the mentor suggests a change to the database, an administrator is notified (email or instant alert) of the request for an addition. Upon approval via another set of user screens, the administrator approves (could also deny) of the change and sets flags for the back-end software to automatically adjust the database. For those people whom are currently connected as in web/internet—the next time their browser updates they will have new database structure information. All automatic. It's similar to adding a new directory on your computer to store stuff (Word docs—pictures, etc.) but being able to search, query, aggregate, etc. The stuff is stored in there automatically. (Attachment A sets forth the XML source code for performing the Add/Drop of Database Nodes function. The source code could be in other software languages.)

FIG. 15 describes another novel concept of this invention. Data and information can be characterized in different ways. The tree can assume varying forms. Information can be characterized by product/field, people, company/organization, event/action, and by place. The hierarchical data structure— the tree—will assume different forms dependent upon the characterization scheme. The tree displayed by product/field in the top portion of FIG. 15 is recast into that of the lower portion—the company/organizational view. The method and apparatus enables the user to recast the tree to visualize the hierarchical data in different ways. Users are able to make selections and perform all interactions regardless of the form in which the tree appears.

In FIG. 16 is described the concept of a user being able to "prune" the version of the tree they see. Topics/categories of limited interest are removed from the view the user sees. Through the software, a user selects which portion(s) of the tree he or she would like removed. This reduction process in no way effects the underlying database—but it offers the user a more concise view of the information he or she is most interested in. In FIG. 16 we see the removal of the sports branch which is of limited interest to this particular user.

As described in FIG. 17, tree nodes have attributes. Each node has a set of generic attributes—Education, Use, Technology, Business, Resources, People, Events, and Generic-types. As shown in the lower portion of FIG. 17, a news article about transportation may in fact be sub-categorized as an article about technology used in transportation. Likewise, as shown in the right hand portion of the same diagram, an article about Mercedes automobiles may in fact be sub-categorized as one which talks to the technologies Mercedes uses in their Automobiles.

Beginning with FIG. 18, we further elaborate upon the classification/enhancement system—the CES system 8. Users of the CES component are not restricted in locale they can either remotely or locally interact with the CES system. The same location independence applies to all aspects of the ACAS 28 system. In simple terms this means that if Joe needs to enter information, adjust the database schema, or enter source information, he can do so from the comfort of his home via remote secure connection. Secure/authenticated client-server connectivity and methods are well known and documented and will not be elaborated upon herein.

In FIG. 18 we see that there are three principal functions of the CES component:
  Data and metadata enhancement/categorization
  Source data entry
  Database schema/tree adjustment.

As discussed previously, source information such as a magazine article is received and reviewed by a third party. The third party determines how said article should be classified, and what additional metadata might be used to enhance the way it's classified; and then interacts with the CES to enter said information. Source data entry identifies another novel feature of the CES—where individuals such as independent journalists are able to enter metadata describing their work and the work itself, as well as use the tree to categorize the data. As data is entered into the ACAS 28 system, the tree will grow and shrink as new topics are added and subtracted. If Mary writes an article about a newly discovered African tree frog, she will undoubtedly need to add a new node to the tree to represent this new type of information. The ACAS system enables users to make recommendations for modifications to the tree which only become effective when approved by a system administrator.

FIG. 19 describes further how information from diverse sources in different formats with varying metadata is translated, classified, and stored in databases 27. Once again we see the information received is enhanced with additional metadata and recast into other forms and formats 40, all of which are also entered into the databases 27. The data received from one publisher has a high probability of being different from that of another. The information received from a single source must be translated 39 into formats and equivalents to that dictated by the CML 12. If in fact all sources adhered to a common descriptive standard, such translation would be minimized if not eliminated. But the nature of a free marketplace and a free world makes universal compliance to a single common standard highly unrealistic. Therefore such translation is required for the foreseeable future.

FIG. 20 elaborates upon the trusted third party metadata enhancement concept. An article will arrive from a given publisher. It will have the some notional metadata such as the title and publication date. The third party who essentially is just an independent reviewer, would review the material. The reviewer optimally might be someone experienced in and/or knowledgeable on the subject matter. The third-party reviewer would generate and enter additional metadata such as that described in FIG. 20—namely what they consider to be additionally descriptive and possibly more-accurate and marketing-free title, abstract, and summary, as well as "content factors". Content factors are numerical approximations of how much a particular item is about a particular topic—10% about X, 50% about Y and 40% about Z. The party would also identify the target audience, and recast the information into bullet lists, abstracts with commentary, and other formats. In addition the third party would recast the data into additional mediums such as audio. Once the additional information is generated, the party would enter the information into the ACAS 28 system.

FIG. 21 shows an additional example which draws out the point that both the original source data and metadata including that as well as other information entered into the ACAS 28 system by the third party, become logically linked and incorporated into the database. The bottom of FIG. 21 shows a hypothetical example. The publisher has released a book with the title—"Introduction to Active Control"—which implies to the average user a high level overview on the subject matter. When reviewed by the third party, it is discovered that a more appropriate title might be—"Advanced Technical Introduction to Active Control"—due to the fact that the book is not in fact an introduction but more of an advanced discussion. (Intuitively one might suspect that the publisher has chosen the word "Introduction" to attract more potential readers.) The CES enables users to take misinformation, partial or incomplete metadata, non-standard compliant metadata, and other data in a limited number of formats, and recast as well as store the information.

"Content nuggets" is another aspect of the ACAS 28 system. Users enter generic information about an item, which information can be subsequently used in a whole host of applications. FIG. 22 shows an automobile article example wherein information such as horsepower and torque might be identified and entered into the ACAS. Regardless of where the article describing an automobile originates, it likely will have mentioned certain common metrics of which two are mentioned above. Nancy can request information on 4-door cars with AWD and of a horsepower greater than 250 because she doesn't like slow cars. With "content nuggets" captured on the front end, back-end users can draw upon this information to make purchasing decisions.

The system is preprogrammed to determine the "key features" in a piece of particular data concerning a generic type of material, say a car. The system prompts remind mentors to enter the "key feature" metadata" for various types of generic material. In the instance of an article on a new car being produced by a major car manufacturer, there undoubtedly are very specific key features that car buffs look for—and this list is relatively short—things like horse power, torque, number of doors, and type and size of the engine. Most articles of the same genre incorporate this key information. What this system does is assure that metadata describing this "key feature" information appears with the particular piece of data being inputted into the database.

FIG. 23 describes how things are entered and classified in the ACAS 28 system. An article appears in a local newspaper telling the dangers of driving while using a cell phone. The article must be classified and the primary topics identified. FIG. 23 shows a third party might migrate the tree and select two positions in the database schema. Third party Susan selected that the article is 60% about the dangers of using a cell phone and 40% about driving while using a cell phone. The article logically has relationships with both tree nodes. A user requesting information by selecting any one of the two branches displayed, would see the article. All relationships of a piece of information being accounted for, the effectiveness of the retrieval process is unlimited.

FIG. 24 describes an additional classification example. An article comparing the BMW 528 and the Mercedes E-class would be classified with a content factor of 50% applied to two nodes in the tree. Additionally, an article on the training and operations of the U.S. Navy Seals would here again correspond to two tree nodes with 50% content factors.

FIG. 25 shows a simplified representation of a database schema "tree" adjustment. John writes an article about a future car—the E930—which won't be available for purchase until 2005. Currently, the tree does not have a node to support this new item. John requests an addition of a new node with name E930. Mary—an ACAS administrator—is automatically notified of this request and grants the addition. The ACAS system offers a level of "sanity" checking prior to the release of material for public consumption.

FIG. 26 describes the translation of metadata. Sources A through D might have four different lengths within in which they quantify a title. The ACAS system translates between the independent titles and one common system size.

FIG. 27 elaborates on the Data Source Characterization concept. ACAS 28 stores and utilizes information which characterizes the nature of the source. Jackie with 13 years experience has written article A, while Nick who is a novice in the field has written article B. ACAS allows entry and utilization of information indicating which article might be more valuable. Thus Buck can request and receive articles only written by authors with at least 10 years experience.

FIG. 28 elaborates further the notion of enhancing metadata. The top portion shows an article title describing a new sports car—"Hot & Flashy". A third party mentor/expert would read said article and possibly come up with a more accurate title such as "2001 Ferrari F150 with increased HP". The base of the figure sets forth a discussion of the cellular phone article previously discussed. So in addition to identifying content factors, the reviewer (third party) has also identified the article as "negative", meaning not uplifting, and that it's of heavy detail and very technical.

Target Audience Identification (TAI) is another feature of the ACAS 28 system. Part of the data set that third parties enter into the ACAS 28 system for a particular piece of information, is the potential set of individuals whom might be interested in the material. As in the case of content factor, a hierarchical structure (a tree) is migrated and used in the selection of various nodes with corresponding percentages. However unlike content factor which indicates how much an article is about a given topic (identified as a single node), the audience factor (TAI) is an indication of how important the material is to that given party. The center of FIG. 29 shows that the reviewer has indicated that if a client is a gardener, he or she might be interested in a particular article on White Triam gardening with a probability of 40%. If Joan has been classified as a gardener of White Triam flowers, she would be 100% interested in this particular piece. Note the hierarchical nature of the display mechanism. The software modules used in various aspects of ACAS 28 are common. Thus FIG. 29 shows the two specifications of whom might be interested in a particular piece of data.

Both the input data and the end users are characterized, using hierarchical datasets: the software driving/enabling the interfaces for specification are commonly available. When Mary, a new client/user, wants to specify "things" about herself she will migrate user graphical interfaces and make selections. As shown in FIG. 39, she will note her occupation as an international adoption lawyer via a visual tree screen with selection capabilities. Conversely, a mentor will enter metadata about an article on White Roses using interface screens and will note that gardeners—especially those of White Roses as shown in FIG. 29, would be interested in this material. Not only do mentors specify what the material is about, they also specify who might be interested in seeing it.

As mentioned previously, ACAS 28 accommodates the entry, storage and utilization of multiple forms of the same information. The full length article may be of interest to a select group of readers; however bullet lists or summaries with expert commentary might be of greater interest to others. FIG. 30 describes three types of information stored and distributed by the ACAS system—namely "Here-N-Now", "Novice-Guidebook", and "Mind-Basics". Here-N-Now are short narratives on particular topics outlining the current state of the field. The Novice-Guidebook is just that—it serves as general advice for those starting out in a field. Mind-Basics are summaries of key points.

FIG. 31 pictorially describes how an originating user as well as a mentor of the CES system in most circumstances interacts with it for remote data and information entry, using a personal computer, the internet, and secure communications. As mentioned previously all three of the above instruments are well know and documented. Thus data and information can be recorded as the source material is created.

People, things and objects can be described with very specific identifiers, like Sarah is "32 years" old, Xfer software "version 3.1", the "2002" model Jetta, as well as with "broader" more generic identifiers such as Sarah is "thirty something" or "young middle age", Xfer 3.1 is the "latest", "hottest" version, or the Jetta is the "in car", the "hottest with 20 year olds". Knowing Sarah's birthday enables the system to automatically know when she turns 33 and is able to reclassify her as "middle age" when she enters the age band 40 to 60, as an example. A mentor characterizing an article will utilize these broad generic classifiers in inputting into the system potential target audiences for this article. While in fact a mentor could designate an article appropriate for say people 56 years of age, it's often more accurate to call out a span of ages (45 to 60) for whom the material might be of interest. Likewise, from a back-end logic standpoint, a simple check that someone is "middle age" rather than verifying that their age falls within a certain range requires less processing. By knowing information such as birth-dates of individuals and time, as in date and time, the system can automatically adjust metadata.

An article published yesterday can be characterized as "hot news" whereas one published a month ago is "recent" news. As the material ages with time, so too does it's generic identifiers or metadata. Knowledge of time enables adjustment of metadata. Database utilization is another means by which the system can automatically adjust metadata. The article labeled "most popular" within a category is partly driven by the statistics like the number of users whom request the material or for whom the material is delivered.

Alteration of user preferences will sway the generic classifications of said user. Sam has interest in sports, fishing and stock trading, and requests information with relative frequencies of 60% articles on stock trading, 20% on fishing and 20% on sports. Recently however, since retirement, he has severely cut back his interest in trading. The metadata associated with Sam is altered to reflect his changes in preference. Advertising presented to Sam automatically reflects this shift in interest. The metadata used to describe Sam's advertising interest would be altered per changes in his specified preferences.

FIG. 32 sets forth a simple example of metadata adjustment to accommodate changes in the state of a particular piece of information. While the Oracle product described may be describing the latest and hottest at one point in time—six months later the data and information may be relatively outdated. End users requesting information on the latest products may not necessarily be interested in the old data.

FIG. 33 shows four key processes utilized in both the personality and preference mechanisms. The Personality/Preference Engine (PPE) develops a profile of each client using a Personality Inference Engine (PIE) (personality determinator), Preference/Interest Capturer (PIC) (desires determinator), and a Composite Image Generator (CIG) (profiler). The PIE and PIC both react to user queries, behavior observations, preference/interest specification, and customer service data entry. Both input their reactions to the CIG, which after taking into consideration the already stored information if any about the particular person, enters a modified or new profile into the store.

The system allows for profile expansion and contraction over time as more information is incorporated and accounted for. Client profiling is rendered rather unlimited, and taken beyond monitoring user purchases, web site access, a small number of interest selections, and superficial personal information specification. Utilization of the information also is enhanced—in effect offering users more than those items or items closely related. Thus we move beyond "If you bought one of these items, you must want another." The PPE system extends that current state of client profiling—in ways much beyond that of current systems. The PPE develops a complex profile of numerous aspects of each user/client. It in effect "learns" "who you are as a person". The goal of the PPE is consistent with that of the ACAS system—more efficient and effective satisfaction of user needs, desires and wants, by developing and utilizing an increasingly accurate composite image of each user.

Mental and physical health characterization via PIE and PIC enables the ACAS system to gather and deliver personalized health information. In addition as the user profile becomes filled out, ACAS is increasing able to offer lifestyle advice and automated self-exploration in order to effectuate better health through exploration of health situation root-cause analysis: in other words explore with the user the psychological aspects of their physical and mental state. Quite often a poor health state is in some way related to psychological factors such as job dissatisfaction. Such health states quite often are treated with strictly pharmaceutical means, ignoring the mental condition lying behind the scenes: "If I give you this drug to lower your blood pressure but ignore the difficult and stressful lifestyle you live, will I totally address the problem?" Through interactive querying of the user, the ACAS system develops his or her health profile. While not a substitute for medical attention and pharmaceutical aids, the ACAS system serves as a client profiler and information aggregator and delivery service. The ACAS system would serve as a health industry aid.

To function as a health industry aid, the ACAS system will need information useful to constructing an image of a person. It will need to capture this information. The user must be persuaded to give it to the system, though some people dislike disclosing personal information or completing surveys. Some people are very reluctant to disclose the personal information they hold dear.

But capturing information on a client (a person) is not a one-time event. While not all people are going to tell a stranger, let alone a web based system, all about themselves right at the first encounter; they may as they begin to trust the web based system: as mentioned previously, a client image and trust fills out, develops, and changes over time. Everyone changes in some way, shape or form over time. Information disclosure in general is dependent upon a number of factors, not the least of which is perceived benefit. In general, the greater the perceived benefit the greater the potential for more disclosure. But of more importance than perceived benefit is trust—trust that you'll utilize the information in accordance with the best interests of the client. The greater the level of trust, the greater the disclosure. Most people will freely discuss aspects of their lives with close friends: people they can trust to maintain a certain level of confidentiality. Whom they're disclosing to, obviously determines the level of disclosure.

As with personal relationships, trust develops over time and in relation to perceived interactions. If Samatha perceives that her personal information is being used for her benefit alone, that it's secure and under her control, she will instinctively disclose more and more information over time.

The last statement touches upon two additional necessities—information security, and the notion that people want to control how their information is used. Trust is never something to take lightly or abused. And once it's lost, it is far more difficult to recover from than to capture in the first place. Obviously the higher the level of confidentiality of the piece of information, the higher the perceived level of trust must be in order to secure a disclosure. People will very easily tell you the color hair they have, the type of car they drive—it's much more difficult to extract their salary, their career goals, or their health problems.

Perception is also an important point here. It's not necessarily an exact measurement—someone's perception of something is never necessarily 100% accurate. How one person views security and their respective needs for trust, will differ from that of another person; this all rolls back to the overall composite image of the person. User control of utilization of the personal information is very limited today: control largely remains in the possession of those gathering it, not the original owner—the providing-user person (consumer). A large percentage of consumers view non-voluntary/coerced information disclosure as privacy intrusion. Often obtaining a customer's zip code at a common store requires a hard sell—much like "you have a lot of nerve not answering". Therefore, what's needed on profiling systems is some sort of security mechanism. The level of characterization achieved will inevitably vary from client to client as well different personal situations. The system of the invention accommodates differing levels of provided information. This of course translates into a highly-intelligent logic-based system to accommodate the variability. Fuzzy logic is employed to handle the individual characterizations, it parameters being inherently variable in nature.

Information security is a very active field. Encryption, firewalls, intrusion detection systems, all are all effective and widely used systems. However, none of these are 100% full proof—none can guarantee 100% confidence in the security of the protected information. The ACAS system too, is highly dependent upon the mechanisms used in securing information. While securing all the personal information associated with someone is the ultimate goal, the method used does not necessarily translate to securing the entire information set. Moreover, it doesn't do much good to know personal details about someone if the details cannot be associated directly with the particular person.

FIG. 34 exemplifies a subset of the entire information set per a client, without which the value of the remainder of the set becomes drastically limited. (The core set is purely a representative set—an example.) The core set is simply information directly attributable to a single individual—quite often artificial tags of society such as driver's license, social security number, credit card numbers etc. While a person is associated with these tags—they are not the tags. As with any security situation, whether it be physical or electronic, the ease with which something is secured is dependent upon the inherent dimensions of the item itself; in other words it's easier to secure someone's home than it is to secure the entire town. Likewise it's easier to secure a subset of the client information than it is to secure the full set. It is important to remember that ACAS can potentially support an enormous number of simultaneous clients.

Any information, large and small, if related in some way to someone, is useful in characterization. The kind of car you drive tells something about who you are. Your chosen profession says something about you as well. The food you eat, your hobbies, interests, where you live, type of home, family characteristics also contribute to an overall picture of you. These are just some of the many, many bits of information that abound about a person. But not explicitly obvious is that all this information contributes to the overall client identification in different ways. For example, one bit of information may be of greater relative importance and consequently be more heavily weighted. Likewise, the raw information collected must in most cases be processed prior to incorporation. As observed pictorially in FIG. 35, "raw" information is processed (ex., weighted) prior to incorporation into an overall image. If someone says "I own a Mercedes", what does this say/imply about them? For one thing, there's definitely information in this statement. The rationale/logic behind this person owning this particular car could include any of the following statements:

Might love high-end automobiles—on the flashy side
May have been given the car or inherited it
May have bought the car because they prefer higher quality cars
Maybe just got a great deal on it.

Therefore while all information is of value, the relative importance and ease of use will vary.

As previously mentioned and observable in FIG. 8, the PPE generates a Personality/Preference Token 22 per each client of the system. The token—as the title implies—stores a client selectable subset of information particular to them. In other words depending on their personal desires, they can increase and decrease the set of information stored per their token. This token or electronic collection of personal information has a number of uses, one of which is shown in FIG. 36 where a user may make the token available to third-party web sites which upon reading the token can customize the web-site offering to that client. The ACAS system enables users to customize their collection of information.

Another use of the token (i.e. electronic information) is downloading it to an external storage device such as a smart card whereby the card may be read/used in many situations. As an example, a consumer walking into a shop or restaurant, has his token read at a distance (i.e. requiring no "swipe" of card), and shortly thereafter is addressed by an employee now equipped with knowledge of their likes and dislikes. The consumer is now offered a customized menu—one maybe with meat entries removed since the customer is a vegetarian. The PPE portion of ACAS enables clients to generate custom tokens for different situations. This sort of portable information suite obviously expedites the level and quality of received service.

A query process is inherently hierarchical in nature—broad questions linked to progressively more detailed sub-questions. As previously mentioned, the hierarchical display, data structure, and processing methodologies are common across many areas of the ACAS system. The client-query set, much like the information metadata, utilizes similar database modules.

FIG. 37 shows how clients migrate and use the CML Tree to specify topics of interest. Likewise in querying clients, the questioning process will follow a similar hierarchical-path structure. FIG. 37 also shows the concept that client-based software communicates to a remote server for data entry.

FIG. 38 sets forth a query process associated with the topic selection process. As the client has selected the 2005 E590 node for information receipt, the system follows up said selection with a hierarchical set of linked questions.

The PPE blends psychology and sociology with web based technology. ACAS draws upon and utilizes concepts of these relevant fields within the logic that formulates decisions and conclusions regarding clients.

As previously mentioned, FIG. 39 pictorially describes the dual use of a CML based hierarchical display. A mentor/expert selecting the target audience for an article, would migrate and use the same software as the client trying to describe themselves. The client Mary is not just a lawyer, she has specified that her specialty is Chinese Adoption Law. Likewise the mentor has found an interesting article concerning Chinese Adoption Law.

FIG. 40 shows a further elaboration of the concept in which clients are characterized through generic types of information on down to detailed sub-information. Nyah could be generically classified as a "lawyer", but note all the more specific information which is related such as that she attended Harvard, and is currently working in a private adoption agency: thus ACAS gathers much precise information of interest too.

The base of FIG. 40 shows the same (identical) hierarchical data structure displayed in a somewhat different manner (i.e. arrows).

FIG. 41 reviews the previously discussed concept of spheres of interest. Users are allowed multiple spheres of interest which may contain sub-spheres of interest. One sphere grouping shown is of topics of interest for information gathering and display per the client's user pages, and a second grouping is associated with Jeffery's audio selections.

FIG. 42 describes some key user functions. Information is delivered to users in both personalized user pages and audible segments. User pages offer users a combination of linked text, video, imagery, and sound based information. The Information Service Request and Management segment enables the selection "what" information, when it's to be delivered and in what formats. The five segments mentioned, Personalized Pages (text, image, and video display), Profiling Services (personal information disclosure), Audio Management (listening to a collection of audio segments), Account Management (changing account information), and Information/Service Request and Management (specifying what, when and how), form the core user functions.

The MUIU is the suite of software modules that run on the client's personal computer that enable the user to interact with various components of the ACAS system. One function of the MUIU is to serve as a graphical interface to other logical components of the ACAS system.

The speed of a computer-based process is directly proportional to a number of factors, including the time by which the computer accesses data as well as interacts with integrated processes. If all the data is resident on your computer and all the software executes also within your computer, the job/task at hand will run faster than if you had to go out over the Internet for data as well as interact with externally-remote software processes. This notion is utilized in the distributed nature of the ACAS software suite.

FIG. 43 describes the personalized user interface, wherein both the layout and the displayed information is user selectable. Here once again differences in user preferences are accommodated. Users also determine when and how they receive, or more appropriately allow, advertisements. The advertisements are customized to the target markets in which the particular user falls. Colors, borders, font sizes, and other screen preferences are stored in user templates. Each user is allowed a multiplicity of templates to accommodate a variety of usage scenarios such as work verses home. Likewise the information associated with the templates may vary as well. What might be fun and exciting in the home environment quite often is questionable for the work atmosphere.

As observed in FIG. 43, advertisements and other service related messages are displayed in the uppermost left portion of the example template. It is also significant to notice how this particular user has requested varying delivery formats and linked information—bullet lists linked to narratives for Computer Software News, whereas titles linked to abstracts for sports. The template information (screen rendering) information is stored local to the client.

FIG. 44 expands upon the concept of local-template information to describe a related design feature—namely the data/information sent to each user is equivalent to a personalized electronic newspaper. Not the whole set of data/information, just those bits and segments of interest. In addition the client software also allows each user to select and set parameters entirely local to their computer and to transmit updates to the remote server.

As in the case of the actual data/information, updates to the CML Tree structure are sent to each user as shown in FIG. 45. The user receives CML Tree update information which when read and processed by the client software, equates to adding the dotted line to the existing structure understood by the local software. In other words the dotted line is a recent addition to the previous version of the tree—maybe a new sub-topic was added. This client/remote software communication/distribution system allows for servicing a far greater number of users faster and more efficiently, both for the remote server as well as the actual user. Updates/data and information are sent during off-peak hours, and the distribution load can be dispersed over many hours. Much of the current web-based services have a far greater dependency upon communications between the client and the remote server.

As further shown in FIG. 46, the user does not go out onto the Internet on a regular basis. In fact if they leave their preferences alone, the user just receives the data and does not log onto the Internet. Each user receives the data via an email attachment or other similar delivery service. The client's software parses the data file and renders the information on the client's machine.

The user interface also incorporates multi-modal interactions. Multi-modal is the use of sound, sight, tactile, and audible stimulus. Voice synthesis and recognition is quite advanced today and need not be discussed herein. It is important to note that maximizing the interaction means utilizing a multitude of sensory stimuli to give the user the richest possible experience. The effect of imagery, sounds, tactile stimuli, and other sensory input on a person's psyche, is well documented. Likewise that people respond differently to various stimuli.

FIG. 47 shows a linked-information concept wherein users are allowed to specify for given spheres of information (topics), the types of information they want linked and delivered. (Linked information is one piece of information associated with another.) In the case of ACAS, users are able to specify per sphere not only what information to link (i.e. topics), but also the format of the information as well. In the example the user has requested information on the new Mercedes 2005 E590, and in particular has specified the presentation of the Abstract first which is linked to a Bullet List form, video and still imagery. In this case the user is not interested in full length articles or narratives but would rather get "boiled down" information—namely key points in a bullet list. In most situations people want linked information but are not interested in an infinite depth of information. People don't have the time nor typically the interest in "drilling" down miles into a topic. On average people want information in the most efficient manner possible.

Users of the ACAS are also able to specify the level of linkages—meaning how many per a topic. A subtle but typically not realized point is imbedded in this capability. While in theory it's great to have access to an infinite breadth and depth of information, and in some cases it's desirable, in the lion's share of common everyday situations such data access is not necessary nor does it satisfy the needs of time-, energy-, and money-constrained individuals.

The Aggregation/Delivery System (ADS) 9 gathers and delivers data/information as well as captures and processes client feedback. The data delivered is a mixture of mediums, for example text verses audible. ADS handles such real world scenarios as "if I listen to something in the car on the way to work, how do I mark it as listened to so when I pull up my personalized pages on my lunch hour I don't hear it again?". Basically synchronizing multiple-aggregation listings. Or "For my 1 hour commute Monday I want articles on the Triex Disaster, Local Sports and lawn care appropriate for this time of year." The ADS offers an information management service which includes determining per customers preferences when to add new information, when to delete items, and even how to store bits of data for future reference or transmission to another individual. In FIG. 47, users control not only the flow of information to them but what is with it once they have it.

User's specify:
What news/information they would like to receive
How they want it presented to them—ex. text, audio, combination, spheres of interest
How they want the information changed, updated, deleted and/or stored As mentioned previously, users migrate the CML Tree to select topics of interest. As shown in FIG. 48, users see a hierarchical display of topics. Topics of broad/high level nature are shown on the left side; and as users migrate down a branch, the topics become increasingly of a more refined nature—i.e. more detailed. Users are able to select any tree node which equates to a particular topic. Users are also able to indicate that all topics which fall below the chosen one, are of interest and to be subject to aggregation as well. In other words, there's a broad category sports below which are football, baseball, and hockey. Sam can select the node sports and receive all information regarding all three sports. If a user were a NY Giants football fan and only wanted articles discussing the New York team, he could select the node on the tree corresponding to this particular team. A user is allowed a large number of topics.

The system ACAS 28 addresses the question—"How do you prioritize Topics?". That is—"How does the system know what information is more important to the user?" Article A verses B, D, and X. Even two articles on the previously mentioned NY Giants—what makes one more important than another for a particular person? Remember of course that Joe, Mike and Mary might all have an interest in the Giants but of radically different natures. Joe might be interested because he wants high level information so as to have something to discuss with clients, even though he doesn't care much about the sport. Mike's interest might be related to sports medicine, while Mary might be that hard core fan who wants to hear and see everything she can about the team.

As mentioned previously fuzzy logic and the concept of parameter variability play a critical role throughout all aspects of the ACAS 28 system. Parameters, weightings, logic, and classification have inherent variability. One person might view an article as heavily laden with detail, whereas another might view it as mildly detailed. A client classified as "tall" might fall into a broad band of say 6'0" and up.

Now referring to FIG. 49 we see a pictorial representation of some of the ways in which users can prioritize information as well as how a particular data item gets ranked. User selectable settings are as follows:

Rank of sources—Forbes over Business Week magazine, or vice versa
Rank Tree Nodes—topics of interest—this one over that one
Content Factor
Age of the material
Level of Detail
Ease of Read
State of the Art
Association of Nodes to Spheres
Association of Spheres to Spheres
Association of Spheres to particular mediums—audio vs. text
Aggregation settings and information management FIG. 49 shows user-configurable preference ratings. Information from the Wall Street Journal is proposed as more valuable than that of Forbes and Business Week. We also see that information about the NY Giants is rated as of highest interest, followed by general information on baseball followed by general information on the AFL. At the base of FIG. 49 is shown a simplified example of the logic imbedded in ACAS 28.

In order to deliver information according to user selections, data must be ranked relative to other pieces of information. An index or ranking is calculated per data which falls within the user's chosen spheres of interest. This ranking is a weighted scoring technique. The user sets the weights associated with the parameters used in the logic, as well as those parameters to be included. In other words the user may choose to rank and deliver information solely based on his/her node ranking, ignoring other possible discretionary settings such as level of detail, ease of read or source of information. The ranking equation here shown has three weighted elements; this is merely an example; as indicated, actual ranking logic will vary.

FIG. 50 indicates that users are allowed multiple profiles. (Profiles are associations of spheres (general areas of user's interests) with aggregation and delivery information). Users define these profiles. Also as shown in the Figure, a user might set up a profile for the upcoming vacation with topics and delivery details particular to that situation. Likewise she might set up a profile associated with her busy workday schedule.

Thus the ACAS 28 system can deliver an experience that extends beyond just simply aggregating and supplying information. By client characterization and very precise specification methods, one is able to offer something that transcends simply information. As shown in FIG. 51, for a given topic, users are able to specify the format of the information—from bullet lists to just titles, or abstracts, full narrative text, etc. For example, Nyah might want to listen to just bullet lists of news about the fiber optics business.

Content indication is an important feature to this invention. Content factor is a relative measure of how much a piece of data (ex. article) is about a particular topic (i.e. node). Users are able to specify the level to which they would want items to enter the aggregation pool based on this factor. In other words if Sue says "I'm interested in this topic", she might also specify through the content parameter that she only wants to see articles which are at least 50% about this subject.

Users also control the Level of Suggestion and topics associated with that suggestion. If Ed has selected fishing as a topic of interest, he might also specify through the tree that he'll allow the system a certain level of range about his chosen node of interest from which the system might automatically offer items not specifically requested but of close relationship.

The user's aggregation listings—i.e. collections of information, are constantly being updated. For example, a user might not view information for a couple of days; they're off busy with some problem that popped up. Now they go back to their user pages—they have been updated per information that arrived in the interim. The frequency with which listings are updated is configurable. Certainly if an article was retrieved and delivered that satisfied the user's interest with a high probability (i.e. something they would most definitely be interested in seeing/hearing), this item should remain in the aggregated listing throughout the gap in non-user viewing. If a user does not reset their selections, they are offered information based on the fixed setup indefinitely—of course given proper payment satisfaction.

FIG. 51 offers another example for further clarification of previously mentioned concepts. The user has three spheres of interest: gardening, parenting, and the fiber optic business. For the gardening article, the user wants the "real title"—that which is provided by the mentor (third party reviewer) linked to narratives; whereas with parenting, she only specified articles from three ranked publications. For news about the fiber optic business, she desires information presented in bullet lists only. Thus we see a mixture of topics (groupings of information) with varying selection criteria and audio delivery formats.

Possible choices in handling information after it's delivered are:

Delete Everything—"give me totally new material every week"

Keep an article in current listing—"I want to read this latter."

Delete this particular article—"Done with it."

Mark this item for storage and forwarding—"Put this in my "Send-to-Joe" folder"

Marking means identifying an item for further processing. Users are able to select items for storage in previously setup folders—for example disk directories. The folders are also candidates for inclusion in aggregation listings. In other words on a particular day, a user might want to gather very specific information and also articles on the same topic gathered over the last couple of weeks. The articles would be evaluated for possibly inclusion, using the same logic applied to incoming news/data. FIG. 52 pictorially demonstrates two of these concepts. The two shown of potentially many updating scenarios are: 1) overwrite the old A with the new B or 2) Save a portion of A combined with the new B.

Part of what the ADS 9 system does, is reconciling information/data throughout multiple listings. FIG. 53 demonstrates how a user is able to reconcile and update information per multiple mediums. Melissa listens to 4 audio segments—items A through D while on the way to work. As she listening to the segments, she has—through the software—noted the action to be taken per selection. During her lunch break those chosen items are deleted while those new ones E and F, and C which she wants to read are available in the new selection. Her next-morning audio selections reflect choices made the previous day.

Thus the system's reconciliation apparatus allows users to have one or more aggregated listings per topic and per several delivery mediums. As another example, Pete might have a group of topics related to his profession and another group related to his hobby. Pete would have two running lists of material being presented to him per the two groupings. Pete might also choose a third group of topics which he likes to listen to during his commute to and from work in the car, say on gardening. In this case, Pete has three independent groupings which have two delivery methods—the first two via web/text and the third via audio selections. Pete, could however decide to both listen to and read information about his profession. In other words, he might want to listen to a portion in the morning and read the rest during his lunch hour. This invention allows Pete to manage aggregated listings independently and/or across mediums. The system allows him to delete an article he listened to in the car so that it does not appear in the text listing during his lunch hour.

The system also allows Pete to delete an article from his list but save it. Thus a user is able to delete an entry from the listing but mark it as "saved" for future referral.

The system also allows Pete to forward an item. Thus users are able to forward via email articles to friends.

The system also allows Pete to keep/retain an item in a list. Thus a user marks an item to keep it in the running list, but leave it subject to prioritization in relation to incoming new material. Pete marks an item which has certain metadata, to be retained for additional viewing tomorrow. During the night however, a new article which matches his preferences to a higher degree comes in; the system will rank the new article higher in the listing than the item he chose to retain.

The system also allows Pete to synchronize two or more delivery mechanisms (e.g., text and audio). A user can mark a group of topics for which there are several delivery mechanisms as synchronized: meaning actions specified for one medium, are applied to the other. Thus a deletion from the text listing would be carried over to the audio. Of course, the system also allows Pete to proceed in non-synchronized fashion, too. Thus a user can choose to have a grouping of topics delivered per multiple mediums where he manages them separately. Pete can delete a text article but it remains in his audio selections because he wants to listen to it in his car.

The system also allows Pete to employ unique settings per specific articles. For example, Pete can retain an audio selection in his listing even though he has otherwise selected synchronization of his audio and text listings.

In FIG. 54 we see a pictorial representation of the audio-software component workings. Users are offered titles, action options, and migration mechanisms which allow user to "jump" around in the complete listing instead of just linearly migrating through.

The CML/hierarchical nature and apparatus of ACAS can be used in the delivery of books in a more segmented manner. As shown in FIG. 55, the information can be broken up and organized in a whole host of ways. Users can, much like in the previous discussions of topic/information selection, choose a portion of the book for delivery. Topics or segments of information, while corresponding to a single book, might be segmented and made available via this system. Users are able to select only those sections of particular interest.

Likewise, FIG. 56 shows that educational material might also form the data utilized in an ACAS system. Different paths might be made available for differing student circumstances.

As indicated in FIG. 35, a user may specify a product he or she is interested in receiving information on. Thus it is desirable to alert vendors to this potential customer. But it is also desirable to protect the customer from unwanted solicitation.

Spamming

"Spamming" (unsolicited email) is a very common nuisance today. It is often difficult for ordinary people to effectuate the stop of this stream of unsolicited email from a particular source. In addition, the practice of re-selling web site visitor/private information including email addresses, is very common and only partially controllable by the true owner of the private information. Quite often web sites make the privacy selections very obscure and unclear—in essence placing the burden to controlling the use of their own private information on the individual themselves. People want and need information but they also want to remain in control of all types of interactions involving their private information. It is often necessary to give one's email address out in order to receive information. Once this happens, the business model processes and systems of the recipient, dictate where and how it's further used. An obvious solution is to exchange one's email address for another; how ever this requires an administrative system change. In other words users can't just effectuate this change themselves.

If you're looking for information of very popular and large dollar products like automobiles, it is relatively easy to go out to the perspective web site and view information on their products. However, the greater the level of specificity and smaller the market for a particular product, the harder it is to even locate a supplier let alone obtain information about the products of interest. Obtaining information about SUVs is a whole lot easier than identifying and finding out information about row boats. How might you find the small manufacturer in Maine whom builds high quality row boats? Yes if she has a web site you could find it, given enough time and patience doing web searches. A better way would be to post your interest through some automated mechanism through which supplier could respond with the appropriate product information. The question becomes how might people post their interest in product types while maintaining some level of anonymity, so that in the case of the unscrupulous supplier they can "turn off"/disable the flow of product information after they have made their purchase decision whatever that might be.

The instant apparatus and method, as indicated above, allows users to select "things" of interest, where "things" include topics as well as product "types" of interest. Using slightly different hierarchical "node" identifiers enables much of the underlying data structure apparatus for the selection and subsequent utilization to be identical. Referring to FIG. 57, a user utilizes the hierarchical-based interfaces to select potential product types of interest. These selections are sent to the system server where they are stored, posted and sent to potential suppliers of selected product types. The inventive apparatus also generates a temporary unique email address for the user, through which solicitation of information external to the system is done. In this example, the user now has two email addresses. The second one will allow for the flow of product information to the user. Potential suppliers will send information to the new temporary address, which product information is then forwarded to the user's true email address. At any point in time users can request the termination of this second address effectuating the stop of information through this temporary channel and maintaining privacy of their true address. In addition to sending registered suppliers emails describing potential customers, the system also posts information whereby suppliers can visit the web site and view competitive similar information.

Thus through the graphical user interfaces, users note their interest in particular product types as well as request a temporary email address. At any point in time users are also able to terminate these said email addresses. This capability is a new application of network address translation which is used today as a network security measure. Network address translation is not done today on a per user basis. This type of automated customer/supplier exchange does not exist today, especially not with said embedded anonymity.

Thus in capturing user's preferences and interests, the apparatus and method of the invention easily utilize this information in sort of an information broker role—serving as an intermediary between the clients/users and suppliers wanting to market their products. The "security against spamming" would act as a barrier against those vendors who like to resell the email addresses to others, and also those who like to overload potential customers with email ads once they have the email addresses. The idea can be summarized in the following example: Mike is interested in purchasing a canoe. He migrates the tree structure and notes his interest as well as desire to receive information from those companies manufacturing canoes. The system in turn can either 1) anonymously post a client's interest in a product type, and/or 2) utilize an existing characterized supplier list to notify the supplier of the need for information. Mike can turn off the product information flow at any time by having the system simply kill the temporary email address. The vendor would never see the true client email address.

While applicants have shown and described preferred embodiments of the invention, it will be apparent to those skilled in the art that other and different applications may be made of the principles of the invention. It is desired therefore to be limited only by the scope or spirit of the appended claims.

What is claimed is:

1. A computer-based adaptive knowledge system for retrieving and aggregating selected data and information of particular interest to a user, said adaptive knowledge comprising the steps of:

collecting data and information of particular interest to the user; storing the collected data and information in a knowledge-storage instrumentality;

classifying the collected data and information in a hierarchical tree;

permitting user enhancing the information of particular interest to a user; and organizing the data and information into selectable infrastructures of the hierarchical tree, wherein the data and information are classified into a distinct number of bins or nodes through the metadata, wherein the bins or nodes are organized into various infrastructures tree structures, and wherein the infrastructures tree structures proceeding from a grandparent and parent nodes down through a node to sub-nodes and sub-sub-nodes each reflecting specific metadata.

2. The computer-based adaptive knowledge system of claim 1, wherein the collected data and information include at least one of a text of a book, newspaper, magazine article, catalog, or song.

3. The computer-based adaptive knowledge system of claim 1, wherein the data and information of particular interest to the user include at least one of a title an author a subject or metadata including more generic terms.

4. The computer-based adaptive knowledge system of claim 1, further comprises displaying to the user a selected tree structure to facilitate user specification of a node of interest.

5. The computer-based adaptive knowledge system of claim 4, further facilitating user specification of spheres of interest involving several subject nodes.

6. The computer-based adaptive knowledge system of claim 5, further facilitating user specification of the weightings of the relative importance to accord with the various subject nodes in a sphere of interest.

7. The computer-based adaptive knowledge system of claim 1, wherein the information collected is users' preferences and personalities.

8. The computer-based adaptive knowledge system of claim 7, wherein the users' preferences include at least one of information about professions, family, home, hobbies, food, or car.

9. The computer-based adaptive knowledge system of claim 7, wherein the users' personalities include information about likes or dislikes.

10. The computer-based adaptive knowledge system of claim 1, further comprises matching the information collected of said particular interest to the user with data in the infrastructure.

11. The computer-based adaptive knowledge system of claim 10, further comprises communicating the matched in a format selected by the user.

12. The computer-based adaptive knowledge system of claim 11, wherein the user-selected format for displaying the matched data is stored in the user's local display apparatus.

13. The computer-based adaptive knowledge system of claim 11, wherein storage of the user-selected format for displaying the matched data is shared between the user's local display apparatus.

14. The computer-based adaptive knowledge system of claim 1, further comprises displaying to the user a selected tree structure and facilitating user creation of a special tree structure.

15. The computer-based adaptive knowledge system of claim 1, further comprises preventing changes in the infrastructures without the approval of an administrator.

16. The computer-based adaptive knowledge system of claim 1, wherein the data is automatically reclassified.

17. The computer-based adaptive knowledge system of claim 1, further comprising limiting access to employ at least one of biometric authentication such as eye, fingerprint or facial screening.

18. The computer-based adaptive knowledge system of claim 1, wherein the bins or nodes of information collected of the particular interest to the users are organized into a hierarchical structure based on sources of the data.

19. The computer-based adaptive knowledge system of claim 1, wherein the bins or nodes of information organized into a hierarchical structure based on topics.

20. A method for operating a computer-based adaptive knowledge system for retrieving and aggregating selected data of particular interest to a user including a knowledge-storage instrumentality, comprising the steps of collecting data and information of particular interest to a user, classifying said collected data via multiple associations to an adaptable hierarchical-tree-node structure the data and enhancing the information about the data, and organizing the data and the information into selectable infrastructures according to the associations of the data and the information to the hierarchical-tree-node structure indicating the data preferences and the personalities of the users; and aggregating the associated hierarchical tree node structure according to the preferences and personalities of a particular user and delivering the aggregated data to the user on request or periodically, wherein the data and information are classified into a distinct number of bins or nodes through the metadata, wherein the bins or nodes are organized into various infrastructures tree structures, and wherein the infrastructures tree structures proceeding from a grandparent and parent nodes down through a node to sub-nodes and sub-sub-nodes each reflecting specific metadata.

21. A method according to claim 20, and the steps of collecting information of the particular user interest comprises matching the information collected, and communicating the matched data in a format at a time selected by the user.

22. A method of 21, wherein said matched information is communicated in several different modes.

23. The computer-based adaptive knowledge system of claim 22, wherein said matched information is communicated via e-mail, and information about the data notify the source of some data of a user's future interest in the particular type of data.

* * * * *